(12) United States Patent
Hamada et al.

(10) Patent No.: US 6,356,200 B1
(45) Date of Patent: Mar. 12, 2002

(54) SITTING PASSENGER DETECTING APPARATUS AND SITTING PASSENGER DETECTING METHOD

(75) Inventors: Makoto Hamada, Toyota; Makoto Sekizuka, Susono; Osamu Fukawatase, Aichi-ken; Osamu Fujimoto, Nissin, all of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/482,311

(22) Filed: Jan. 14, 2000

(30) Foreign Application Priority Data

| Jan. 14, 1999 | (JP) | 11-008380 |
| Feb. 19, 1999 | (JP) | 11-041255 |
| Apr. 23, 1999 | (JP) | 11-116551 |
| May 21, 1999 | (JP) | 11-142247 |
| Sep. 3, 1999 | (JP) | 11-250770 |
| Sep. 21, 1999 | (JP) | 11-266901 |
| Jan. 12, 2000 | (JP) | 2000-003293 |

(51) Int. Cl.$^7$ .................................................. G08B 2/100
(52) U.S. Cl. ........................ 340/667; 180/273; 280/735
(58) Field of Search ............................... 340/667, 666, 340/665; 200/85 A, 85 R; 180/41, 273, 290; 280/734, 735

(56) References Cited

U.S. PATENT DOCUMENTS

| 4,107,645 A | * | 8/1978 | Lewis et al. | 340/667 |
| 5,748,473 A | * | 5/1998 | Breed et al. | 180/273 |
| 5,942,695 A | | 8/1999 | Verma et al. | |
| 5,988,676 A | * | 11/1999 | Lotito et al. | 180/273 |
| 5,991,676 A | * | 11/1999 | Podoloff et al. | 701/45 |
| 6,039,344 A | * | 3/2000 | Mehney et al. | 280/735 |
| 6,069,325 A | * | 5/2000 | Aoki | 180/273 |
| 6,087,598 A | * | 7/2000 | Munch | 180/273 |
| 6,092,838 A | * | 7/2000 | Walker | 280/735 |
| 6,095,555 A | * | 8/2000 | Becker et al. | 280/735 |

FOREIGN PATENT DOCUMENTS

| JP | 07-301681 | 2/1995 |
| JP | 08-282358 | 4/1995 |
| JP | 09-301120 | 5/1995 |
| JP | 09-150662 | 11/1995 |
| JP | 09-207638 | 2/1996 |
| JP | 10-194024 | 1/1997 |
| JP | 10-236274 | 2/1997 |

* cited by examiner

Primary Examiner—John Tweel
(74) Attorney, Agent, or Firm—Finnegan, Henderson, Farabow, Garrett & Dunner, L.L.P.

(57) ABSTRACT

A sensor attaching portion of an upper rail and a sensor attaching portion of a cushion frame are provided with a sensor attaching plate having a sensor disposed thereon. The upper rail and the seat cushion frame are connected with a bracket at a position facing the sensor attaching plate. When the passenger sits on the seat, the seat cushion frame moves down and a bent portion of the bracket is pressed and deformed downwards. At this time, the center in the vertical direction of the sensor attaching plate is bent outward in the lateral direction of the seat. The sensor serves to detect the generated deformation.

29 Claims, 47 Drawing Sheets

SITTING PASSENGER DETECTING APPARATUS AND SITTING PASSENGER DETECTING METHOD

INCORPORATION BY REFERENCE

The disclosures of Japanese Patent Application Nos. HEI 11-8380 filed on Jan. 14, 1999, HEI 11-41255 filed on Feb. 19, 1999, HEI 11-116551 filed on Apr. 23, 1999, HEI 11-142247 filed on May 21, 1999, HEI 11-250770 filed on Sep. 3, 1999, HEI 11-266901 filed on Sep. 21, 1999 and 2000-003293 filed on Jan. 12, 1999 including the specifications, drawings and abstracts are incorporated herein by reference in their entirety.

BACKGROUND OF THE INVENTION

1. Field of the Invention

The present invention relates to a sitting passenger detecting apparatus and a sitting passenger detecting method, and more particularly to a sitting passenger detecting apparatus which is applied to a seat disposed to be movable in the longitudinal direction on a floor of a vehicle, such as an automobile, and a sitting passenger detecting method.

2. Description of the Related Art

An example of a sitting passenger detecting apparatus disposed to be movable in the longitudinal direction on a floor of a vehicle, such as an automobile, has been disclosed in Japanese Patent application Laid-Open No. HEI 9-207638.

As shown in FIG. 51, the sitting passenger detecting apparatus incorporates load sensors 606 each of which is interposed between a seat joining portion 604 for joining a seat 600 to a floor 602 and a joining portion 602A of the floor 602. The number of the load sensors 606 is two which is the minimum number. The load sensors 606 are disposed at the two ends of a diagonal of the seat joining portions 604 which are usually provided for four portions. As a result, presence of a passenger on the seat 600 can reliably be detected regardless of the position of the passenger sitting on the seat 600. Moreover, an excessively large number of the load sensors is not provided so as to avoid a complex structure and the cost increase.

The foregoing sitting passenger detecting apparatus incorporates the load sensor 606 provided for a portion for joining the seat joining portion 604 provided for a lower rail of a seat track 610 and the floor 602 to each other. Therefore, when the seat 600 has been moved rearwards along the seat track 610 and a seat back 600A has been reclined rearwards, the load of the passenger resting against the seat back 600A sometimes causes an upward load to be applied to the front seat joining portion 604. As a result, the load sensor 606 provided for the front seat joining portion 604 cannot substantially measure the load. Hence it follows that the measuring accuracy cannot be improved.

When bolts 608 serving as clamping members are tightened strongly in order to increase the rigidity for supporting the seat 600, an initial value (initial distortion) of the load sensor 606 of the above-mentioned sitting passenger detecting apparatus is enlarged excessively. As a result, the variation (varied distortion) of the load sensor 606 which is caused by the load which must be measured is reduced with respect to the initial value. Since the variation with respect to the initial value is reduced as described above, the measuring accuracy cannot be improved.

SUMMARY OF THE INVENTION

An object of the present invention is to provide a sitting passenger detecting apparatus and a sitting passenger detecting method each of which is capable of improving an accuracy of measuring a load which is added to a seat.

According to a first aspect of the present invention, there is provided a sitting passenger detecting apparatus comprising: connecting members structured to separate a seat rail and a seat cushion frame from each other and use a load which is added to the seat cushion frame to connect the seat rail and the seat cushion frame to each other such that relative displacement between the seat rail and the seat cushion frame is permitted; displacement detecting means for detecting displacement between the seat rail and the seat cushion frame; and weight calculating means for calculating the weight of a passenger sitting on the seat in accordance with a value detected by the displacement detecting means.

Therefore, when a passenger sits on the seat, the seat cushion frame is relatively moved with respect to the seat rail. The relative displacement is detected by the displacement detecting means. In accordance with a detected value, the weight calculating means calculates the weight of the sitting passenger. Therefore, if the seat is slid in the longitudinal direction, the relative position between the seat rail and the seat cushion frame is not changed. As a result, the load which is added to the seat can accurately be measured. Hence it follows that the accuracy of measuring the weight of the passenger sitting on the seat can be improved.

The sitting passenger detecting apparatus according to the first aspect incorporates the connecting member which is a bracket provided for at least the rear connecting portion of the front and rear connecting portions between the upper rail of the seat rails and the seat cushion frame. When a load is added to the seat cushion frame, the bracket is compressed and deformed downwards. The displacement detecting means is a sensor for detecting change in the distance from the seat rail to the seat cushion frame. The sensor may be disposed in parallel with the bracket at an offset position in a direction of the width of the seat.

When a passenger has sat on the seat, the load added to the seat cushion frame downwards compresses and deforms the bracket. Thus, the distance between the seat cushion frame and the bracket is shortened. Since the foregoing change is detected by the sensor, the accuracy of measuring the weight of the passenger sitting in the seat can be improved. If the upper rail and the seat cushion frame are firmly joined to each other, the foregoing state does not exert a great influence on the displacement of the sensor joining portion. As a result, the seat support rigidity can be increased without any deterioration in the measuring accuracy of the sensor. As a result, the comfort of the seat can be improved.

The foregoing sensor may comprise a thin plate which is distorted in accordance with change in the distance from the seat cushion frame and the upper rail; and a sensor body for detecting distortion of the thin plate.

As a result of employment of the foregoing structure, the thin plate is distorted when the distance between the seat cushion frame and the upper rail has been changed. The distortion is detected by the sensor body. Thus, the structure can be simplified.

The foregoing bracket is characterized by a bending portion which is elastically deformed in a downward direction owing to the load which is added to the seat when a passenger has sat in the seat.

As a result of employment of the foregoing structure, the load which is added to the seat after the passenger has sat in the seat elastically deforms the bending portion of the bracket. As a result, the distance between the seat cushion frame and the upper rail can be changed, causing the structure to be simplified.

The connecting member may be a link for connecting the seat rail and the seat cushion frame to each other. The displacement detecting means may be a sensor for detecting the relative displacement between the link and the seat cushion frame occurring when the passenger has sat on the seat.

As a result, when the passenger has sat on the seat, relative displacement occurs between the link and the seat cushion frame. The sensor detects the relative displacement so that the weight of the passenger sitting on the seat is accurately measured.

A structure may be employed which incorporates the bracket which connects two pin-support points on the seat cushion frame to each other and to which the upper end of the link is connected. The sensor joined to the bracket measures the distortion of the bracket.

As a result, when the passenger has sat on the seat, the seat cushion frame is downwards pushed. Thus, the bracket is downwards deformed such that the connecting pin disposed at the upper end of the link serves as a steady point. Then, distortion of the bracket occurring when the foregoing downward deformation has taken place is detected by the sensor. The weight of the passenger who has sat on the seat can accurately be detected. Moreover, the bracket may be structured to have a certain width in the direction of the width of the vehicle. Since the bracket has the certain width in the direction of the width of the vehicle, the rigidity in the direction of the width of the seat required for the seat can be maintained.

The seat cushion frame may have a hole into which a pin for connecting the bracket and the upper end of the link to each other has been inserted such that a predetermined gap is retained in the vertical direction.

As a result, the hole formed in the seat cushion frame permits the seat cushion frame and the bracket to freely be moved in the vertical direction with respect to the link. If rotational force is added to the sheet owing to collision or the like and, therefore, the sheet is greatly moved in the vertical direction, the pin and the portion around the hole are made contact with each other. Thus, furthermore deformation of the bracket can be prevented. As a result, breakage of the bracket can be prevented.

The connecting member may be two cross bars which are disposed between the right and left seat cushion frames and to which a cushion pan has been joined. The foregoing displacement detecting means may be a sensor provided for the cross bar to measure distortion of the cross bar.

As a result, when the passenger has sat on the seat, the load which acts on the seat cushion pan downwards deforms the cross bar. The caused distortion of the cross bar is measured by the sensor. In accordance with a detected value, the weight of the passenger sitting in the seat can be calculated. Any great influence of the attitude of the passenger sitting in the seat and a joint error of the seat rail is not exerted on the result of the calculation. Therefore, the accuracy of measuring the weight of the passenger sitting on the seat can be improved with a simple structure.

A structure may be employed which incorporates a back bar arranged between right and left seat back frames and a seat back sensor joined to the back bar to measure change in the distance from the seat back cushion spring, and wherein the weight calculating means calculates the weight of the passenger sitting on the seat in accordance with a value detected by the sensor provided for the cross bar and a value detected by the seat back sensor.

As a result, the reclining angle of the seat back is not used when the weight of the passenger sitting on the seat can accurately be measured in accordance with the value detected by each of the sensors provided for the two front and rear cross bars and the value detected by the sensor provided for the seat back.

A structure may be employed which incorporates the right and left seat cushion frames and the seat rail which are offset in the direction of the width of the vehicle, wherein the connecting member is two front and rear sensor bars extending in the direction of the width of the vehicle and structured to connect the right and left seat cushion frames and the seat rail to one another, and the displacement detecting means is sensors disposed between the seat cushion frame connecting portion and the seat rail connecting portion at the two ends of the two sensor bars to detect distortion of the sensor bar.

As a result, after the passenger has sat on the seat, a load is added to the seat cushion frame. Thus, distortion occurs between the seat cushion frame connecting portion and the seat rail connecting portion. The distortion is detected by the sensor to measure the weight of the passenger. Since the two front and rear sensor bars connect the right and left seat cushion frames and the seat rail to one another, the right and left seat rails are made to be in parallel with each other when the seat rails are mounted on the body of the vehicle. As a result, an error made when mounting on the body does not cause needless distortion of the sensor bar to occur. Moreover, any great influence of the attitude of the sitting passenger is not exerted on the distortion of the sensor bar. Therefore, only a simple structure is required to accurately measure the weight of the sitting passenger.

A thickness-reduced portion may be formed in each of the portions of the two sensor bars in which the sensors are disposed.

As a result, the thickness-reduced portions provided with the sensors are reliably distorted after the passenger has sat on the seat. Therefore, the weight of the sitting passenger can furthermore accurately be measured.

A structure may be employed in which the front and rear connecting portions between the upper rail of the seat rail and the seat cushion frame are joined by rotative links, an elastic member is provided for at least either of the connecting portions so as to stably hold the seat cushion frame and an amount of displacement of the seat cushion frame with respect to the upper rail against urging force of the elastic member is detected by a variable resistor.

An amplifying means may be provided which amplifies the angle of rotation of the link to communicate a result of the amplification to the variable resistor.

As a result, after the passenger has sat on the seat, the load added to the seat cushion frame causes the seat cushion frame to relatively be displaced with respect to the upper rail against the urging force of the elastic member. The amount of the displacement is detected by the variable resistor. At this time, the amplifying means amplifies the angle of rotation of the link to communicate a result of the amplification to the variable resistor. As a result, the width of the change in the output of the signal from the variable resistor can furthermore be enlarged.

In the first aspect of the present invention, there is provided a deformation detection sensor disposed on a lower rail portion of the seat rail for detecting a predetermined deformation thereon and alarm means for alarming based on output signals of the deformation sensor.

The weight of the passenger sitting on the seat may not be measured accurately when the lower rail portion of the seat rail is deformed owing to the vehicle collision or the like. In the aforementioned construction, however, the deformation occurred in the lower rail portion can be detected by the deformation detection sensor and the passenger is alarmed to abnormality in the sitting passenger detecting function by the alarm means.

There also can be provided with another alarm means for alarming in the case where a changing rate of output signals from the sensor disposed in parallel with the bracket disposed either at the inner side or the outer side in a lateral direction of a vehicle exceeds a predetermined change rate.

When the seat rail and the seat cushion deform owing to the vehicle collision, the weight of the sitting passenger may not be measured accurately. In the above case, the passenger is alarmed to abnormality in the sitting passenger detecting function by the alarm means when a changing rate of output signals from the sensor disposed in parallel with the bracket disposed either at the inner side or the outer side in a lateral direction of a vehicle exceeds a predetermined change rate.

The sensor bar is divided into left and right portions such that each sensor bar has a different spring constant.

The above construction may prevent the left and right sensor bars from resonating even when they vibrate on the vacant seat during running of the vehicle because of the different spring constants of the left and right sensor bars. As a result, lateral vibration of the seat back caused by inversion of vertical resonance phase of the respective sensor bars can be suppressed.

According to a second aspect of the present invention, there is provided a sitting passenger detecting apparatus comprising: first load detecting means for detecting a load added to the front portion of a seating surface of a seat of a vehicle; second load detecting means for detecting a load added to the rear portion of the seating surface; first determining means for determining a fact that a passenger which is sitting on the seat is an adult when the sum of values detected by the first and second load detecting means is not smaller than a first threshold value; and a second determining means for determining a fact that a passenger which is sitting on the seat is an adult when a value detected by the first load detecting means is not smaller than a second threshold value and a value detected by the second load detecting means is not smaller than a third threshold value.

According to a third aspect of the present invention, there is provided a sitting passenger detecting method comprising the steps of: a first load detecting step for detecting a load added to the front portion of a seating surface of a seat of a vehicle; a second load detecting step for detecting a load added to a rear portion of the seating surface; a first determining step for determining a fact that a passenger sitting on the seat is an adult when the sum of values detected in the first and second load detecting steps is not smaller than a first threshold value; and a second determining step for determining a fact that a passenger which is sitting on the seat is an adult when a value detected in the first load detecting step is not smaller than a second threshold value and a value detected in the second load detecting step is not smaller than a third threshold value.

According to the second and third aspects, the sum of the loads added to the front and rear portions of the seating surface of the seat corresponds to the overall load (hereinafter called a "seat load") added to the seating surface of the seat. Therefore, when the sum of the values detected by the first and second load detecting means or in the first and second load detecting steps is not smaller than the first threshold value, a determination can be made that the passenger sitting on the seat is an adult. Note that the first threshold value is determined in accordance with an upper limit of the weights of children.

When an adult passenger has sat on the seat such that the seat back is inclined, the weight exerted from the body of the passenger to the seat back is enlarged. Therefore, the seat load is reduced. Also in the foregoing case, a load corresponding to at least the weight of the body of the passenger is added to the front portion of the seating surface of the seat. Therefore, when the value detected by the first load detecting means or in the load detecting step is not smaller than the second threshold value and the value detected by the second load detecting means or in the load detecting step is not smaller than the third threshold value, a determination can be made that the passenger sitting on the seat is an adult. The second threshold value is determined in accordance with the weight of the body of an adult passenger. The third threshold value is determined in accordance with a value obtained by subtracting the third threshold value from the upper limit of the weights of children.

As described above, according to the second and third aspects, if a passenger sits on the seat such that the seat back is inclined, only detection of the loads added to the front and rear portions of the seating surface of the seat enables a determination of the physique of a passenger, that is, whether the passenger is an adult or a child, to accurately be determined.

In the foregoing case, a third determining means may furthermore be provided which determines that the passenger sitting on the seat is an adult when at least either of values detected by the first and second load detecting means is not smaller than a fourth threshold value. A third determining step may furthermore be provided in which a determination is made that the passenger sitting on the seat is an adult when at least either of values detected in the first and second load detecting steps is not smaller than a fourth threshold value.

When an adult passenger has sat on the seat at a relatively front position, the weight of the passenger exerted from the feet of the passenger on the floor is enlarged. Thus, the seat load is reduced. In the foregoing case, the seat load is sometimes smaller than the first threshold value. However, at least either of the loads added to the front and rear portions of the seating surface of the seat is a value not smaller than a predetermined value which is larger than the weights of children. Therefore, when at least either of the values detected by the first and second load detecting means or at least either of the values detected in the first and second load detecting steps is not smaller than the fourth threshold value, a determination can be made that the sitting passenger is an adult. The fourth threshold value is determined in accordance with the upper limit of the weights of children.

When a passenger has worn a seat belt, the waist of the passenger is restrained by the seat belt. Thus, a consideration can be made that the passenger deeply sits on the seat of the vehicle. In the foregoing case, the weight of the passenger is added to a relatively rear portion of the seating surface of the seat. When a child passenger restraining apparatus (for example, a child seat) facing rearwards is secured by the seat belt, the center of gravity of the child restraining apparatus including the child passenger is moved to the front portion of the seat. Thus, the load of the child restraining apparatus is added to the relatively front portion of the seating surface of the seat. Therefore, a seat-belt joining determining means or a seat-belt joining determining step may be provided so that a result of the determination and values detected by the first and second load detecting means or in the first and second load detecting steps are used to determine whether the child restraining apparatus is joined to be directed rearwards.

In the foregoing case, a structure may be employed in which when the seat belt has been joined and a value detected by the first load detecting means or in the load detecting step is not smaller than a value detected by the second load detecting means or in the second load detecting step, a determination is made that the child restraining apparatus is joined to be directed rearwards.

According a fourth aspect of the present invention, there is provided a sitting passenger detecting apparatus comprising: a seat track disposed between a floor and a seat cushion frame to permit movement of the seat cushion frame in the longitudinal direction with respect to the floor; and a load sensor for detecting a load added to the seat cushion frame in accordance with displacement of the seat cushion frame with respect to an upper rail of the seat track.

Therefore, when the seat has been moved in the longitudinal direction, the movement of the upper rail of the seat track inhibits change in the relative position of the seat cushion frame with respect to the upper rail. As a result, the longitudinal position of the seat does not exert an influence on the displacement of the seat cushion frame with respect to the upper rail caused from the sitting passenger. Hence it follows that the load sensor is able to accurately measure the load added to the seat cushion frame in accordance with the displacement of the seat cushion frame with respect to the upper rail.

According to a fifth aspect of the present invention, there is provided a sitting passenger detecting apparatus comprising: a seat track disposed between a floor and a seat cushion frame to permit movement of the seat cushion frame in the longitudinal direction with respect to the floor; a front connecting portion for connecting the front portion of the seat cushion frame and the front portion of the upper rail of the seat track to each other; and rear connecting portion for connecting the rear portion of the seat cushion frame and the rear portion of the upper rail to each other; a load sensor disposed in a joining portion formed at an offset position in the direction of the width of the seat with respect to the rear connecting portion and arranged to detect a load added to the seat cushion frame in accordance with displacement of the seat cushion frame with respect to the upper rail; and a low-strength portion formed between the rear connecting portion of the upper rail and the sensor joining portion.

Therefore, when the seat has been moved in the longitudinal direction, the movement of the upper rail of the seat track inhibits change in the relative position of the seat cushion frame with respect to the upper rail. As a result, an influence of the longitudinal position of the seat is not exerted on the displacement of the seat cushion frame with respect to the upper rail caused from the sitting passenger. Therefore, the load sensor is able to accurately measure the load added to the seat cushion frame in accordance with the displacement of the seat cushion frame with respect to the upper rail.

The sensor joining portion is provided at the position offset in the widthwise direction of the seat with respect to the rear connecting portion. Moreover, the low-strength portion is formed between the rear connecting portion of the upper rail and the sensor joining portion. Therefore, if the upper rail and the seat cushion frame are firmly joined to each other, any influence is exerted on the displacement of the seat cushion frame with respect to the upper rail. As a result, the rigidity for supporting the seat can be increased without any deterioration in the measuring accuracy of the load sensor so that the seat sitting comfort of the passenger is improved.

In the front connecting portion, the seat cushion frame may rotatively be connected to the upper rail.

As a result, the load of the passenger sitting on the seat causes the seat cushion frame to downwards be rotated with respect to the upper rail such that the front connecting portion serves as the center of the rotation. As a result, the displacement of the seat cushion frame with respect to the upper rail can effectively be transmitted to the load sensor. Thus, the load added to the seat cushion frame can furthermore accurately be measured.

A sound insulating member may be disposed between the sensor joining portion of the upper rail and the sensor joining portion of the seat cushion frame.

If the vehicle runs on a rough area or the like, noise generated when the sensor joining portion of the upper rail and sensor joining portion of the seat cushion frame are brought into contact with each other after a gap has been formed between the two portions owing to movement of the passenger can be prevented by the sound insulating member.

According to a sixth aspect of the present invention, there is provided a sitting passenger detecting apparatus comprising: at least one load detecting means for detecting a vertical load added to a seat body joined to a car-body member; seat-belt load detecting means for detecting a load caused from a tension of the seat belt added to a seat belt anchor secured to the car-body member; direction detecting means for detecting the direction of the load caused from the tension; and estimating means for estimating the weight of the passenger in accordance with the load detected by the load detecting means, wherein the estimating means estimates the vertical load added in between the car body and the seat body owing to the load caused from the tension and subtracts the estimated load from the load detected by the load detecting means so as to estimate the weight of the passenger.

Therefore, the load caused from the tension of the seat belt added to the seat belt anchor is detected, the direction of the load caused from the tension of the seat belt is detected, the vertical load added in between the car-body member and the seat body owing to the load caused from the tension of the seat belt is estimated, and the weight of the passenger is estimated by subtracting the estimated load from the load detected by the load detecting means. Therefore, exertion of the load caused from the tension of the seat belt is inhibited when the weight of the passenger is accurately obtained.

The seat body may be secured to the car-body member through a joining member and the load detecting means may be disposed adjacent to the seat body as compared with the position between the car-body member and the joining member when the positional relationship is viewed along the passage through which the load is transmitted from the seat body to the car-body member.

According to a seventh aspect of the present invention, there is provided a sitting passenger detecting apparatus comprising: at least one load detecting means disposed between a car-body member and a seat body disposed above the car-body member and arranged to detect a vertical load added in between the car-body member and the seat body; and estimating means for estimating the weight of a passenger in accordance with the load detected by the load detecting means, wherein a seat belt anchor is disposed adjacent to the seat body as compared with the load detecting means when the positional relationship is viewed along the passage through which the load is transmitted from the seat body to the car-body member.

As described above, the seat belt anchor is disposed adjacent to the seat body as compared with the load detecting means when the positional relationship is viewed along the passage through which the load is transmitted from the seat body to the car-body member. Thus, the load caused from the tension of the seat belt is not added to the load detecting means. Therefore, the weight of the passenger can accurately be detected by the load detecting means without any influence of the load caused from the tension of the seat belt.

The seat body may be secured to the car-body member through the joining member and the load detecting means may be disposed adjacent to the seat body as compared with the position between the car-body member and the joining member when the positional relationship is viewed along the passage through which the load is transmitted from the seat body to the car-body member.

As described above, the load detecting means is disposed adjacent to the seat body as compared with the car-body member and the joining member when the positional relationship is viewed along the passage through which the load is transmitted from the seat body to the car-body member. Also an influence of change in the load for joining the seat body to the car-body member by using the joining member can reliably be eliminated.

According to an eighth embodiment of the present invention, there is provided a sitting passenger detecting apparatus comprising: at least one load detecting means disposed between a car-body member and a seat body disposed above the car-body member and arranged to detect a vertical load added in between the car-body member and the seat body; estimating means for estimating the weight of a passenger in accordance with the load detected by the load detecting means; and seat-belt-load maintaining means disposed between the car-body member and the seat body and arranged to maintain a load added from the seat belt to the seat body.

Therefore, the load added from the seat belt to the seat body is maintained by the seat-belt-load maintaining means disposed between the car-body member and the seat body. Thus, the load caused from the tension of the seat belt is not substantially added to the load detecting means. Therefore, the weight of the passenger can accurately be detected by the load detecting means without any influence of the load caused from the seat belt.

The seventh and eighth aspects may be structured such that the seat belt anchor is secured to the seat member integrated with the seat body and the load detecting means is disposed between the seat member and the car-body member.

The sixth to eighth aspects may be structured such that a relative-displacement permitting means for permitting the seat body to relatively be displaced in at least the vertical direction with respect to the car-body member owing to the weight of the passenger is disposed between the car-body member and the seat body. Moreover, the load detecting means may be structured to detect change in a physical quantity occurring when the seat body is relatively displaced with respect to the car-body member.

The eighth aspect may be structured such that the relative-displacement permitting means incorporates a plurality of link members pivotally supported by the car-body member and the seat body and relatively inclined in the vertical direction at positions apart from one another.

Each link member may be structured to extend to incline rearwards of the vehicle with respect to the vertical direction when the positional relationship is viewed in a direction from a lower end of the link member to the upper end of the same.

At least one link member is structured to serves as a seat-belt-load maintaining means.

At least one link member may be disposed at substantially the same position of a seat belt in a state of use by a passenger of a standard physique when the positional relationship is viewed in the lateral direction of the vehicle.

DETAILED DESCRIPTION OF THE PREFERRED EMBODIMENTS

A first embodiment of a sitting passenger detecting apparatus according to the present invention will now be described with reference to FIGS. 1 to 4.

In FIGS. 1 to 4, an arrow FR indicates a forward direction of a vehicle, an arrow UP indicates an upward direction of the vehicle and an arrow IN indicates an inward direction of the width of the vehicle.

Figure 4:
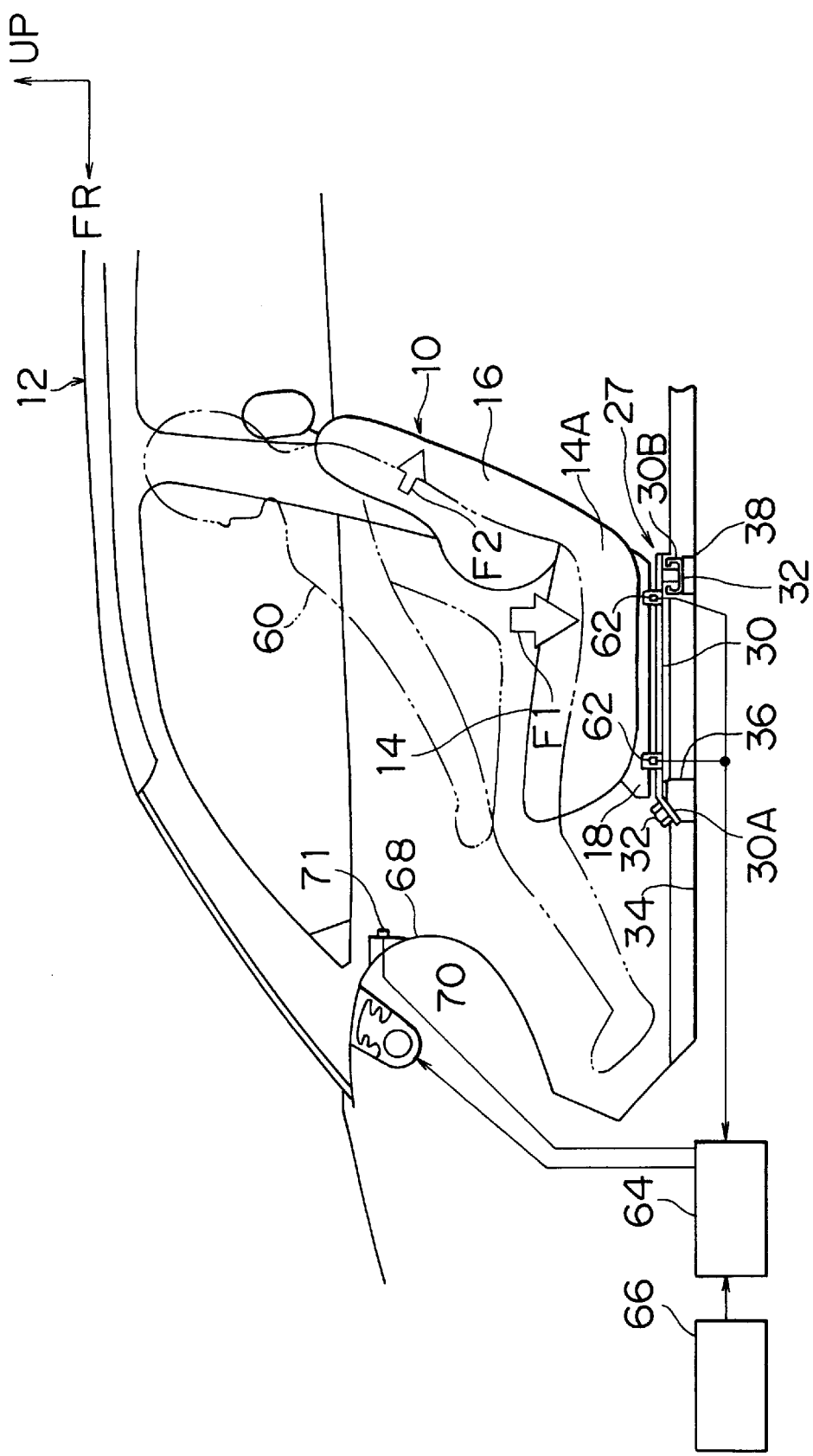
FIG. 4 is a schematic side view showing a portion of a vehicle to which the sitting passenger detecting apparatus according to the first embodiment of the present invention is applied.

As shown in FIG. 4, a seat 10 for a vehicle according to this embodiment constitutes a front passenger seat of a vehicle 12. A seat back 16 rotatable in the longitudinal direction is joined to the rear portion of a seat cushion 14.

Figure 1:
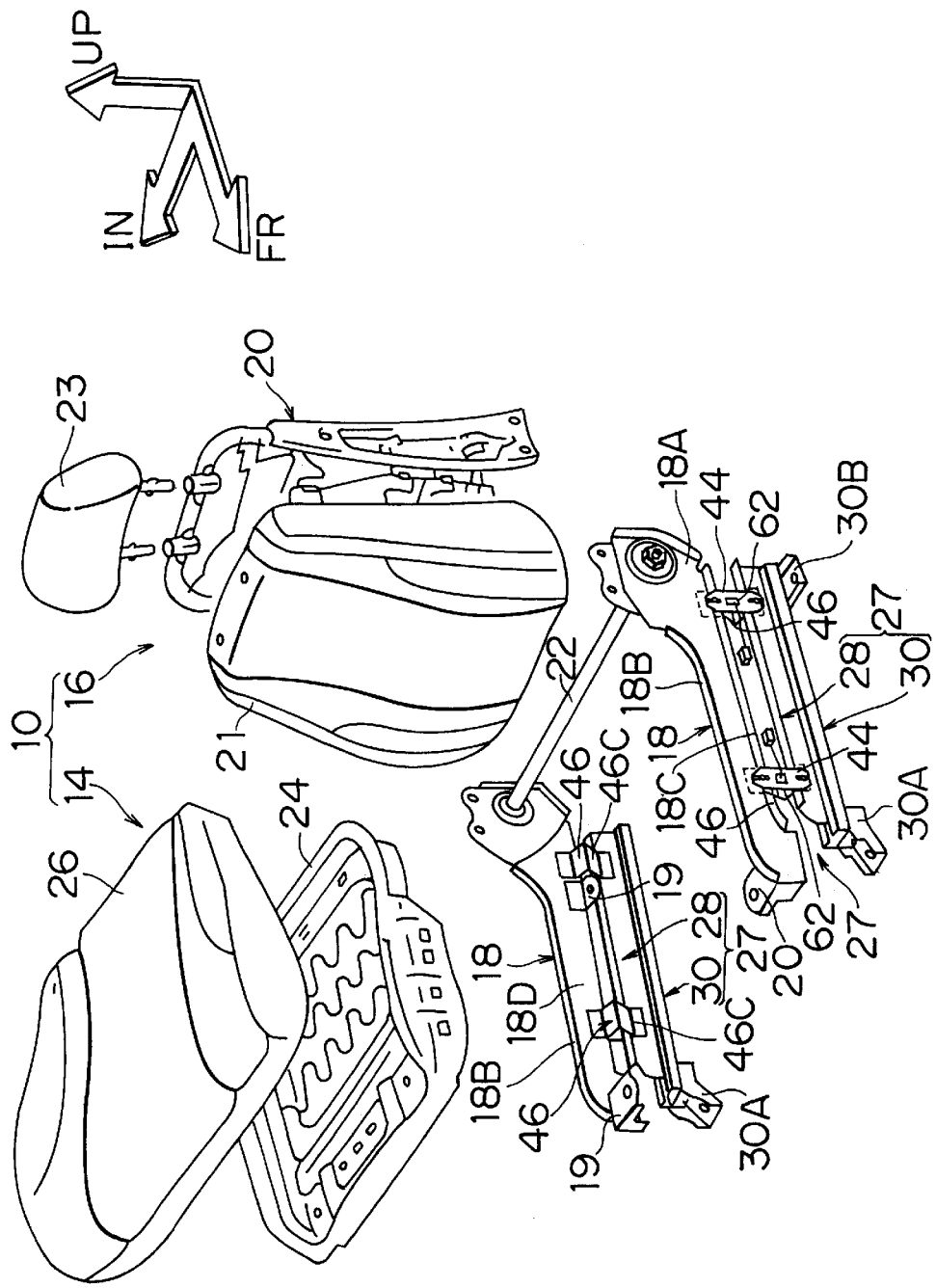
FIG. 1 is an exploded perspective view showing a seat to which a sitting passenger detecting apparatus according to a first embodiment of the present invention when the seat is viewed from a diagonally forward outside position of the vehicle.

As shown in FIG. 1, a shaft 22 is arranged between rear ends 18A of right and left seat cushion frames 18 which form one pair. A seat-back frame 20 to which a seat-back pad 21, a headrest 23 and so forth are installed is joined rotatively about the shaft 22 in the longitudinal direction. A portion in which the seat cushion frames 18 and the seat-back frame 20 are connected to each other is provided with a known reclining mechanism (not shown). Thus, the rearward reclining angle of the seat-back frame 20 with respect to the seat cushion frames 18 can be adjusted.

Flanges 18B and 18C facing outwards in the widthwise direction of the seat are formed in the peripheries at two vertical ends of the seat cushion frames 18. Front and rear joining brackets 19 forming one pair are secured to the inner surfaces of vertical walls 18D of the seat cushion frames 18 in the direction of the width of the seat. A seat-cushion pan 24 is secured to the seat cushion frames 18 through the joining brackets 19. Note that a seat-cushion pad 26 is disposed on the seat-cushion pan 24.

As shown in FIG. 4, joining portions 30A and 30B are formed at the two longitudinal ends of a lower rail 30 of the seat rail 27. The joining portions 30A and 30B are, with bolts 32, secured to front and rear floor cross members 36 and 38 disposed on the floor 34 in the direction of the width of the vehicle.

Figure 3:
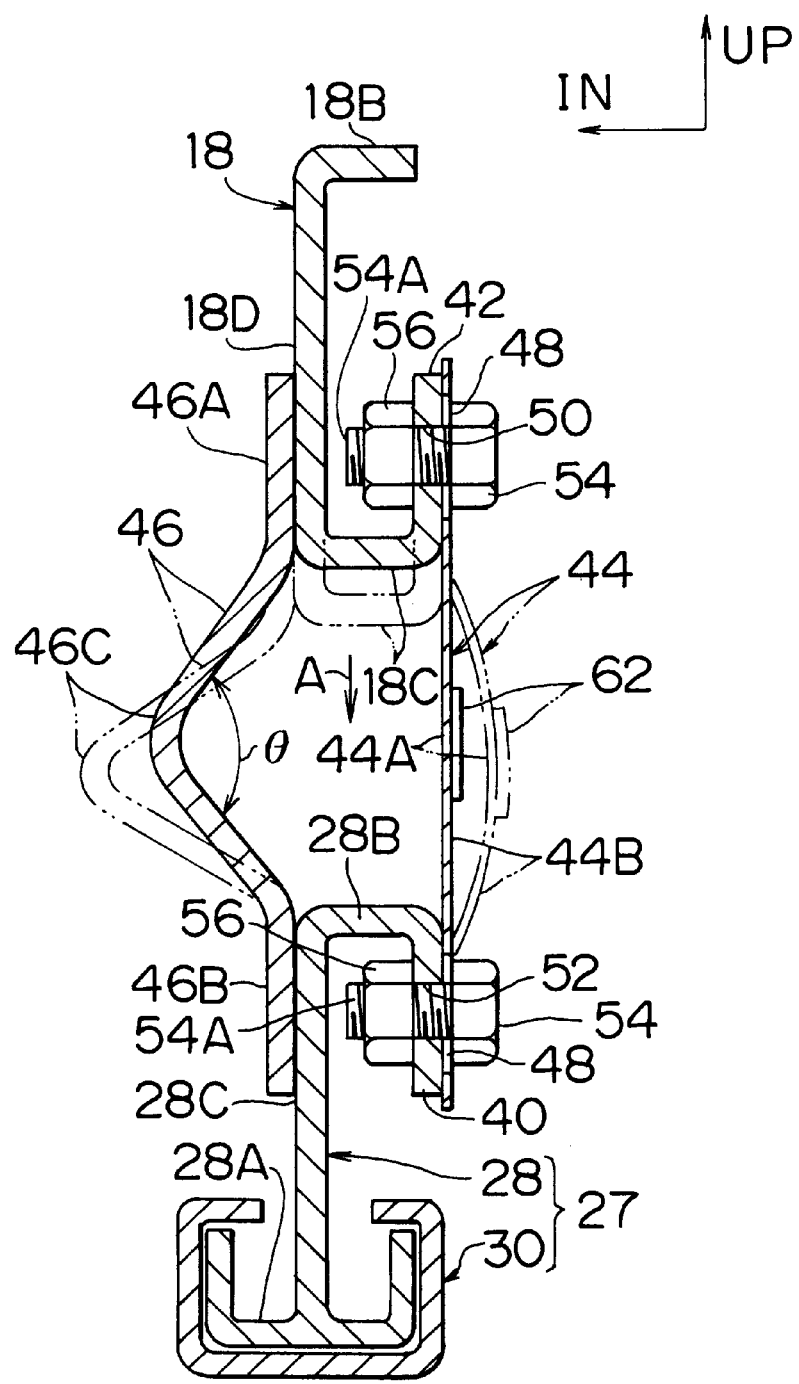
FIG. 3 is an enlarged cross sectional view taken along line III—III shown in FIG. 2.

As shown in FIG. 3, a lower portion 28A of an upper rail 28 of the seat rail 27 is engaged to the lower rail 30 slidably in the longitudinal direction. A flange 28B facing outside in the direction of the width of the seat is formed at the top end of the upper rail 28. Since nails and locking mechanism for fixing the position of the upper rail 28 with respect to the lower rail 30 have known structures, the structures are omitted from description and illustration.

Figure 2:
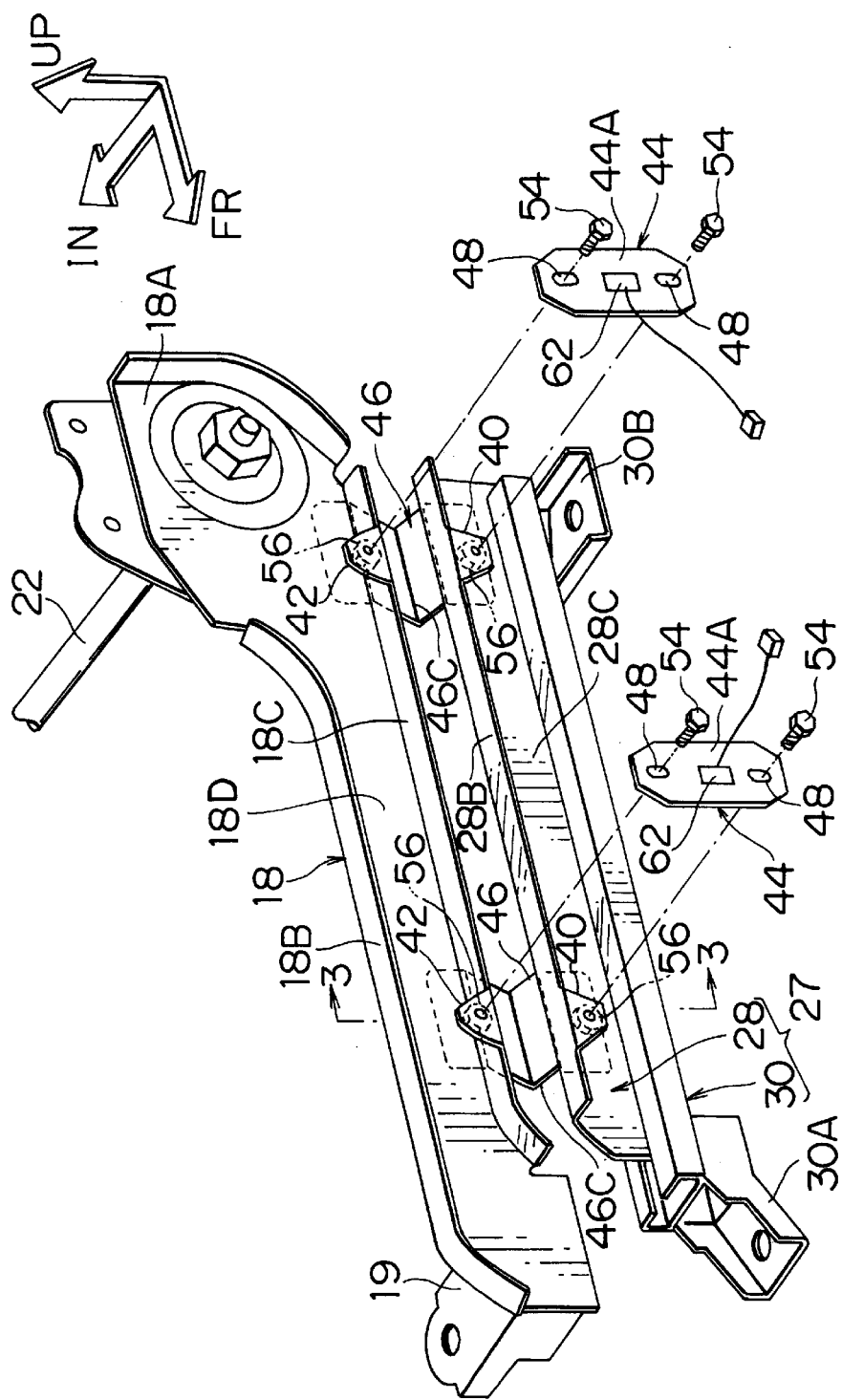
FIG. 2 is an exploded perspective view showing an essential portion of the sitting passenger detecting apparatus according to the first embodiment of the present invention when the apparatus is viewed from a diagonally forward outside position of the vehicle.

As shown in FIG. 2, a sensor joining portion 40 facing downwards is formed adjacent to each of the two longitudinal ends of the flange 28B of the upper rail 28. Each sensor joining portion 40 has an inverted trapezoidal side cross sectional shape. On the other hand, a sensor joining portions 42 facing upwards is formed adjacent to each of the two longitudinal ends of the lower flange 18C of the seat cushion frames 18. Each sensor joining portions 42 has a trapezoidal side cross sectional shape. A thin plate 44 constituting a sensor, which is a displacement detecting means, is arranged between the sensor joining portion 40 of the upper rail 28 and the sensor joining portions 42 of the seat cushion frames 18. The upper rail 28 and the seat cushion frames 18 are connected to each other at a position opposite to the thin plate 44 by a bracket 46 serving as a connecting member. Note that each of the thin plate 44 and the bracket 46 has a rectangular cross sectional shape, the lengthwise direction of which is the vertical direction.

As shown in FIG. 3, the bracket 46 is downwards compressed and deformed as indicated with an alternate long and two dashed line shown in FIG. 3 owing to a vertical load added in between the upper rail 28 and the seat cushion frames 18 so that the distance between the upper rail 28 and the seat cushion frames 18 is changed. Note that the bracket 46 has sufficient rigidity to prevent breakage. After the load has been released, the bracket 46 must restore its original shape indicated with a solid line shown in FIG. 3. Therefore, spring steel must be employed and angle θ of the bent portion must be enlarged. In particular, it is preferable that a flat plate bent into a wedge shape facing side as shown in FIG. 3 is employed if the relationship with near elements is not limited.

A joining hole 48 is formed adjacent to each of two vertical ends of the thin plate 44. The joining holes 48 are formed into elongated holes, the lengthwise direction of each of which is the vertical direction. A joining hole 50 is formed in the sensor joining portions 42 of the seat cushion frames 18. A joining hole 52 is formed in the sensor joining portion 40 of the upper rail 28. Bolts 54 are, from outside in the direction of the width of the seat 10, inserted into the joining holes 48 and 50 and the joining holes 48 and 52. A thread portion 54A of the bolt 54 is engaged to a weld nut 56 disposed at the inner portion of each of the sensor joining portions 42 and 40 in the direction of the width of the seat 10. The bracket 46 has an upper end 46A welded to a vertical wall 18D of the seat cushion frames 18 and a lower end 46B welded to a vertical wall 28C of the upper rail 28. A bent portion 46C formed at an intermediate portion of the bracket 46 in the vertical direction of the bracket 46 has a wedge-like shape facing side when the bent portion 46C is viewed from the longitudinal direction of the seat 10. When a passenger 60 has sat on the seat 10, the load of the passenger 60 downwards compresses and deforms the bent portion 46C of the bracket 46 as indicated with an alternate long and two dashed line shown in FIG. 3. Thus, the seat cushion frames 18 is (in a direction indicated with arrow A shown in FIG. 3) moved downwards. A sensor 62 in the form of a sheet-like shape and serving as a sensor body is disposed on the outer surface 44B of the vertical central portion 44A of the thin plate 44 in the direction of the width of the seat 10. Therefore, when the seat cushion frames 18 has been moved downwards (the direction indicated with arrow A shown in FIG. 3), the vertical central portion 44A of the thin plate 44 is deformed to warp to the outside in the direction of the width of the seat 10. The distortion measuring sensor 62 is able to detect resulted distortion.

As shown in FIG. 4, the distortion measuring sensor 62 is connected to a control unit 64 serving as a weight calculating means. The control unit 64 is connected to an impact detecting sensor 66, a front passenger-seat air-bag apparatus 70 disposed in an instrument panel 68 and an indicator 71 disposed on the instrument panel 68.

In accordance with data of detected impact input from the impact detecting sensor 66 and data input from the distortion measuring sensor 62 for use to determine presence of a passenger and the physique of the passenger, the control unit 64 controls the operation and output of the inflator of a front passenger-seat air-bag apparatus 70. Moreover, when the passenger 60 is not sitting on the seat 10, the control unit 64 turns the indicator 71 on to make a driver or the like to know a fact that the front passenger-seat air-bag apparatus 70 is not operated if a state in which the front passenger-seat air-bag apparatus 70 must be operated owing to collision or whatsoever.

The operation of the first embodiment will now be described.

With the first embodiment structured as described above, the weight of the passenger 60 who has sat on the seat 10 is, as shown in FIG. 4, mainly added to a rear portion 14A of the seat cushion 14 and the seat back 16, as indicated with arrows F1 and F2 shown in FIG. 4. As a result, the upper rail 28 is pressed downwards, causing the bent portion 46C of the bracket 46 to be compressed and deformed downwards, as indicated with the alternate long and two dashed line shown in FIG. 3. Therefore, the seat cushion frames 18 are moved downwards (the direction indicated with arrow A shown in FIG. 3). Hence it follows that the distance from the seat cushion frames 18 to the upper rail 28 is shortened. At this time, as indicated with the alternate long and two dashed line shown in FIG. 3, the vertical central portion 44A of the thin plate 44 is warped outwards in the direction of the width of the seat 10. Therefore, caused distortion can be detected by the sensor 62.

In the first embodiment, the right and left upper rails 28 and the right and left seat cushion frames 18 are connected to each other through front and rear brackets 46 which form a pair. The foregoing connecting portions are formed at offset positions from the portion for joining the sensor 62 in the direction of the width of the seat 10 (in the longitudinal direction of the vehicle). As a result, any influence of the clamping force between the upper rail and the seat cushion frame is not exerted on a value measured by the sensor 62 as distinct from the conventional structure. If the force for connecting the upper rail 28 and the seat cushion frames 18 to each other is enlarged, the detecting accuracy of the sensor 62 does not deteriorate. Hence it follows that the measuring accuracy can be improved and the lateral rigidity of the portion for joining the seat cushion frames 18 to the upper rail 28 can be maintained. As a result, the comfort of the seat can be improved.

According to the first embodiment, change in the load owing to the passenger 60 sitting in the seat 10 can accurately be detected without any influence of the longitudinal slide position of the seat 10.

The first embodiment is structured such that the joining holes 48 of the thin plate 44 is formed into the elongated hole extending in the vertical direction. Therefore, if the bracket 46 is deformed, the clamping position of the joining holes 48 can easily be shifted to a position at which the thin plate 44 is clamped in a state in which no load is added.

Figure 5:
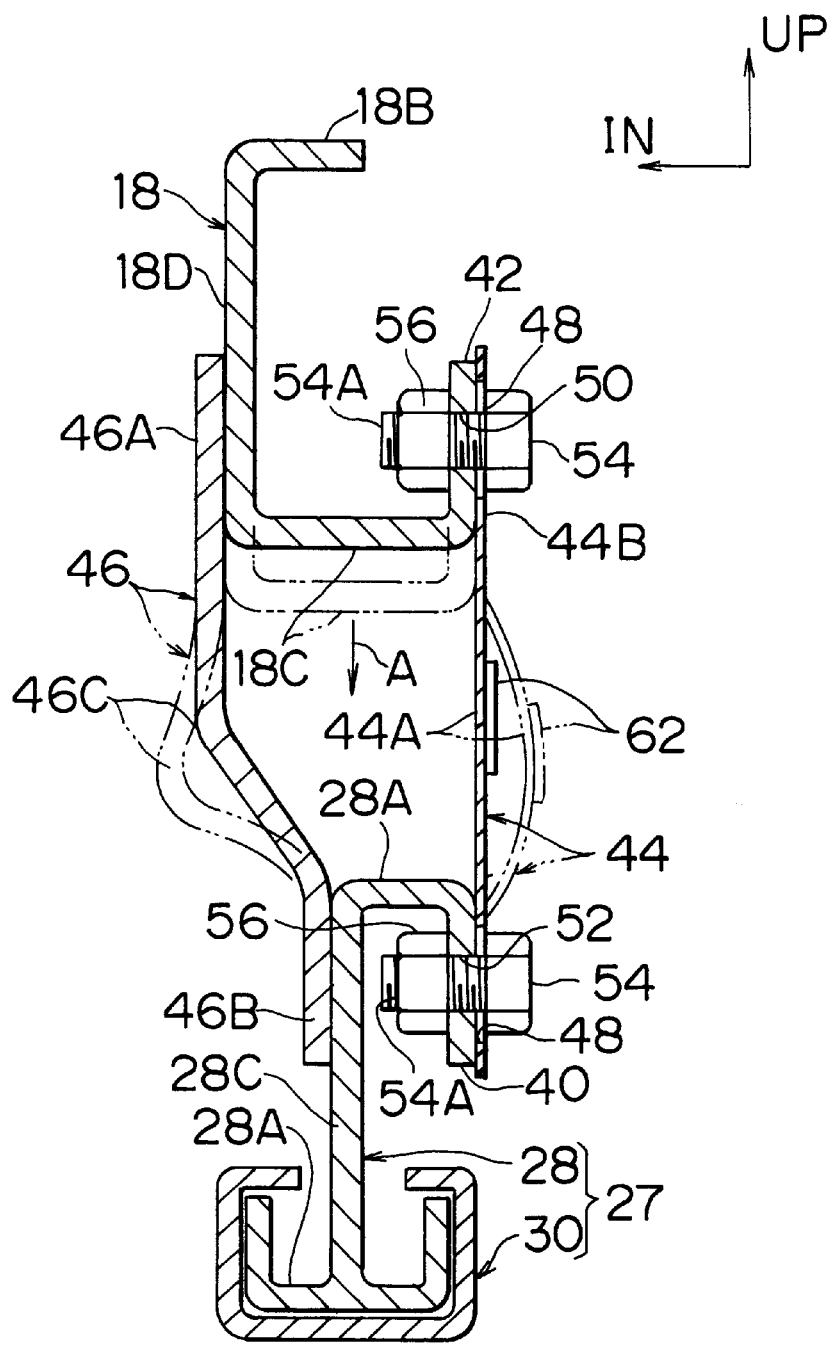
FIG. 5 is a cross sectional view showing the sitting passenger detecting apparatus according to a modification of the first embodiment of the present invention and corresponding to FIG. 3.

As shown in FIG. 3, the first embodiment is structured such that the bent portion 46C of the bracket 46 is formed into the wedge shape facing side when the bent portion 46C is viewed from the longitudinal direction of the seat 10. As an alternative to this, as shown in FIG. 5, the bent portion 46C of the bracket 46 may be bent downwards to the outside in the direction of the width of the seat 10 when the vertical wall 28C of the upper rail 28 is offset to the outside in the direction of the width of the seat 10 with respect to the vertical wall 18D of the seat cushion frames 18. When a load has been added from an upper position, the bent portion 46C may be compressed and deformed in a downward direction as indicated with an alternate long and two dashed line shown in FIG. 5.

Figure 6:
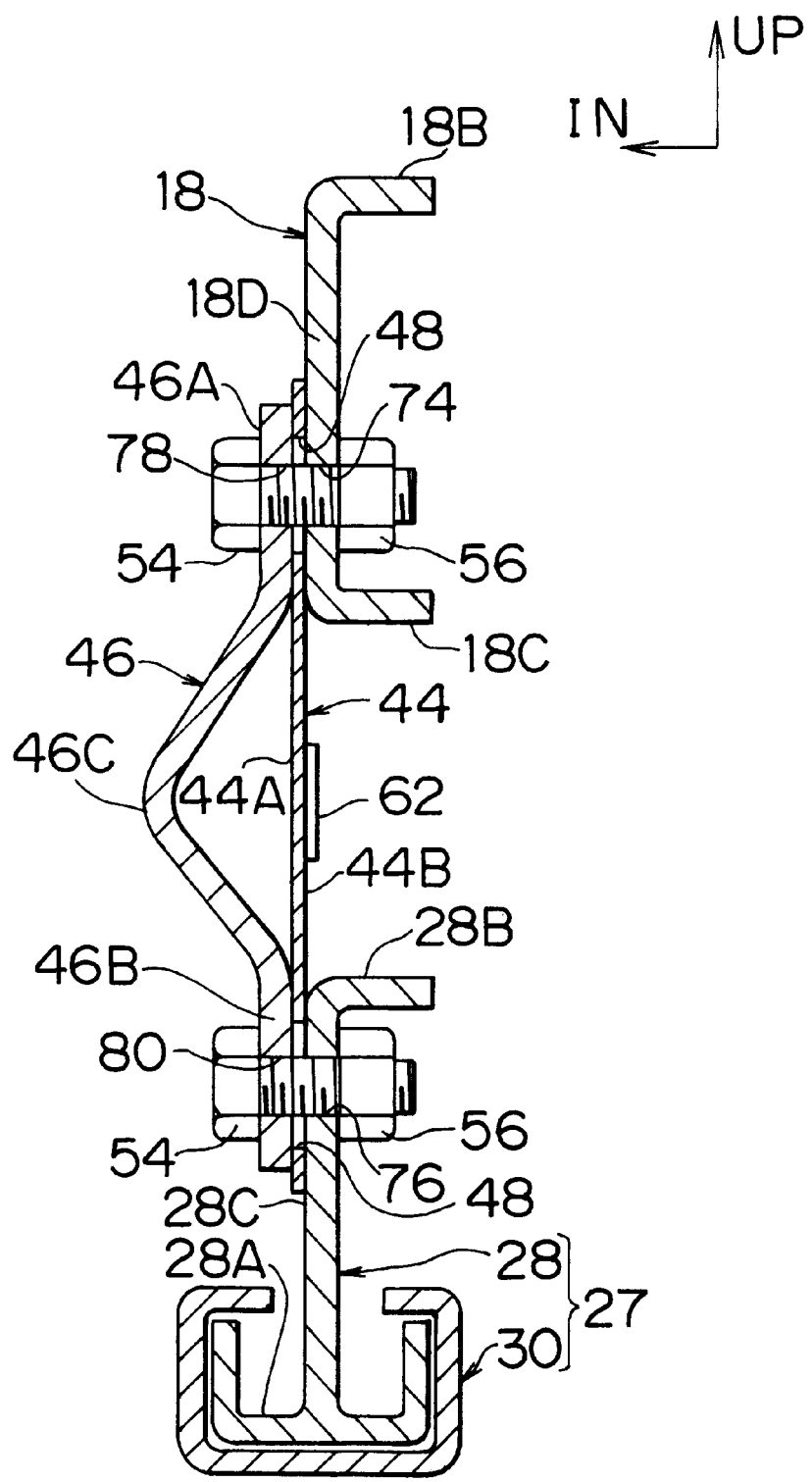
FIG. 6 is a cross sectional view showing the sitting passenger detecting apparatus according to the modification of the first embodiment of the present invention and corresponding to FIG. 3.

A structure as shown in FIG. 6 may be employed in which joining holes 74 and 76 are formed in the vertical wall 18D of the seat cushion frames 18 and the vertical wall 28C of the upper rail 28. Moreover, joining holes 78 and 80 are formed in the two vertical end portions 46A and 46B of the bracket 46. A bolt 54 and a nut 56 are used to join the bracket 46 to the vertical wall 18D of the seat cushion frames 18 and the vertical wall 28C of the upper rail 28. In addition, the thin plate 44 provided with the sensor 62 is clamped in between the vertical wall 18D of the seat cushion frames 18 and the vertical wall 28C of the upper rail 28.

A second embodiment of the sitting passenger detecting apparatus according to the present invention will now be described with reference to FIGS. 7 to 9.

The same elements as those according to the first embodiment are given the same reference numerals and the same elements are omitted from description.

Figure 7:
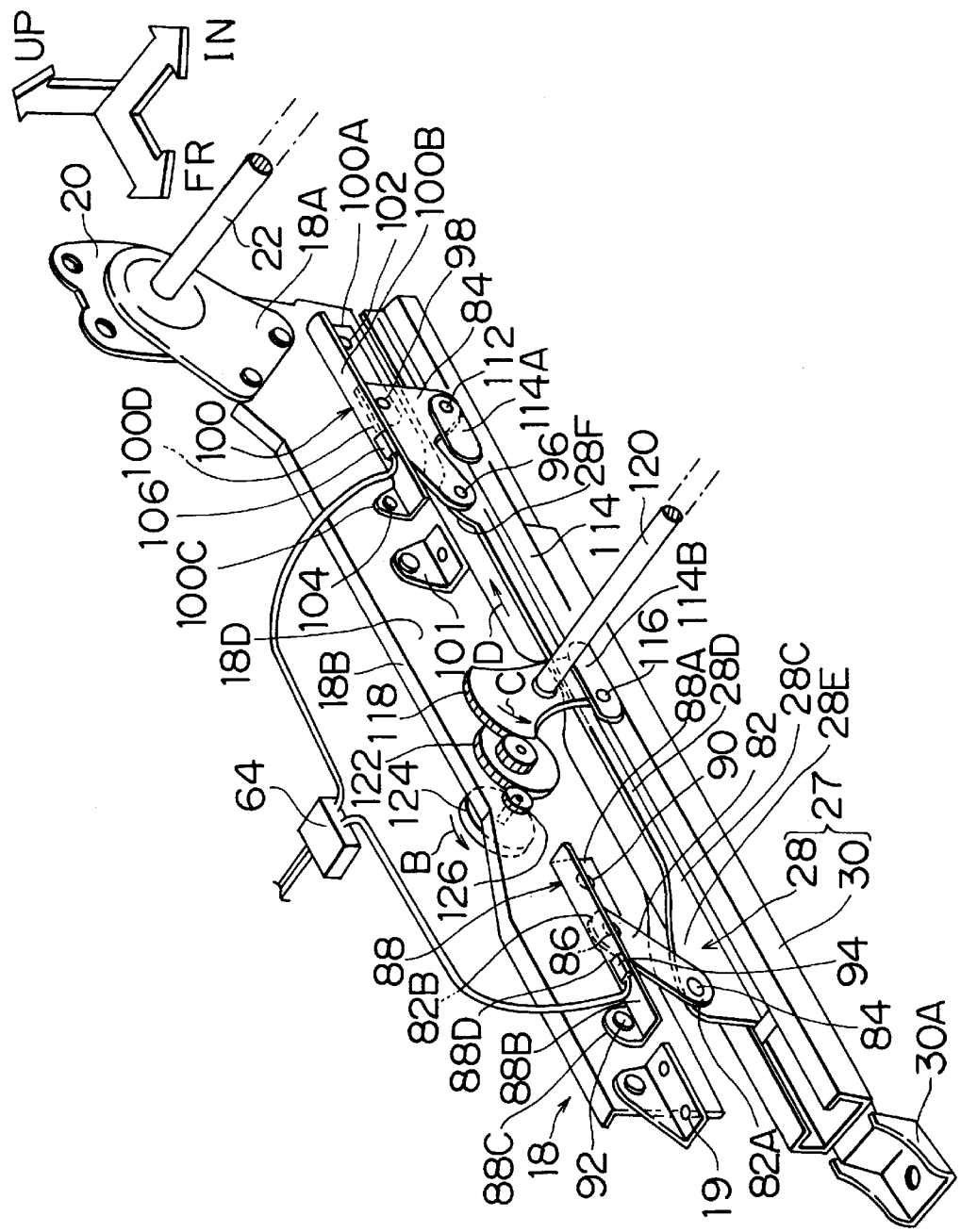
FIG. 7 is a perspective view showing an essential portion of a seat to which a sitting passenger detecting apparatus according to a second embodiment of the present invention is applied.

As shown in FIG. 7, this embodiment is structured such that front and rear links 82 and 84 serving as connecting portion members are disposed on the inner surface of the vertical wall 18D of each of the right and left seat cushion frames 18 (FIG. 7 shows the outside seat cushion frame of the front passenger seat of a left-hand drive car in the direction of the width of the car), the front and rear links 82 and 84 being disposed at positions adjacent to the front end and rear ends, respectively. A front end 82A (the lower end) of the front link 82 is, with a pin 84, rotatively connected to an upper portion 28E of the front end of the vertical wall 28C of the upper rail 28. A rear end (an upper end) 82B of the front link 82 is, with a connecting pin 86, connected to the front portion of a rear vertical wall 88A of a bracket 88 extending in the longitudinal direction.

The rear portion of a rear vertical wall 88A of the bracket 88 is supported by the vertical wall 18D of the seat cushion frames 18 with a pin 90. The bracket 88 incorporates a lateral wall 88B extending in the direction of the width of the seat 10. A rear vertical wall 88A facing downwards is formed in the rear portion of the lateral wall 88B. A front vertical wall 88C facing upwards is provided for the front portion of the lateral wall 88B. The front vertical wall 88C is supported by the vertical wall 18D of the seat cushion frames 18 with a pin 92. An intermediate portion 88D of the lateral wall 88B in the longitudinal direction has no vertical wall. A sensor 94 serving as a displacement detecting means is joined to the upper surface of the intermediate portion 88D. The sensor 94 measures distortion of the longitudinal intermediate portion 88D of the lateral wall 88B of the bracket 88. Note that the sensor 94 is connected to the control unit 64.

Figure 8:
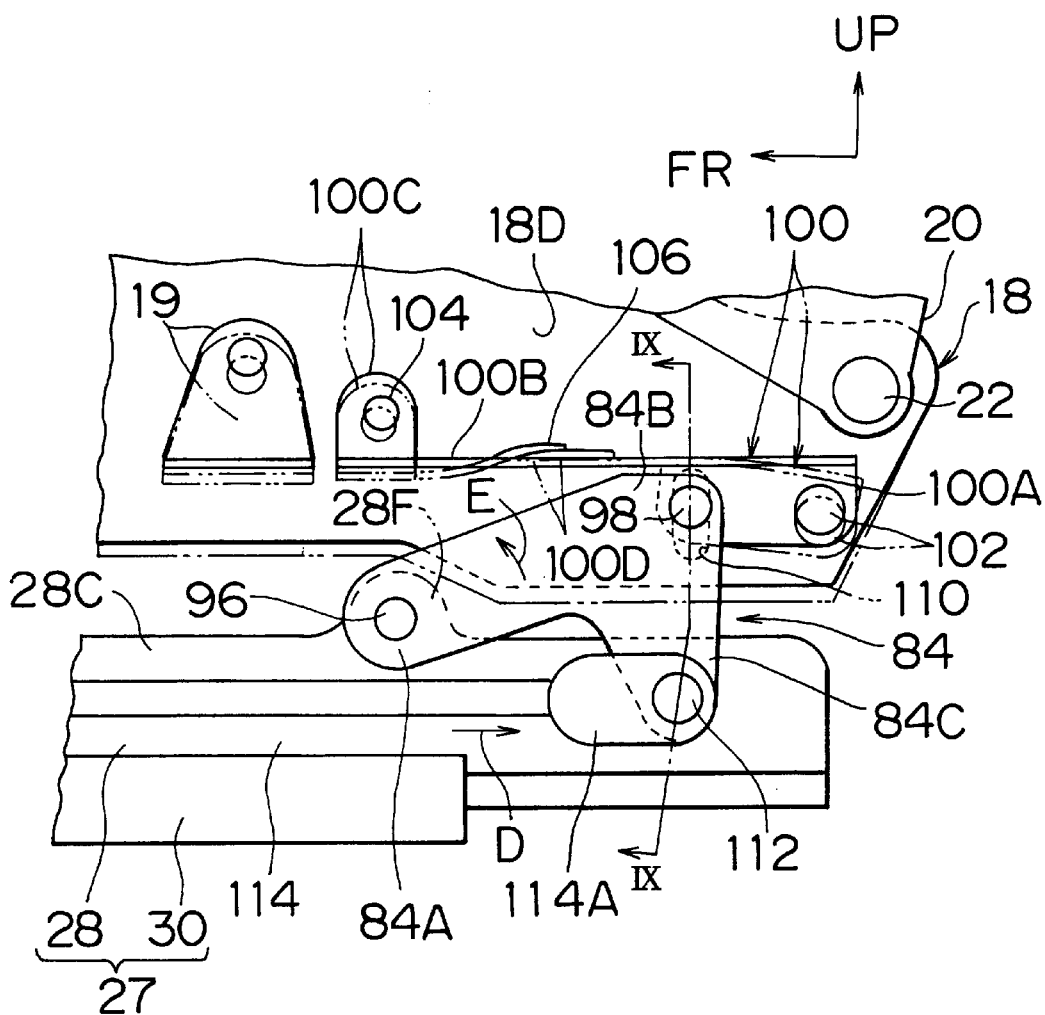
FIG. 8 is a side view showing an essential portion of the seat to which the sitting passenger detecting apparatus according to the second embodiment of the present invention is applied.

As shown in FIG. 8, the rear link 84 has an L-like side cross sectional view. The front end 84A is, with a pin 96, rotatively connected to a projection 28F formed in the upper portion of the rear end of the vertical wall 28C of the upper rail 28. An upper portion 84B of the rear end of the rear link 84 is, with a connecting portion pin 98, connected to the front portion of a rear vertical wall 100A of a bracket 100 extending in the longitudinal direction. The rear vertical wall 100A of the bracket 100 is supported by the vertical wall 18D of the seat cushion frames 18 with a pin 102.

As shown in FIG. 7, the bracket 100 has a lateral wall 100B extending in the direction of the width of the seat 10. A rear vertical wall 100A facing downwards is provided for the rear portion of the lateral wall 100B. A front vertical wall 100C facing upwards is provided for the front portion of the lateral wall 100B. The front vertical wall 100C is, with a pin 104, supported by the vertical wall 18D of the seat cushion frames 18. The longitudinal intermediate portion 100D of the lateral wall 100B has no vertical wall. A sensor 106 is joined to the upper surface of the intermediate portion 100D. The sensor 106 measures distortion of the longitudinal intermediate portion 100D of the lateral wall 100B of the bracket 100. Note that the sensor 106 is connected to the control unit 64.

Figure 9:
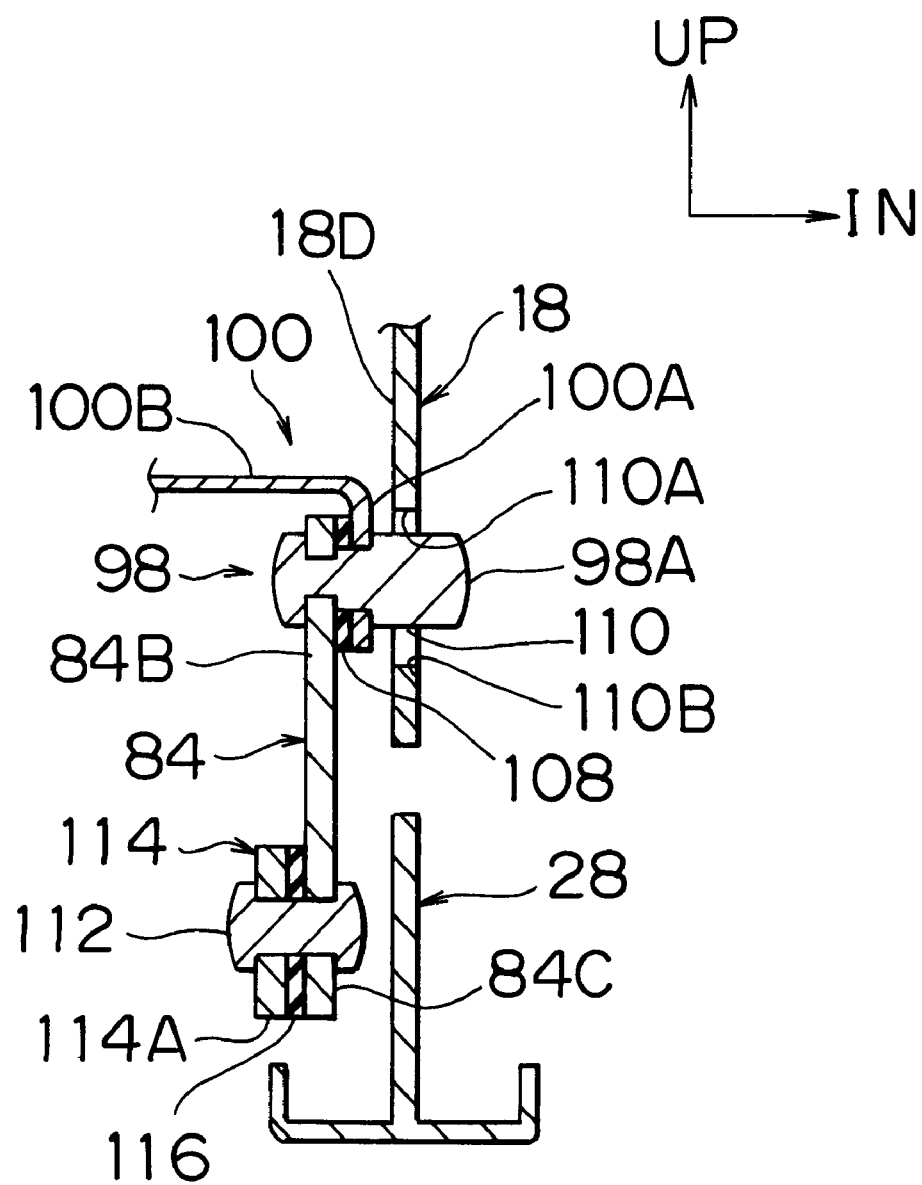
FIG. 9 is an enlarged cross sectional view taken along line IX—IX shown in FIG. 8.

As shown in FIG. 9, an annular resin spacer 108 is disposed between the upper portion 84B of the rear end of the rear link 84 on the outer surface of the connecting pin 98 and the rear vertical wall 100A of the bracket 100. Thus, relative rotation between the bracket 100 and the rear link 84 is permitted. An end 98A of the connecting pin 98 is inserted into an elongated hole 110 formed in the vertical wall 18D of the seat cushion frames 18 and extending in the vertical direction. Thus, vertical movement of the connecting pin 98 for a distance longer than a predetermined distance is inhibited because the connecting pin 98 is brought into contact with the upper edge 110A or the lower edge 110B of the elongated hole 110.

As shown in FIG. 8, the lower portion 84C of the rear end of the rear link 84 is, with a pin 112, rotatively connected to a rear end 114A of a rod 114 extending forwards.

As shown in FIG. 9, an annular resin spacer 116 is disposed between the lower portion 84C of the rear end of the rear link 84 on the outer surface of the pin 112 and the rear end 114A of the rod 114. The rear link 84 is able to rotate with respect to the rod 114.

As shown in FIG. 7, the front end 114B of the rod 114 is connected to a gear 118 with a pin 116. The gear 118 is rotatively supported by a shaft 120 arranged between the right and left seat cushion frames 18. The gear 118 is, through an idle gear 122 provided for the vertical wall 18D of the seat cushion frames 18, connected to a gear 126 secured to a vertical adjustment dial 124 provided for the vertical wall 18D of the seat cushion frames 18, the vertical adjustment dial 124 being operated to perform vertical adjustment. Therefore, when the vertical adjustment dial 124 is rotated in, for example, a forward direction (a direction indicated with arrow B shown in FIG. 7), the gear 118 is rotated forwards (a direction indicated with arrow C shown in FIG. 7) about the shaft 120. Thus, the rod 114 is moved rearwards (a direction indicated with arrow D shown in FIG. 7). When the rod 114 has been moved rearwards, the rear link 84 is rotated counterclockwise (a direction indicated with arrow E shown in FIG. 8) when viewed in FIG. 8 about the pin 96. Thus, the rear portion of the seat cushion frames 18 is moved upwards.

The operation of this embodiment will now be described.

In this embodiment structured as described above, the weight of the passenger 60 sitting on the seat 10 is mainly added to the rear portion 14A of the seat cushion 14 and the seat back 16 as indicated with arrows F1 and F2 shown in FIG. 4. As a result, the seat cushion frames 18 is pressed downwards, causing the seat cushion frames 18 to be moved downwards as indicated with the alternate long and two dashed line shown in FIG. 8. Since the bracket 100 secured to the rear portion of the upper rail 28 through the connecting pin 98 is supported by the rear link 84 joined to the upper rail 28 through the connecting pin 96, the front and rear portion of the bracket 100 across the connecting pin 98, which is the steady point, are distorted downwards. In particular, the longitudinal intermediate portion 100D of the lateral wall 100B having no vertical wall is greatly distorted. Thus, the distortion can be measured by the sensor 106. Then end 98A of the connecting pin 98 is relatively upwards moved in the elongated hole 110 of the seat cushion frames 18. Also in the bracket 88 disposed at the front end of the seat cushion frames 18, the longitudinal intermediate portion 88D of the lateral wall 88B having no vertical wall is greatly distorted. The distortion can be measured by the sensor 94.

Therefore, similarly to the first embodiment, this embodiment is free from change in the relative position between the seat rail 27 and the seat cushion frames 18 if the seat 10 has been slid in the longitudinal direction. Hence it follows that the load added to the seat can accurately be measured. As a result, the accuracy of measuring the weight of the passenger on the seat can be improved.

This embodiment is structured such that the brackets 88 and 100 incorporate the corresponding lateral walls 88B and 100B each having a certain width in the direction of the width of the vehicle. Therefore, the lateral walls 88B and 100B enable the rigidity of the seat in the direction of the width of the seat required for the seat to be maintained. As a result, rolling of the seat occurring when the vehicle is turned can be prevented.

If rotational force is added to the seat owing to collision or whatsoever, this embodiment is able to prevent vertical movement of the rear portion of the seat cushion frames 18 from the upper rail 28 for a distance longer than a predetermined distance because the connecting pin 98 is brought into contact with the upper edge 110A or the lower edge 110B of the elongated hole 110. As a result, breakage of the bracket 100 occurring at a position between the connecting pin 98 and the pin 102 can be prevented.

A third embodiment of the sitting passenger detecting apparatus according to the present invention will now be described with reference to FIGS. 10 to 14.

The same elements as those according to the first embodiment are given the same reference numerals and the same elements are omitted from description.

Figure 10:
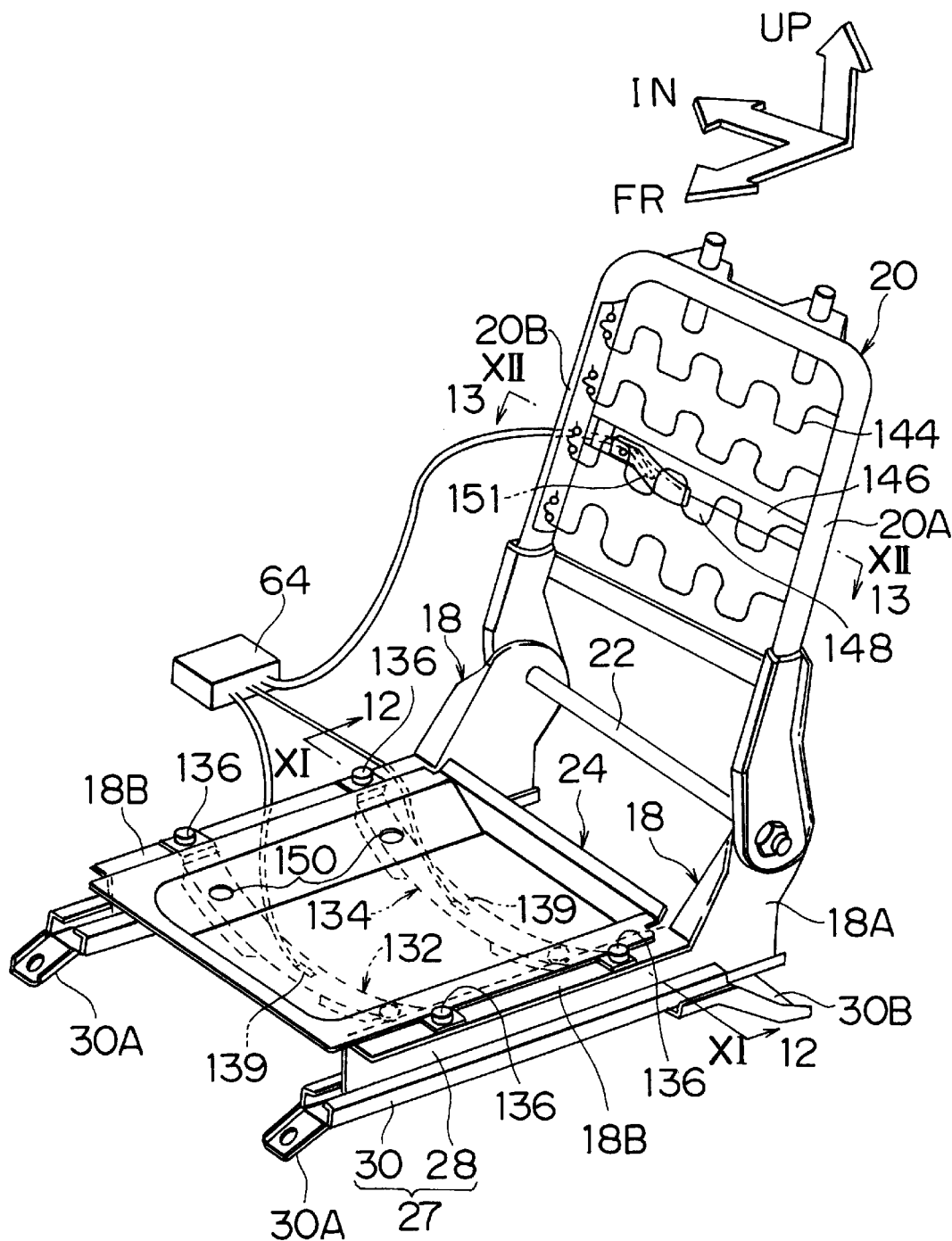
FIG. 10 is a perspective view showing a seat to which the sitting passenger detecting apparatus according to a third embodiment of the present invention is applied when the essential portion is viewed from a diagonally forward outside position of the vehicle.

As shown in FIG. 10, this embodiment has a structure that a front cross bar 132 serving as a connecting member is arranged between front portions of upper flanges 18B of the right and left seat cushion frames 18 which form a pair. A rear cross bar 134 serving as the connecting member is arranged between the rear portions of the upper flanges 18B.

Figure 11:
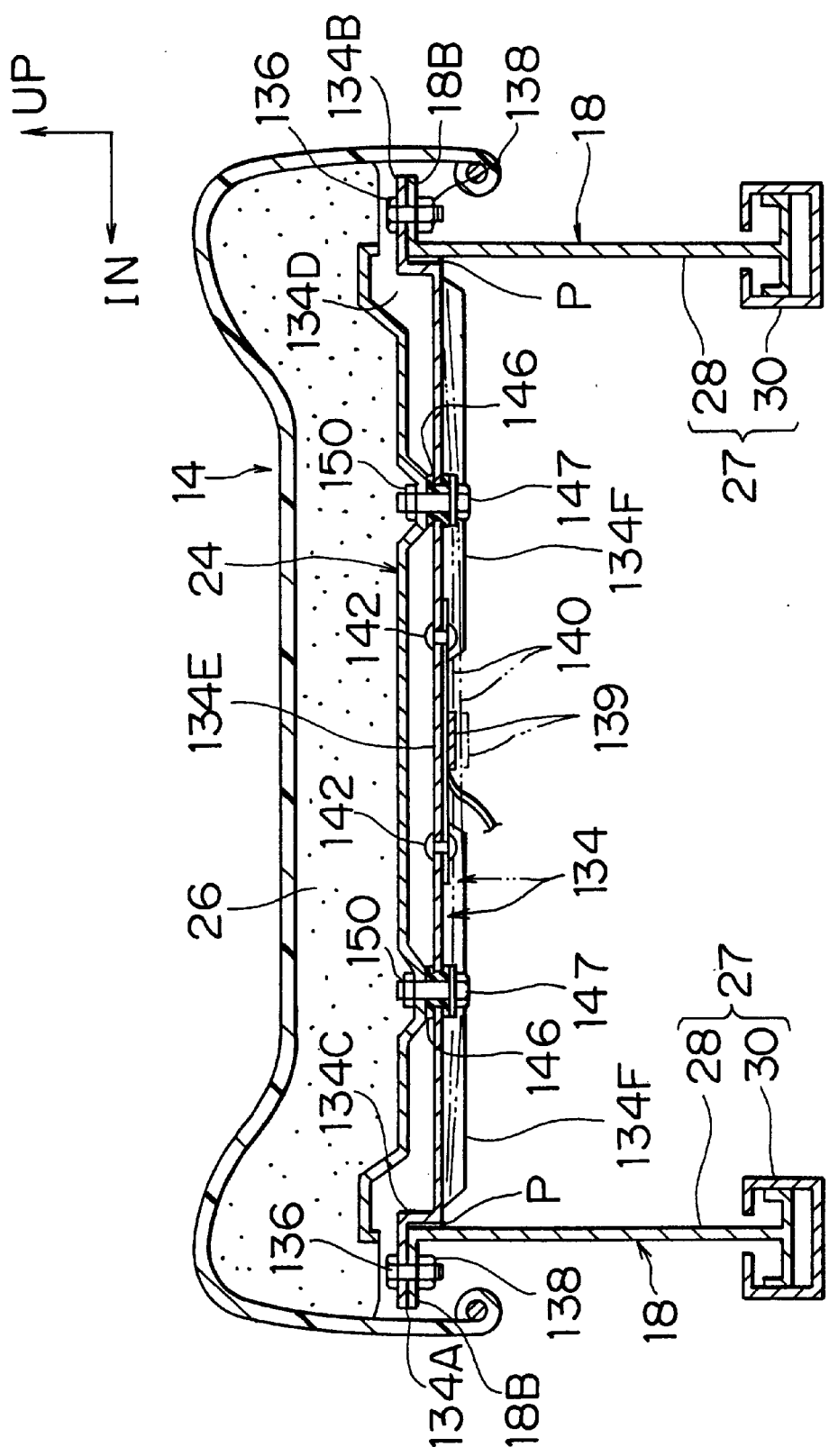
FIG. 11 is an enlarged cross sectional view taken along line XI—XI shown in FIG. 10.

As shown in FIG. 11, the lower portion of the seat cushion frames 18 is formed into the upper rail 28 of the seat rail 27. Two ends 134A and 134B of the rear cross bar 134 are secured to the upper surface of the upper flange 18B of the seat cushion frame 18 with bolts 136 and nuts 138. Vertical walls 134C and 134D are formed adjacent to the two ends 134A and 134B of the rear cross bar 134. A portion for connecting the lower ends of the vertical walls 134C and 134D to each other is formed into a deformation portion 134E.

A joining plate 140 to which a sensor 139 serving as a displacement detecting means is secured is, with right and left rivets 142, secured to the lower surface of the central portion of the deformation portion 134E in the direction of the width of the seat 10. The deformation portion 134E of the rear cross bar 134 is, with bolts 147 and nuts 150, joined to the seat-cushion pan 24 through a rubber bush 146, the deformation portion 134E being joined at a position between the vertical walls 134C and 134D and each of the rivets 142. Flanges 134F facing downwards are formed in the front end portion and the rear end portion of the deformation portion 134E at the positions adjacent to the two ends except for the central portion of the seat 10 in the direction of the width of the seat 10. Therefore, deformation of the seat-cushion pan 24 cannot easily be prevented by the rear cross bar 134. Moreover, deformation is made to be greatest in the central portion of the deformation portion 134E of the rear cross bar 134 to which the sensor 139 is secured in the direction of the width of the seat 10. Thus, the foregoing deformation is detected by the sensor 139.

When the bolt 147 and the nut 150 are disposed in the central portion of the rear cross bar 134 as much as possible, the distortion of the central portion of the deformation portion 134E occurs greatly. However, the bolt 147 and the nut 150 which form the pair are disposed at a position on the outside of the seat in the direction of the width of the seat 10 at which the lateral balance can be kept after a passenger has sat on the seat. When a load is added to the seat-cushion pan 24 from an upper position, the deformation portion 134E is deformed such that the two ends of the deformation portion 134E serve as fulcrums P as indicated with an alternate long and two dashed line shown in FIG. 11. Therefore, the form of deformation, that is, the amount of distortion is made to be free from any influence of deviation of the clamping position using the bolt 136 and the tightening torque.

Also the front cross bar 132 has a similar structure (not shown) to that of the rear cross bar 134.

As shown in FIG. 10, a plurality of seat-back cushion springs 144 are arranged between the right and left side portions 20B and 20A of the seat-back frame 20 at positions apart from one another for predetermined distance in the vertical direction. A rubber bush 146 is arranged between vertical intermediate portions of the side portions 20A and 20B.

Figure 12:
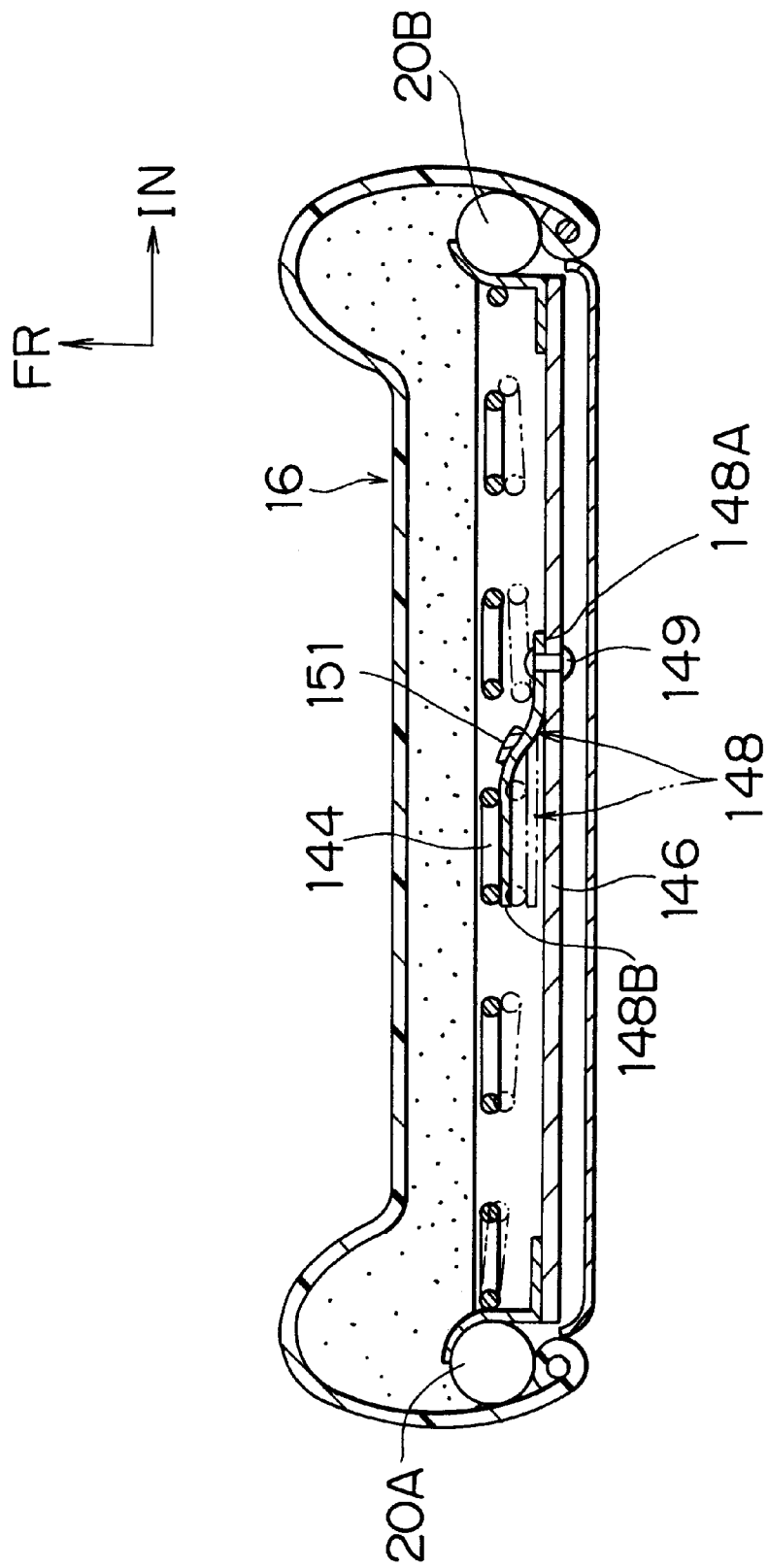
FIG. 12 is an enlarged cross sectional view taken along line XII—XII shown in FIG. 10.

As shown in FIG. 12, an end 148A of a plate 148 constituting a portion of the seat-back sensor serving as the displacement detecting means is, with a securing member 149, such as a rivet, secured to an intermediate portion of the back bar 146 in the direction of the width of the seat 10. Another end 148B of the plate 148 is made contact with the seat-back cushion springs 144 or secured to the same. A sensor body 151 constituting a portion of the seat-back sensor is secured to a lengthwise-directional intermediate portion of the plate 148. The sensor body 151 measures distortion of the plate 148, that is, change in the distance from the back bar 146 to the seat-back cushion springs 144. Therefore, when the seat-back cushion springs 144 have been moved to the back bar 146 and the distance from the seat-back cushion springs 144 to the back bar 146 has been changed as indicated with an alternate long and two dashed line shown in FIG. 12, the change in the distance can be detected by the sensor body 151.

Figure 13:
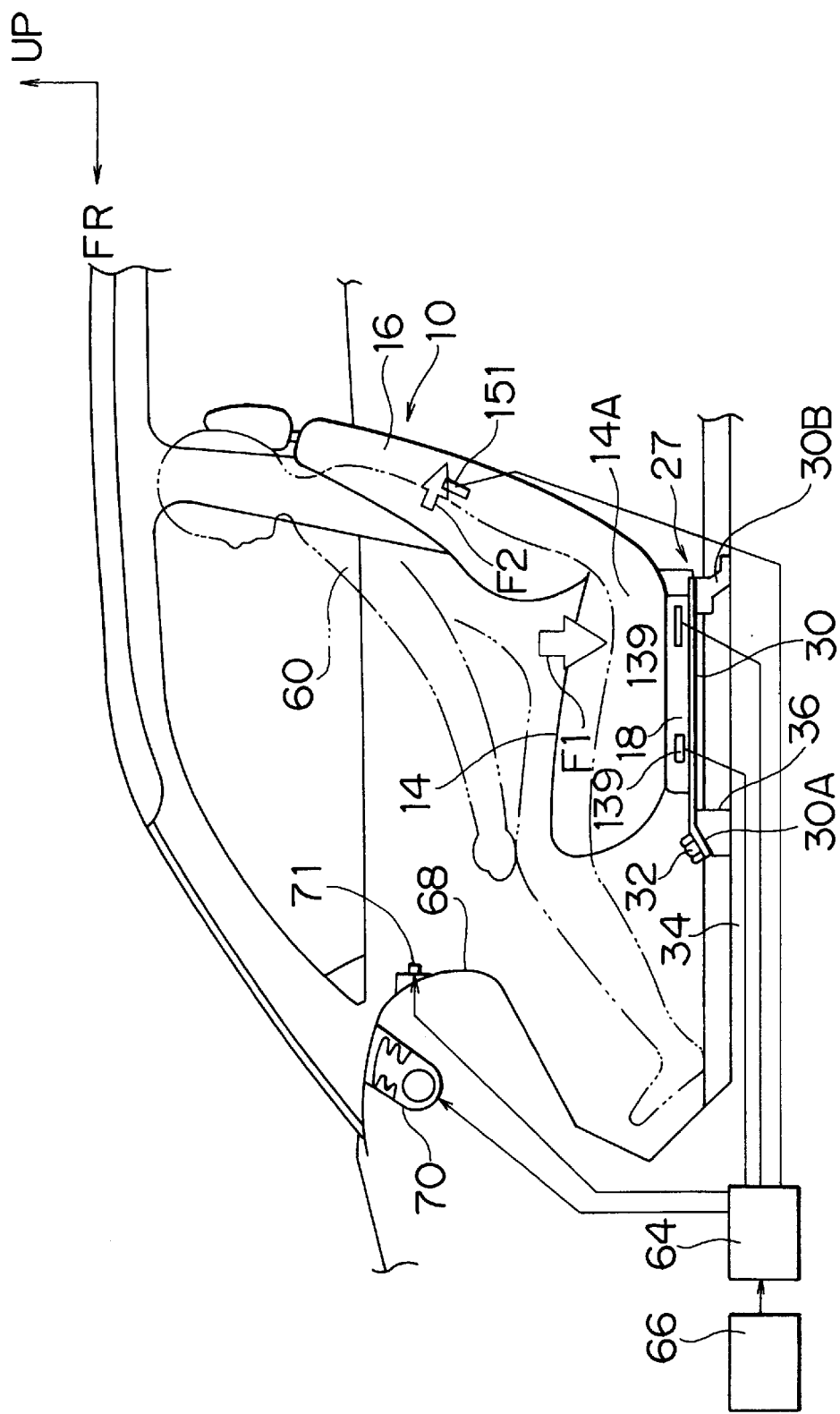
FIG. 13 is a schematic side view showing a portion of a vehicle to which the sitting passenger detecting apparatus according to the third embodiment of the present invention is applied.

As shown in FIG. 13, the two sensors 139 and the sensor 151 are connected to the control unit 64.

The operation of the third embodiment will now be described.

The third embodiment has the structure that the weight of the passenger 60 sitting on the seat 10 is mainly added to the rear portion 14A of the seat cushion 14 and the seat back 16, as indicated with arrows F1 and F2 shown in FIG. 13. As a result, as indicated with the alternate long and two dashed line shown in FIG. 11, the deformation portion 134E of the rear cross bar 134 is distorted. The foregoing distortion is detected by the sensor 139. Also distortion of the front cross bar 132 occurs. The foregoing distortion is detected by the sensor 139. Moreover, the distance from the seat-back cushion springs 144 and the back bar 146 is changed, as indicated with the alternate long and two dashed line shown in FIG. 12. The foregoing change is detected by the sensor 151.

In response to sensor signals from three portions detected by the two sensors 139 and the sensor 151, the control unit 64 calculates the overall load W added to the seat 10 as follows.

That is, to calculate the overall load W (the weight of the passenger) by the control unit 64, the relationship between loads which are added to each sensor and output signal values is previously obtained. Specifically, the relationship among X which is a signal value from the sensor 139 of the front cross bar 132, F(X) which is the load added at this time, Y which is a signal value from the sensor 139 of the rear cross bar 134, F(Y) which is the load added at this time, Z which is a signal value from the sensor 151 of the seat back and F(Z) which is the load added at this time is previously obtained. In the foregoing case, the overall load W is obtained as follows:

$$W=F(X)+F(Y)+G(F(Y)/F(Z))F(Z)$$

Figure 14:
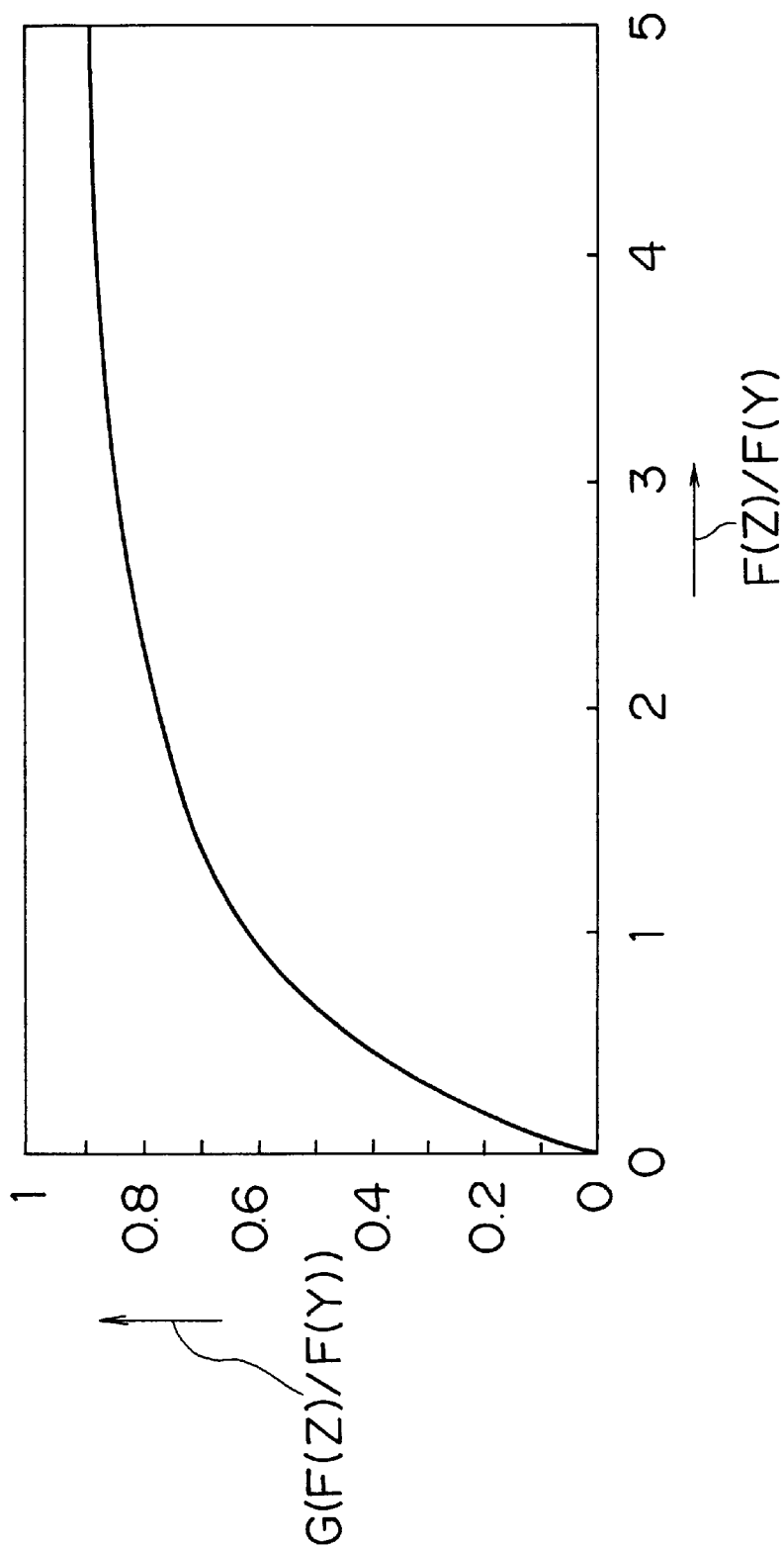
FIG. 14 is a graph showing a function obtained from a load in the rear portion of a seat cushion and a load at a seat back for use in the sitting passenger detecting apparatus according to the third embodiment of the present invention.

The term G(F(Y)/F(Z)) is a function obtainable from the ratio of the load added to the rear portion of the seat cushion and the load added to the seat back. The foregoing function is, for example, as shown in FIG. 14. That is, as the seat back is inclined rearwards with respect to the seat cushion, F(Y)/F(Z) is raised and G(F(Y)/F(Z)) is asymptotic to one.

Therefore, the third embodiment has the structure that the relative position between the seat rail 27 and the seat cushion frames 18 is not changed if the set is slid in the longitudinal direction. As a result, the load added to the seat can accurately be measured. Hence it follows that the accuracy of measuring the weight of the passenger sitting on the seat can be improved. Since a necessity for measuring the reclining angle of the seat back can be eliminated, the weight of the passenger sitting on the seat can accurately be measured with a simple structure.

The third embodiment is structured such that the deformation of the seat-cushion pan 24 caused from the weight of the passenger is transmitted to the sensor 139 through only the front cross bar 132 or the rear cross bar 134. Therefore, generation of an unnecessary load, such as friction, can be prevented as compared with the structure that the sensor is connected to the seat cushion frame through a movable member, such as a rotational hinge. Therefore, the weight of the passenger can furthermore be accurately measured.

Figure 15:
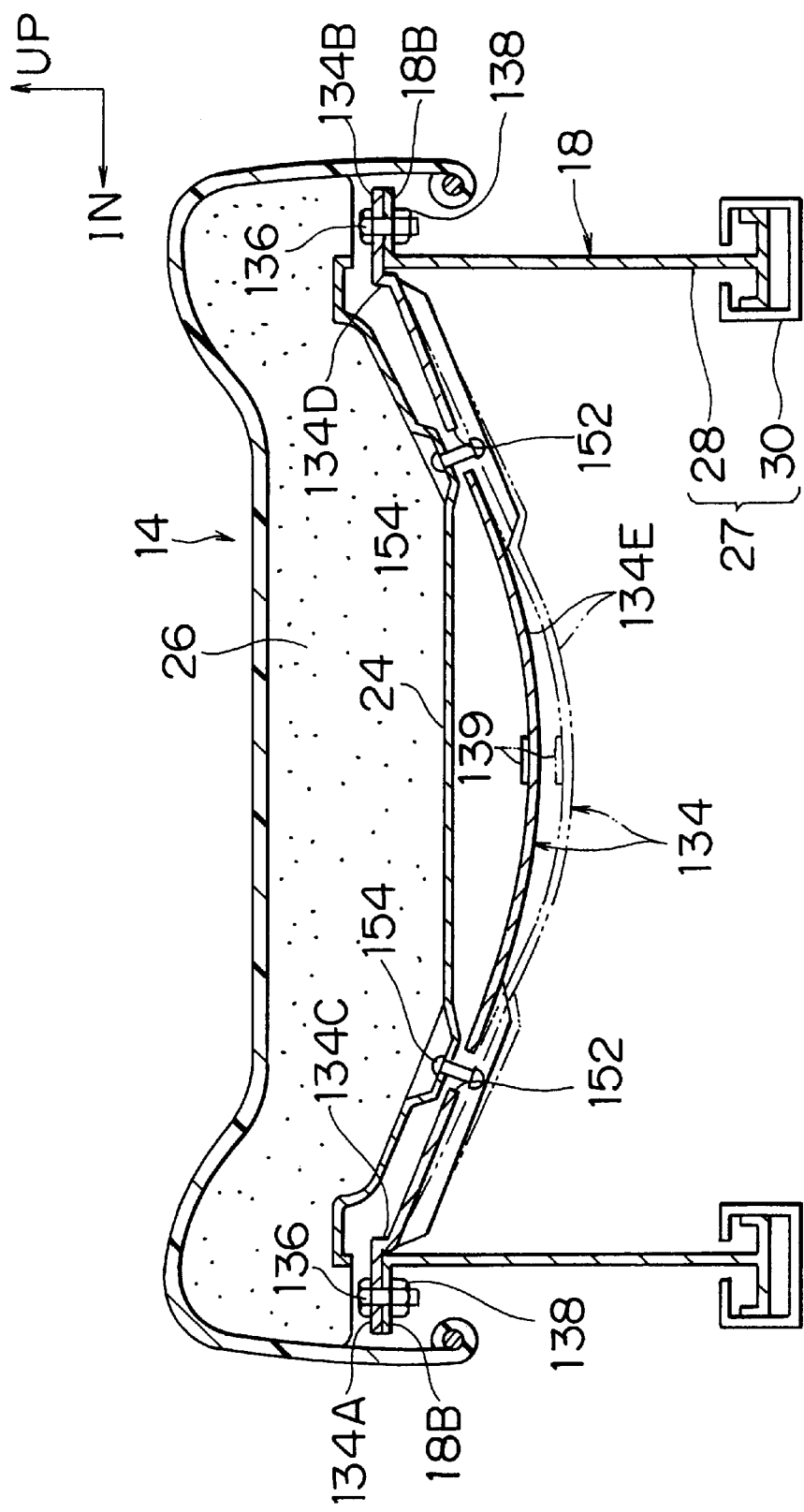
FIG. 15 is a cross sectional view showing a sitting passenger detecting apparatus according to a modification of the third embodiment of the present invention and corresponding to FIG. 11.

The third embodiment has the structure that the rear cross bar 134 and the front cross bar 132 are joined to the seat-cushion pan 24 with the bolt 147 and the nut 150 through the rubber bush 146. Another structure arranged as shown in FIG. 15 may be employed in which elongated holes 152 extending in the direction of the width of the seat and forming a pair are formed in the rear cross bar 134 (also the front cross bar 132). Moreover, pins 154 movably inserted into the elongated holes 152 are used to connect the rear cross bar 134 to the seat-cushion pan 24.

A fourth embodiment of the sitting passenger detecting apparatus according to the present invention will now be described with reference to FIGS. 16 and 17.

The same elements as those according to the first embodiment are given the same reference numerals and the same elements are omitted from description.

Figure 16:
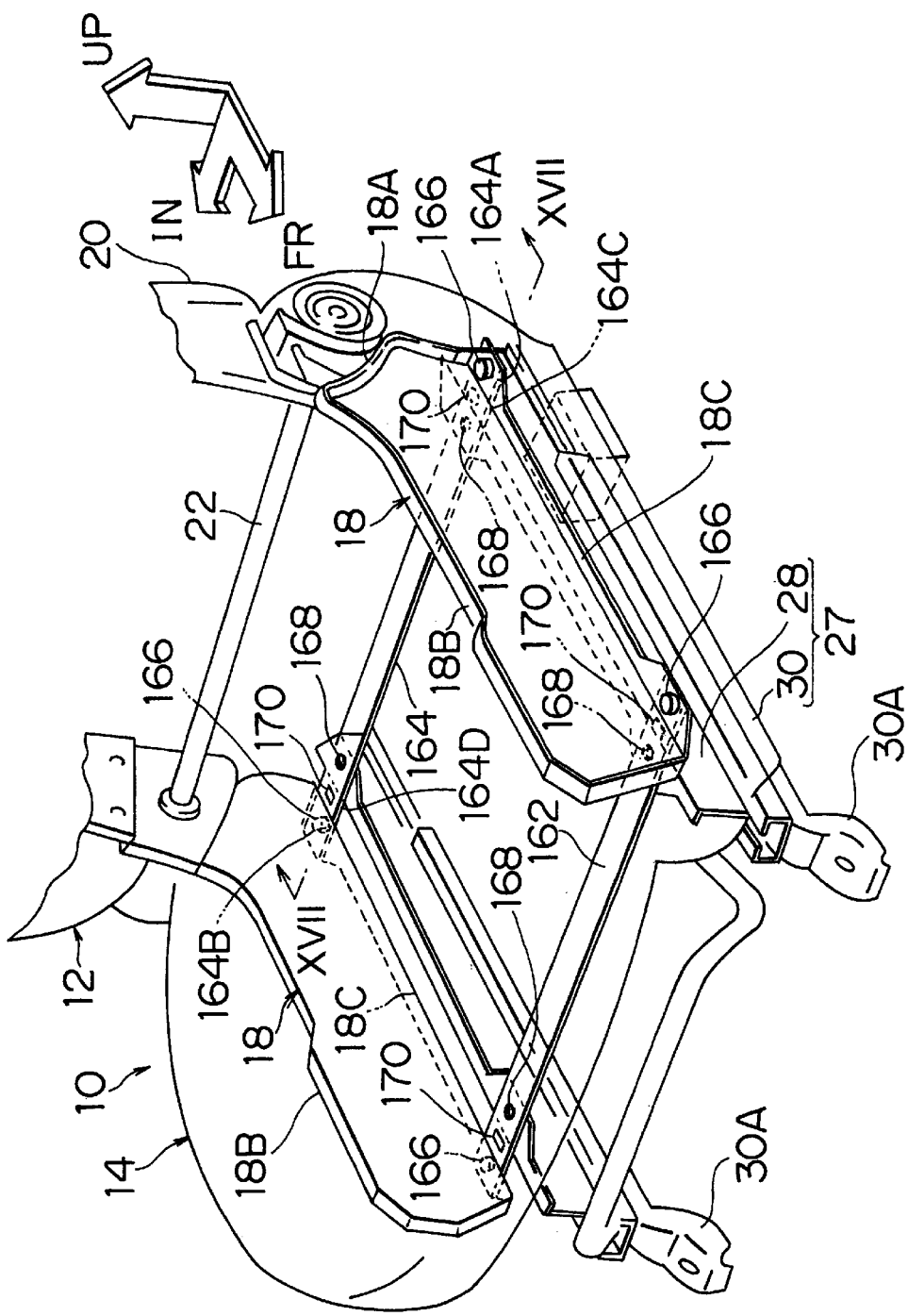
FIG. 16 is a perspective view showing an essential portion of a seat to which a sitting passenger detecting apparatus according to a fourth embodiment of the present invention is applied when the essential portion is viewed from a diagonally forward outside position of the vehicle.

As shown in FIG. 16, the fourth embodiment has a structure that a front sensor bar 162 serving as a connecting member is arranged between front portions of the lower flanges 18C of the right and left seat cushion frames 18 forming a pair. A rear sensor bar 164 serving as a connecting member is arranged between rear portions of the lower flanges 18C.

Figure 17:
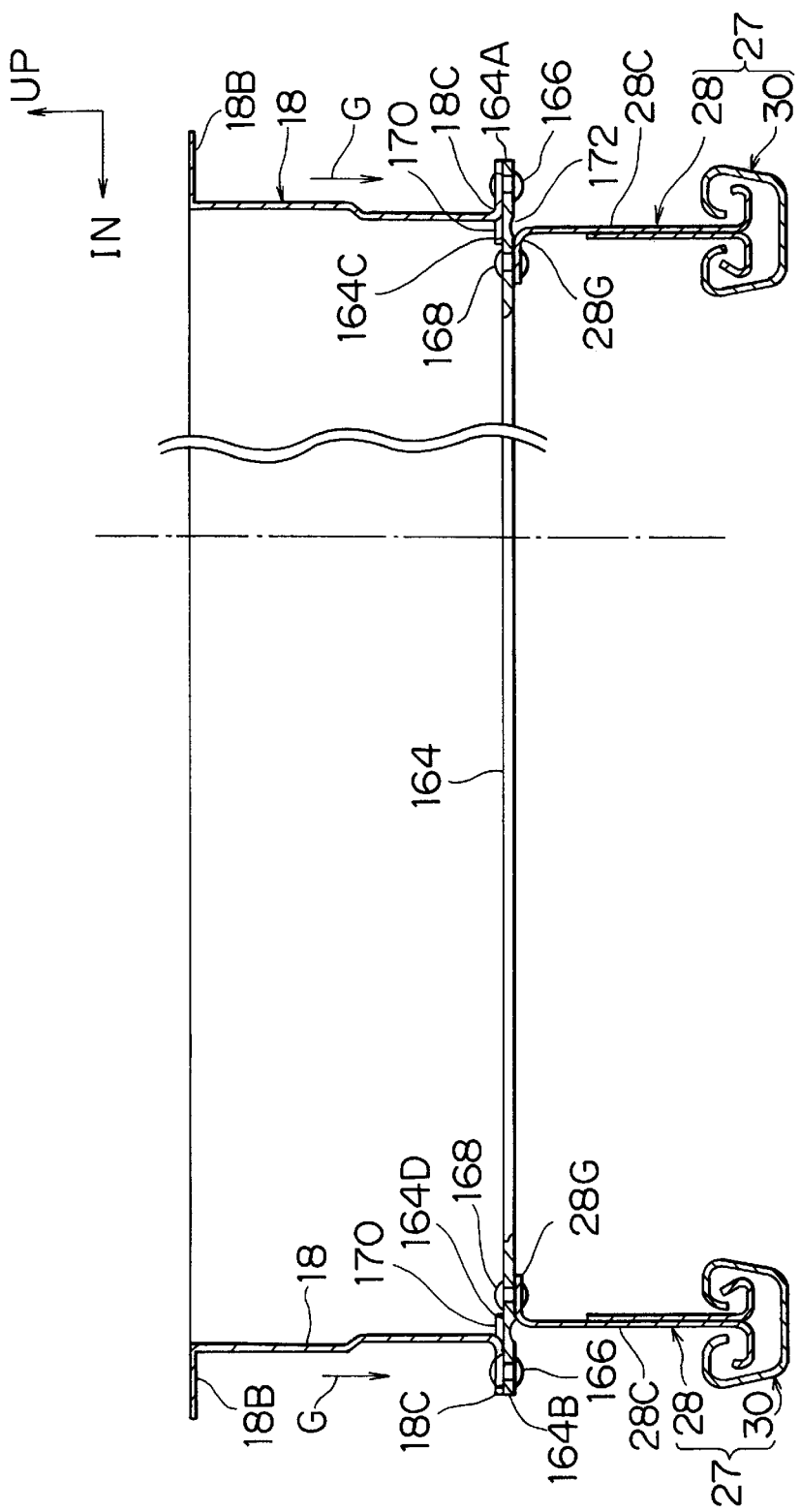
FIG. 17 is an enlarged cross sectional view taken along XVII—XVII shown in FIG. 16.

As shown in FIG. 17, the right and left seat cushion frames 18 forming the pair and the seat rail 27 (the vertical wall 28C of the upper rail 28) are offset in the direction of the width of the vehicle. Two ends 164A and 164B of the rear sensor bar 164 are secured to the lower surfaces of the lower flanges 18C of the seat cushion frames 18 with securing members 166, such as rivets. The portions adjacent to the inner portions of the two ends 164A and 164B of the rear sensor bar 164 in the direction of the width of the seat 10 are, with securing members 168, such as rivets, secured to the upper surface of an upper flange 28G formed at the upper end of each upper rail 28 to be directed inwards in the direction of the width of the seat 10.

Sensors 170 serving as the displacement detecting means are disposed on the upper surfaces of intermediate portions 164C and 164D between the securing member 166 and the securing member 168 of the rear sensor bar 164. The foregoing sensors 170 detect distortion of each of the intermediate portions 164C and 164D of the rear sensor bar 164. Note that the foregoing sensors 170 are connected to the control unit 64 (not shown).

A recess 172 serving as a thickness-reduced portion and having a semicircular cross sectional shape is formed in the lower surface of the rear sensor bar 164 at a position at which the sensor 170 is disposed. Thus, the rear sensor bar 164 can reliably be bent and deformed at the foregoing position. Note that also the front sensor bar 162 has a similar structure to that of the rear sensor bar 164.

The operation of the fourth embodiment will now be described.

The fourth embodiment having the above-mentioned structure is arranged such that the weight of the passenger sitting on the seat is mainly added to the rear portion 14A of the seat cushion 14 and the seat back 16 as indicated with arrows F1 and F2 shown in FIG. 4. As a result, the seat cushion frames 18 is moved downwards (in the direction indicated with arrow G shown in FIG. 18). Therefore, the intermediate portions 164C and 164D of the rear sensor bar 164 to which the sensors 170 are provided are bent and deformed. The caused distortion is detected by the sensors 170. Also the front sensor bar 162 is deformed similarly to the rear sensor bar 164. Thus, the distortion of the front sensor bar 162 is detected by the sensors 170. In accordance with detected values, the control unit 64 calculates the weight of the passenger.

Therefore, also the fourth embodiment is arranged such that the relative position between the seat rail 27 and the seat cushion frames 18 is not changed if the seat is slid in the longitudinal direction. As a result, the load added to the seat can accurately be measured. Therefore, the accuracy of measuring of the weight of the passenger sitting on the seat can be improved. Since the necessity for measuring the reclining angle of the seat back can be eliminated, the measurement can accurately be performed with a simple structure.

Since the fourth embodiment has the structure that the intermediate portions 164C and 164D of the rear sensor bar 164 in which the sensors 170 are disposed can reliably be bent and deformed thanks to the recesses 172, the weight of the passenger sitting on the seat can furthermore accurately be measured.

The fourth embodiment has the structure as shown in FIG. 17 such that the seat cushion frames 18 is secured to the outside of the joining portion of the upper rail 28 at the two ends 164A and 164B of the rear sensor bar 164 in the direction of the width of the seat 10. As an alternative to this, a structure may be employed in which the upper rail 28 is secured to the two ends 164A and 164B of the rear sensor bar 164 on the outside of the portion for securing the seat cushion frames 18 in the direction of the width of the seat. Although the recesses 172 serving as the thickness-reduced portions and each having the semicircular cross sectional shape are formed, the cross sectional shape of the recess 172 is not limited to the semicircular shape. Another shape may be employed.

A fifth embodiment of the sitting passenger detecting apparatus according to the present invention will now be described with reference to FIGS. 18 to 23.

Figure 18:
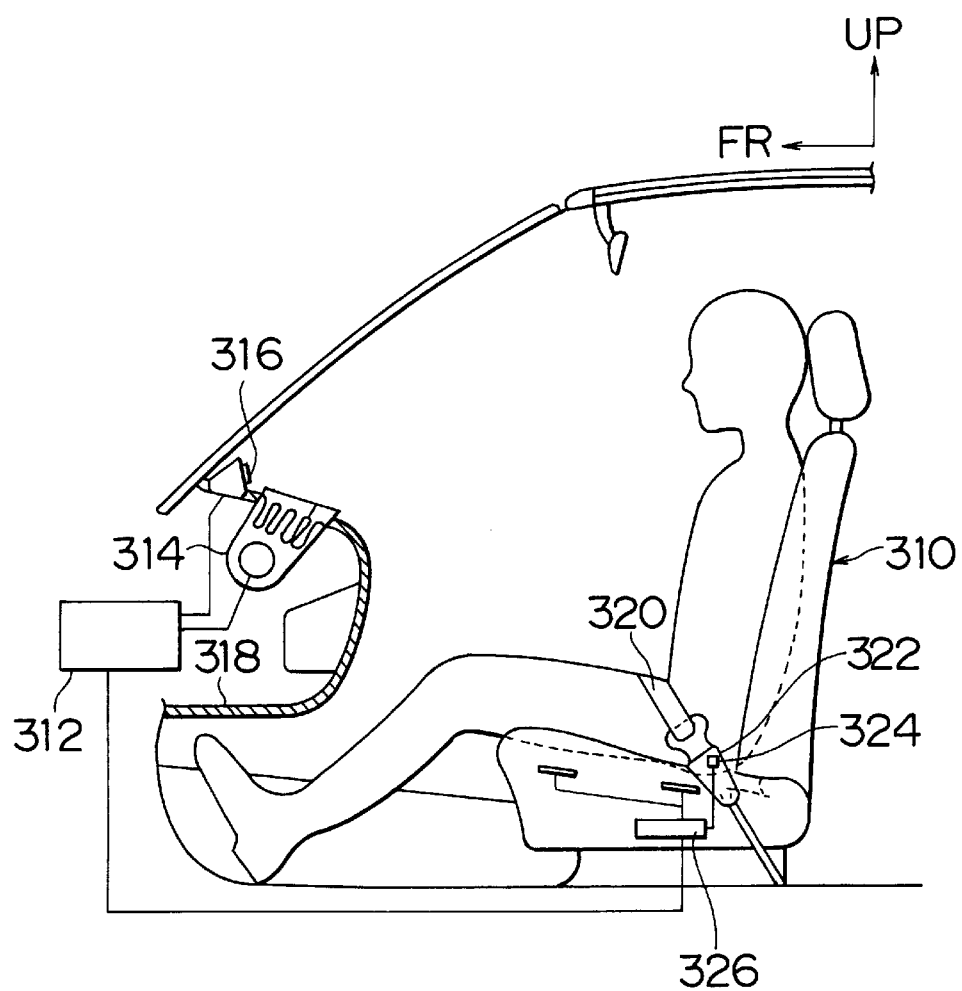
FIG. 18 is a diagram showing the section obtained by cutting a system according to a fifth embodiment of the present invention at the center of the front passenger seat in the widthwise direction of the vehicle.

FIG. 18 is a cross sectional view obtained by cutting a system according to the fifth embodiment of the present invention along a plane passing through the central portion of the front assistance seat in the direction of the width of the vehicle. As shown in FIG. 18, the system according to the fifth embodiment incorporates an air-bag controller 312. An air-bag module 314 and an indicator 316 are connected to the air-bag controller 312. The air-bag module 314 and the indicator 316 are provided for an instrument panel 318 of the vehicle. The air-bag module 314 is supplied with a predetermined operation signal from the air-bag controller 312 so that the air-bag module 314 is operated. The indicator 316 is supplied with a predetermined turning-on signal from the air-bag controller 312 so that the indicator 316 is turned on. The air-bag controller 312 turns the indicator 316 on during a period in which the air-bag controller 312 inhibits the operation of the air-bag module 314.

A buckle 322 of a seat belt 320 is provided with a seat-belt joint sensor 324. The seat-belt joint sensor 324 is connected to a seat sensor controller 326. The seat-belt joint sensor 324 outputs a predetermined belt joint signal to the seat sensor controller 326 when the seat belt 320 has been joined. The seat sensor controller 326 determines whether or not the seat belt 320 has been joined in response to an output signal from the seat-belt joint sensor 324. Note that the seat sensor controller 326 is connected to the air-bag controller 312.

Figure 19:
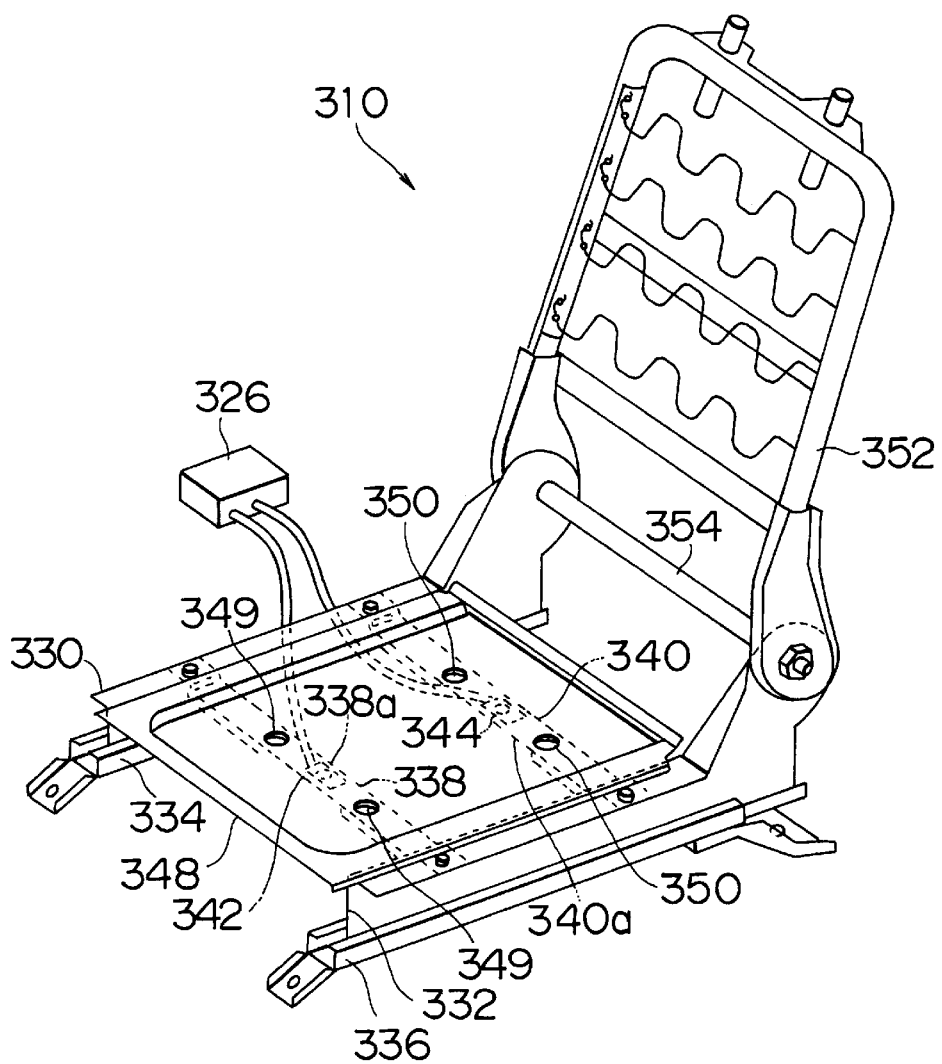
FIG. 19 is a perspective view showing a seat of a vehicle adapted to the system according to the fifth embodiment.

FIG. 19 is a perspective view showing a seat 310 for a vehicle. As shown in FIG. 19, the seat 310 incorporates two upper seat rails 330 and 332 disposed on the two sides thereof and extending in parallel with each other in the direction of movement of the vehicle. The upper seat rails 330 and 332 are movably guided in the longitudinal direction of the vehicle by lower seat rails 334 and 336 secured to the floor of the vehicle.

The upper seat rails 330 and 332 are connected to each other through beams 338 and 340 extending in parallel with each other in the direction of the width of the vehicle. The beams 338 and 340 have small-cross-section portions 338a and 340a formed in the central portions thereof and each having a section modulus smaller than those of the other portions. Distortion sensors 342 and 344 are joined to the lower surfaces of the small-cross-section portions 338a and 340a. The distortion sensors 342 and 344 are joined to the seat sensor controller 326 to output electric signals corresponding to the distortion generated in each of the small-cross-section portions 338a and 340a to the seat sensor controller 326. The seat sensor controller 326 detects distortion of each of the small-cross-section portions 338a and 340a in response to output signals from the distortion sensors 342 and 344.

A seat pan 348 is disposed on the beams 338 and 340. The seat pan 348 is secured to the beams 338 and 340 at symmetrical position across the small-cross-section portions 338a and 340a with bolts 349 and 350. A seat cushion (not shown) is disposed on the upper surface of the seat pan 348. A seat back 352 rotative around the shaft 354 is connected to a rear end of each of the upper seat rails 330 and 332 in the direction of movement of the vehicle. Thus, the passenger is able to adjust the reclining angle of the seat back 352.

The foregoing structure causes the load of a passenger sitting on the seat 310 for the vehicle to be transmitted to the beams 338 and 340 through the seat cushion and the seat pan 348. Thus, the beams 338 and 340 are deflected to correspond to the load transmitted from the seat pan 348, that is, the load of the passenger sitting in the front and rear portion of the seating surface. Thus, the small-cross-section portions 338a and 340a of the beams 338 and 340 are deflected corresponding to deflection of each beam. Therefore, the seat sensor controller 326 is able to detect the load added to each of the front and rear portions of the seating surface according to the distortion of the small-cross-section portions 338a and 340a detected in accordance with the output signals from the distortion sensors 342 and 344. Hereinafter the loads added to the front and rear portions of the seating surface are called front load Wf and rear load Wr. Moreover, the sum of the front load Wf and the rear load Wr, that is, the overall load added to the seating surface is called seat load W.

In the fifth embodiment, the seat sensor controller 326 determines whether or not a passenger sitting on the seat is present in accordance with the front load Wf and the rear load Wr. Moreover, the seat sensor controller 326 determines the physique (that is, whether the passenger is an adult or a child) of the passenger sitting on the seat in accordance with the foregoing loads. If no passenger sitting on the seat is present or if the passenger sitting on the seat is a child, the seat sensor controller 326 transmits an air-bag-operation inhibition signal to the air-bag controller 312. Thus, the operation of the air-bag module 314 is inhibited. If the passenger sitting on the seat is an adult, the seat sensor controller 326 transmits an air-bag-operation permission signal to the air-bag controller 312 so that the operation of the air-bag module 314 is permitted.

When a passenger is sitting on the seat 310, the weight of the passenger added to the seat back 352 is enlarged as the rearward inclination angle (hereinafter called a "seat inclination angle") of the seat back 352 is enlarged. Thus, the seat load W is reduced. Therefore, the physique of the passenger cannot accurately be determined in accordance with only the magnitude of the seat load W. In the foregoing case, if the seat load W is corrected by using the seat inclination angle in order to eliminate the influence of the inclination of the seat back 352, a sensor for detecting the seat inclination angle must be provided. Therefore, the cost of the unit is enlarged as described in the prior art.

On the other hand, the system according to the fifth embodiment is characterized in that the physique of the passenger can accurately be determined by using only the front load Wf and the rear load Wr.

Figure 20:
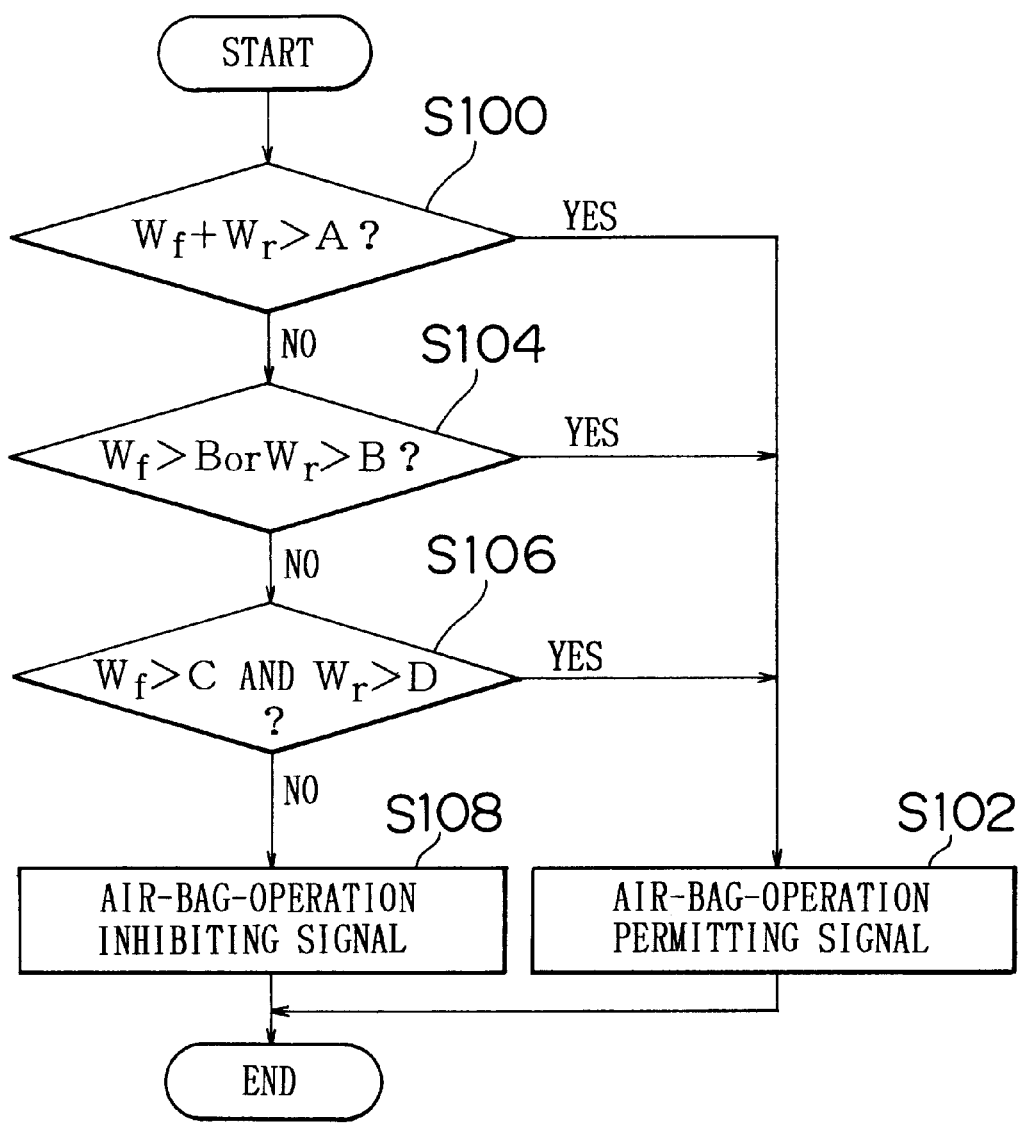
FIG. 20 is a flow chart of a routine which is executed by a seat-sensor controller according to the fifth embodiment of the present invention.

FIG. 20 is a flow chart of a routine according to the fifth embodiment which is executed by the seat sensor controller 326 in order to determine the physique of the passenger. An assumption is made in the fifth embodiment for determining the physique of the passenger that the lower limit of the weights of adults is, for example, 45 kgf and an upper limit of the weights of children is, for example, 25 kgf. The routine shown in FIG. 20 is repeatedly started at predetermined intervals of periods of time. After the routine shown in FIG. 20 has been started, a process in step S100 is performed.

In step S100 a determination is made whether or not the sum of the front load Wf and the rear load Wr (that is, the seat load W) is larger than a predetermined threshold value A. When an adult sits on the seat, a portion of the weight of the passenger is added to the floor through the feet. Therefore, the seat load is correspondingly reduced as compared with the weight of the passenger. Therefore, when the physique of the passenger is determined in accordance with the magnitude of the seat load W, it is undesirable that the lower limit of the weights of adults is employed as the reference. Therefore, this embodiment is structured such that the threshold value A is made to be, for example, 30 kgf which is larger than the upper limit of the weights of children which is 25 kgf and which is obtained in consideration of the measurement error and so forth.

If Wf+Wr>A is satisfied in step S100, a determination is made that the passenger sitting on the seat is an adult. In this case, the operation proceeds to step S102 so that the air-bag-operation permission signal is transmitted to the air-bag controller 312. Then, the foregoing routine is completed. If Wf+Wr>A is not satisfied in step S100, a process in step S104 is performed.

When an adult passenger has sat in the relatively front portion of the seat, the weight added to the floor through the feet of the passenger is enlarged. Thus, the seat load W is reduced correspondingly. In the foregoing case, there is a possibility that the seat load W is not enlarged to the threshold value A. The process in step S104 is performed to accurately determine the physique of the passenger even in the foregoing case.

Figure 21:
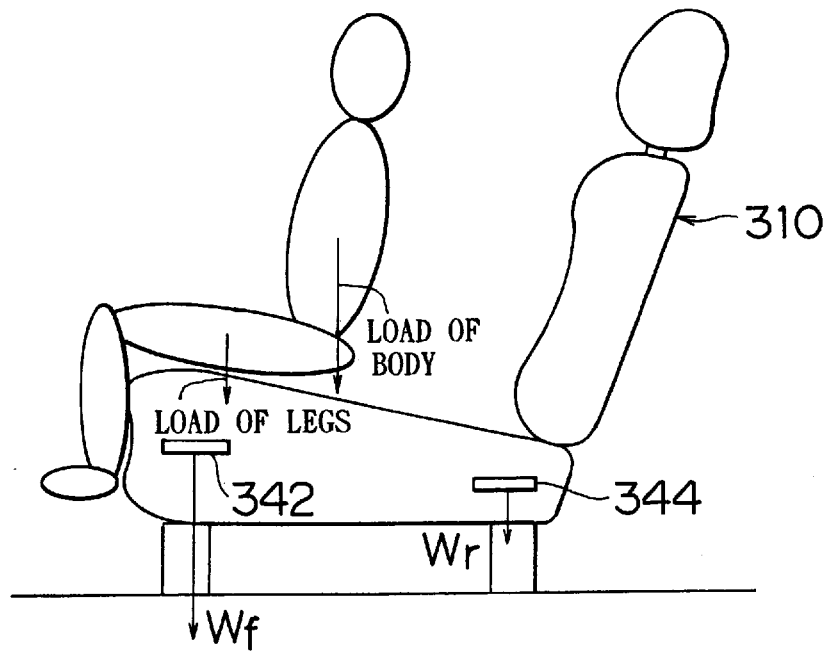
FIG. 21 is a diagram showing a state in which a child passenger has sat in a relatively front portion of a seat of a vehicle.
Figure 22:
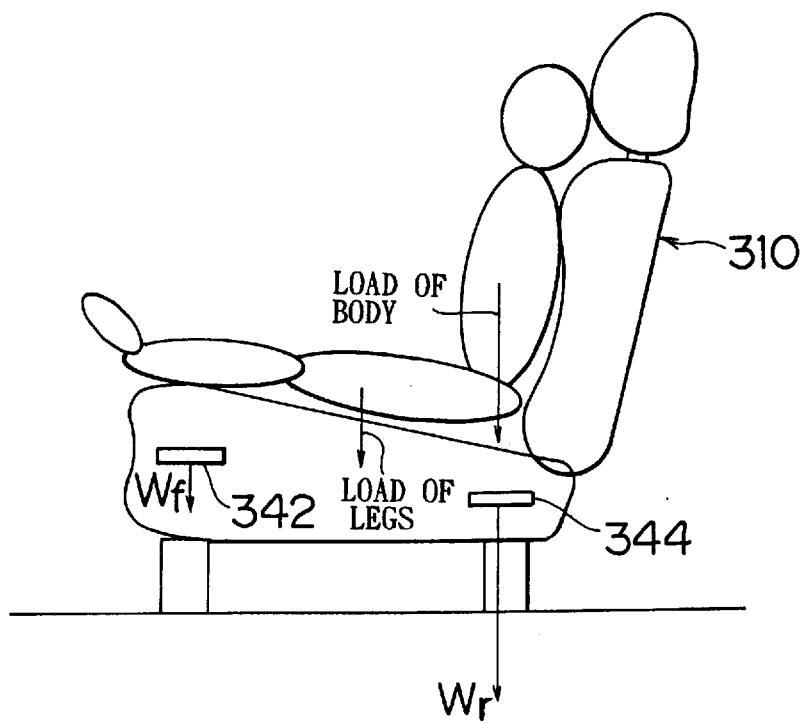
FIG. 22 is a diagram showing a state in which a child passenger has sat in a relatively rear portion of a seat of a vehicle.

FIG. 21 shows a state in which a child sits in the front portion of the seating surface of the seat 310 of the vehicle. FIG. 22 shows a state in which a child sits in a rear portion of the seating surface. When a child sits in the front portion of the seating surface of the seat as shown in FIG. 21, a major portion of the weight is added to the front portion of the seating surface of the seat. A portion of the weight is added to the rear portion of the seating surface of the seat. Therefore, the front load Wf is not larger than the weight of the child. When child sits in the rear portion of the seating surface of the seat as shown in FIG. 22, a major portion of the weight of the child is added to the rear portion of the seating surface of the seat. However, also a portion of the weight of the leg portions is added to the front portion of the seating surface of the seat. Therefore, also a state is not realized in which the rear load Wr is not smaller than the weight of the children.

Therefore, in step S104 a threshold value B (for example, 25 kgf which is the same as the upper limit of weights of children) determined in accordance with the maximum values of the front load Wf and the rear load Wr when a child has sat in the front portion or the rear portion of the seat is used to determine whether or not either of the front load Wf or the rear load Wr is larger than the threshold value B. If Wf>B or Wr>B, a determination is made that an adult is sitting on the seat. In the foregoing case, in step S102 an air-bag-operation permission signal is transmitted to the air-bag controller 312. Then, the foregoing routine is completed. If any one of the relationships Wf>B and Wr>B are not satisfied in step S104, a process in step S106 is performed.

As described above, when the seat load W is not larger than the threshold value A owing to sitting of an adult passenger in the front portion of the seating surface of the seat, the process in step S104 a determination is made that the passenger sitting on the seat is an adult to permit the operation of the air-bag module 314.

The process in step S106 is as well as performed to accurately determine the physique of the passenger in a case where an adult passenger is sitting on the seat such that the seat back 352 is inclined rearwards.

Figure 23:
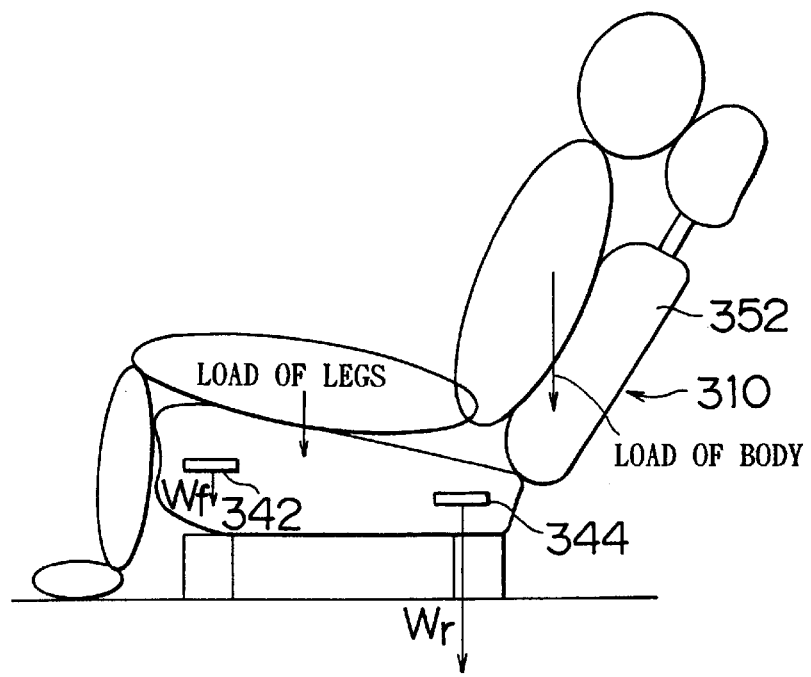
FIG. 23 is a diagram showing a state in which an adult passenger has sat on a seat such that the seat back is reclined rearwards.

FIG. 23 shows a state in which an adult passenger is sitting on the seat such that the seat back 352 is inclined rearwards. As shown in FIG. 23, when the seat back 352 is being inclined, the weight of the body of the passenger is added to the seat back 352. Moreover, the hips are somewhat released from the seating surface, causing the front load Wf to be reduced. At least the weight of the legs of the passenger is added to the front portion of the seat, causing the front load Wf to be not smaller than the weight of the legs.

Therefore, in step S106 threshold value C (for example, 5 kgf) corresponding to the weight of the legs of the adult passenger and a threshold value D (for example, 20 kgf) corresponding to a value obtained by subtracting the threshold value C from the upper limit of the upper limit 25 kgf of the weights of children are used. Then, whether or not the front load Wf is larger than the threshold value C and whether or not the rear load Wr is larger than the threshold value D are determined. If Wf>C and Wr>D are simultaneously satisfied, a load not smaller than the weight of the legs of the passenger is added to the front portion of the seat. Moreover, a load greater than the weight of the children is added to the overall body of the seat. In the foregoing case, a determination is made that the adult is sitting on the seat such that the seat back 352 is inclined rearwards. In step S102 an air-bag-operation permission signal is transmitted to the air-bag controller 312. Then, the foregoing routine is completed. If at least either Wf>C or Wr>D is not satisfied in step S106, a determination is made that a children is sitting on the seat or no passenger is present. In the foregoing case, in step S108 the air-bag-operation inhibition signal is transmitted to the air-bag controller 312. Then, the foregoing routine is completed.

The foregoing process in step S106 when the seat load W is not smaller than the threshold value A owing to sitting of an adult such that the seat back 352 is inclined, a determination is made such that the passenger sitting on the seat is an adult to permit the operation of the air-bag module 314.

As described above, according to this embodiment, if the seat load W is not larger than the threshold value A when an adult Passenger has sat on the relatively front portion of the seat or when an adult passenger has sat on the seat such that the seat back 352 is inclined, a determination can be made that the passenger sitting on the seat is an adult in accordance with the front load Wf and the rear load Wr. That is, any sensor except for the sensors (that is, the distortion sensors 342 and 344) for detecting the loads acting on the seating surface of the seat is not required to accurately determine the weight of the passenger. Therefore, increase of elements can be prevented and the cost of the apparatus can be reduced.

A sixth embodiment of the sitting passenger detecting apparatus according to the present invention will now be described with reference to FIGS. 24 and 25.

The sixth embodiment has a structure in addition to the structure of the fifth embodiment, that is, whether or not the child restraining apparatus (for example, a child seat) is mounted rearwards is determined.

Figure 24:
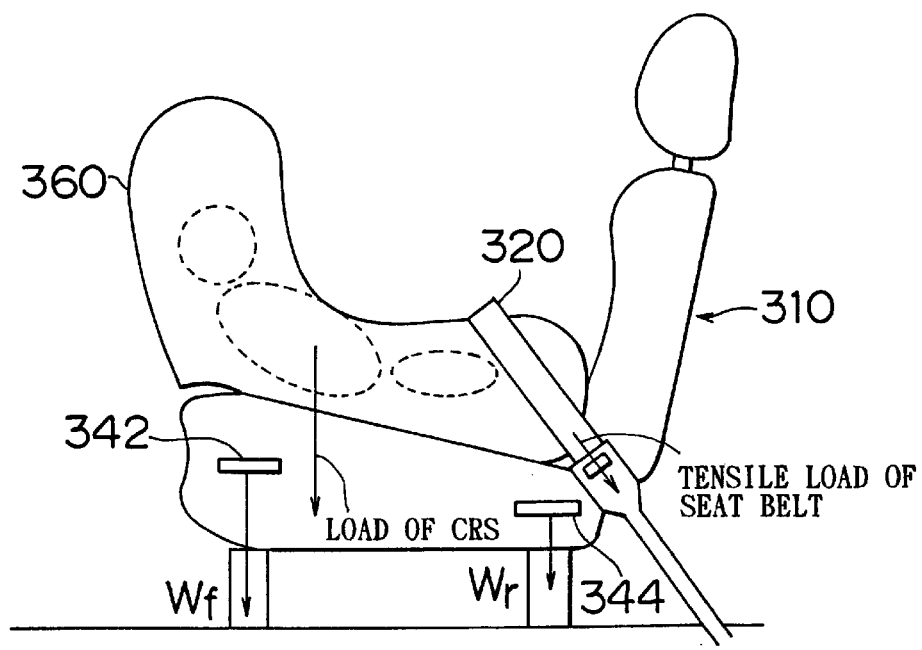
FIG. 24 is a diagram showing a state in which a child restraining apparatus is joined to the seat of a vehicle to oppose with each other.

FIG. 24 shows a state in which a child restraining apparatus 360 facing rearwards is secured to the seat 310 with the seat belt 320. In general, the weight of the child restraining apparatus 360 is smaller than the weight of an adult if the weight of a child is included. Therefore, there is minimal possibility that the passenger is an adult as a result of the routine shown in FIG. 20 when the child restraining apparatus 360 is mounted as described above. If the child restraining apparatus 360 is firmly secured by the seat belt 320, a great tensile load owing to the seat belt 320 is added to the seating surface of the seat. In the foregoing case, the seat load W is enlarged. Thus, the passenger sitting on the seat is an adult is determined as a result of the routine shown in FIG. 20. Therefore, the operation of the air-bag module 314 is sometimes undesirably permitted. On the other hand, this embodiment is structured such that the seat sensor controller 326 performs the routine shown in FIG. 25. Thus, whether or not the child restraining apparatus 360 has been mounted can accurately be determined. If the child restraining apparatus 360 is mounted, the operation of the air-bag module 314 is inhibited.

Figure 25:
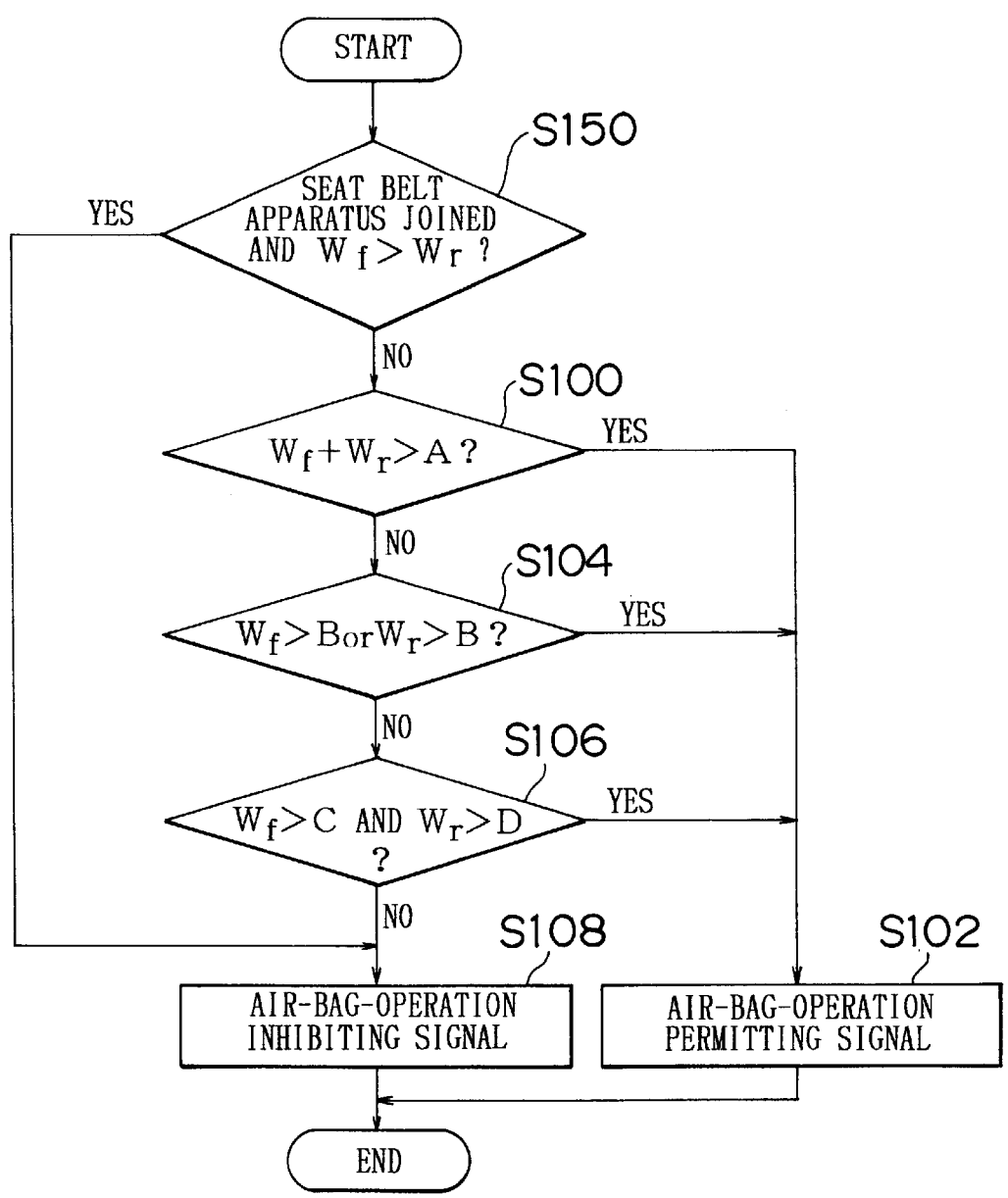
FIG. 25 is a flow chart of a routine which is executed by a seat sensor controller according to a sixth embodiment of the present invention.

The routine shown in FIG. 25 is a routine which is repeatedly performed at predetermined intervals of time. Steps of the routine of the routine shown in FIG. 25, which are similar to those in the routine shown in FIG. 20 are given the same step numbers and the same steps are omitted from description. After the routine shown in FIG. 25 has been started, a process in step S150 is performed.

In step S150 determinations are made whether or not the seat belt 320 has been joined and whether or not the front load Wf is larger than the rear load Wr. In general, a passenger who fastens the seat belt 320 is in a state in which the waist of the passenger is restrained by the seat belt 320. Therefore, the passenger deeply sits on the seat 310. In the foregoing case, the weight of the passenger is mainly added to the rear portion of the seating surface of the seat, causing the rear load Wr to be larger than the front load Wf. If the child restraining apparatus 360 is secured to the seat 310 by the seat belt 320 to be directed rearwards as shown in FIG. 24, the center of gravity of the child restraining apparatus 360 including the child passenger is moved to a front portion of the seating surface of the seat. Therefore, the front load Wf is made to be larger than the rear load Wr. If determinations are made in step S150 that Wf>Wr is satisfied and that the seat belt 320 has been joined, a determination can be made that the child restraining apparatus has been mounted to be directed rearwards. In the foregoing case, a determination is made that the operation of the air-bag module 314 must be inhibited. In step S108 the air-bag-operation inhibition signal is transmitted. Then, the foregoing routine is completed. If a negative determination is made in step S150, the process in step S100 and following steps are performed similarly to the routine shown in FIG. 20.

As described above, according to the sixth embodiment, the physique of the passenger can accurately be determined. Moreover, whether or not the child restraining apparatus has been mounted to be directed rearwards can be determined. If a determination is made that the child restraining apparatus 360 is mounted to be directed rearwards, the operation of the air-bag module 314 can be inhibited.

When the passenger sitting on the seat fastens the seat belt 320 as described above, the waist of the passenger is restrained by the seat belt 320. Therefore, forward movement of the passenger sitting on the seat does easily occur, and a value of the rear load Wr not smaller than a predetermined value to be maintained. Therefore, step S150 may have the following conditions to determine the fact that the child restraining apparatus has been mounted: Wf>Wr is satisfied; the seat belt 320 has been joined; and the rear load Wr is not larger than a predetermined value (for example, 25 kgf).

Each of the fifth and sixth embodiments is structured such that the operation of the air-bag module 314 is permitted when a determination has been made that the passenger sitting on the seat is an adult. When the determination has been made that the passenger sitting on the seat is a child or when the child restraining apparatus has been mounted, the operation of the air-bag module 314 is inhibited. When the air-bag module 314 of a type which can be operated with high and low expansion output levels is employed, the expansion output of the air-bag module 314 may be changed according to a result of the determination of the physique of the passenger. That is, when the passenger is an adult, the air-bag module 314 is operated with the high expansion output. When the passenger is a child or when the child restraining apparatus has been mounted, the air-bag module 314 is operated with the low expansion output.

In the fifth and sixth embodiments, the threshold value A corresponds to the first threshold value according to the present invention. The threshold value B corresponds to the third threshold value according to the present invention. The threshold value C corresponds to the second threshold value according to the present invention. The threshold value D corresponds to the third threshold value according to the present invention. The structure that the seat sensor controller 326 detects the front load Wf in response to an output signal from the distortion sensor 342 corresponds to the first load detecting means or the first load detecting step according to the present invention. Detection of the rear load Wr in response to an output signal from the distortion sensor 344 corresponds to the second load detecting means or the second load detecting step according to the present invention. The structure that the seat sensor controller 326 performs the process in step S100 corresponds to the first determining means or the first determining step according to the present invention. Execution of the process in step S104 corresponds to the third determining means or the third determining step according to the present invention. Execution of the process in step S106 corresponds to the second determining means or the third determining step according to the present invention. Execution of the process in step S150 corresponds to the CRS wearing determining means or the CRS wearing determining step according to the present invention.

A seventh embodiment of the sitting passenger detecting apparatus according to the present invention will now be described with reference to FIGS. 26 to 31.

In FIGS. 26 to 31, arrow FR indicates a forward direction of the car body, arrow UP indicates an upward direction of the car body and arrow IN indicates an inward direction of the width of the vehicle.

Figure 31:
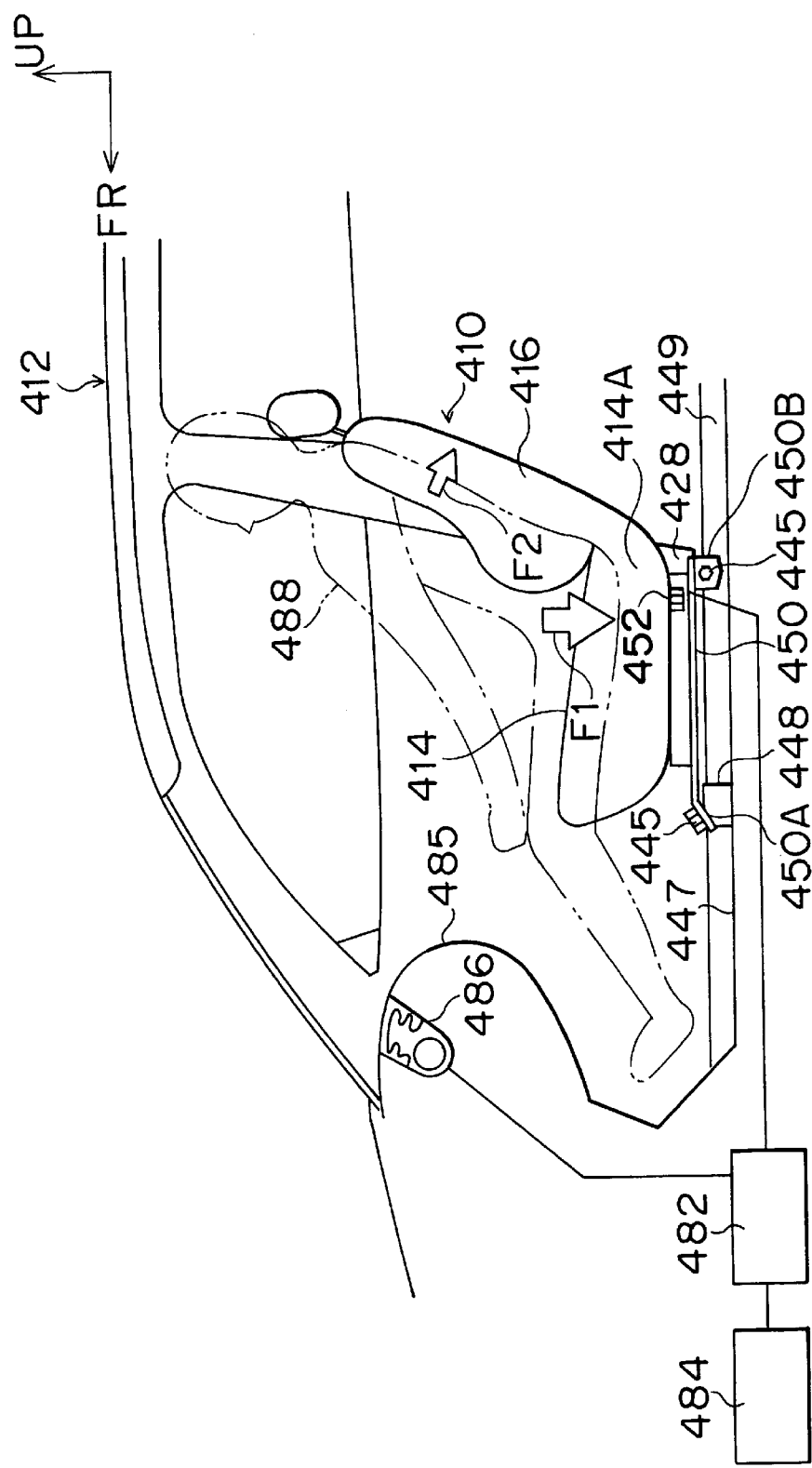
FIG. 31 is a schematic side view showing a portion of a vehicle to which the sitting passenger detecting apparatus according to the seventh embodiment of the present invention is applied.

As shown in FIG. 31, a seat 410 for a vehicle according to this embodiment constitutes a front assistance set of a vehicle 412. A seat back 416 is joined to the rear portion of a seat cushion 414 such that swinging of the seat back 416 in the longitudinal direction is permitted.

Figure 26:
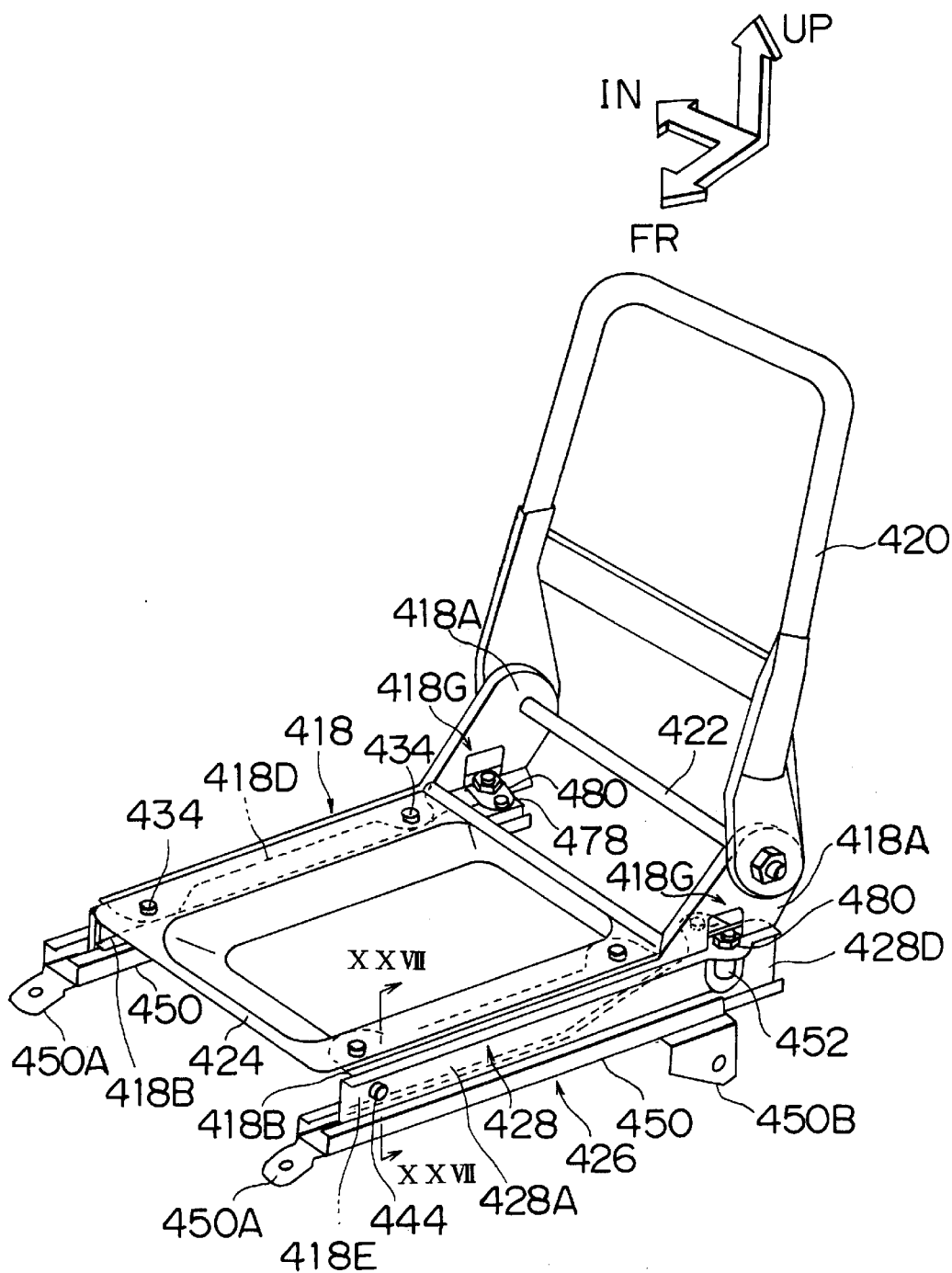
FIG. 26 is a perspective view showing a sitting passenger detecting apparatus according to a seventh embodiment of the present invention when the apparatus is viewed from a diagonally forward outside position of the vehicle.

As shown in FIG. 26, a shaft 422 is arranged between rear ends 418A of right and left seat cushion frames 418 which form a pair. A seat back frame 420 is joined such that swinging of the seat back frame 420 about the shaft 422 in the longitudinal direction is permitted. A known reclining mechanism (not shown) is provided for a portion in which the seat cushion frames 418 and the seat back frame 420 are connected to each other. Thus, the angle of rearward inclination of the seat back frame 420 with respect to the seat cushion frames 418 can be adjusted.

Figure 27:
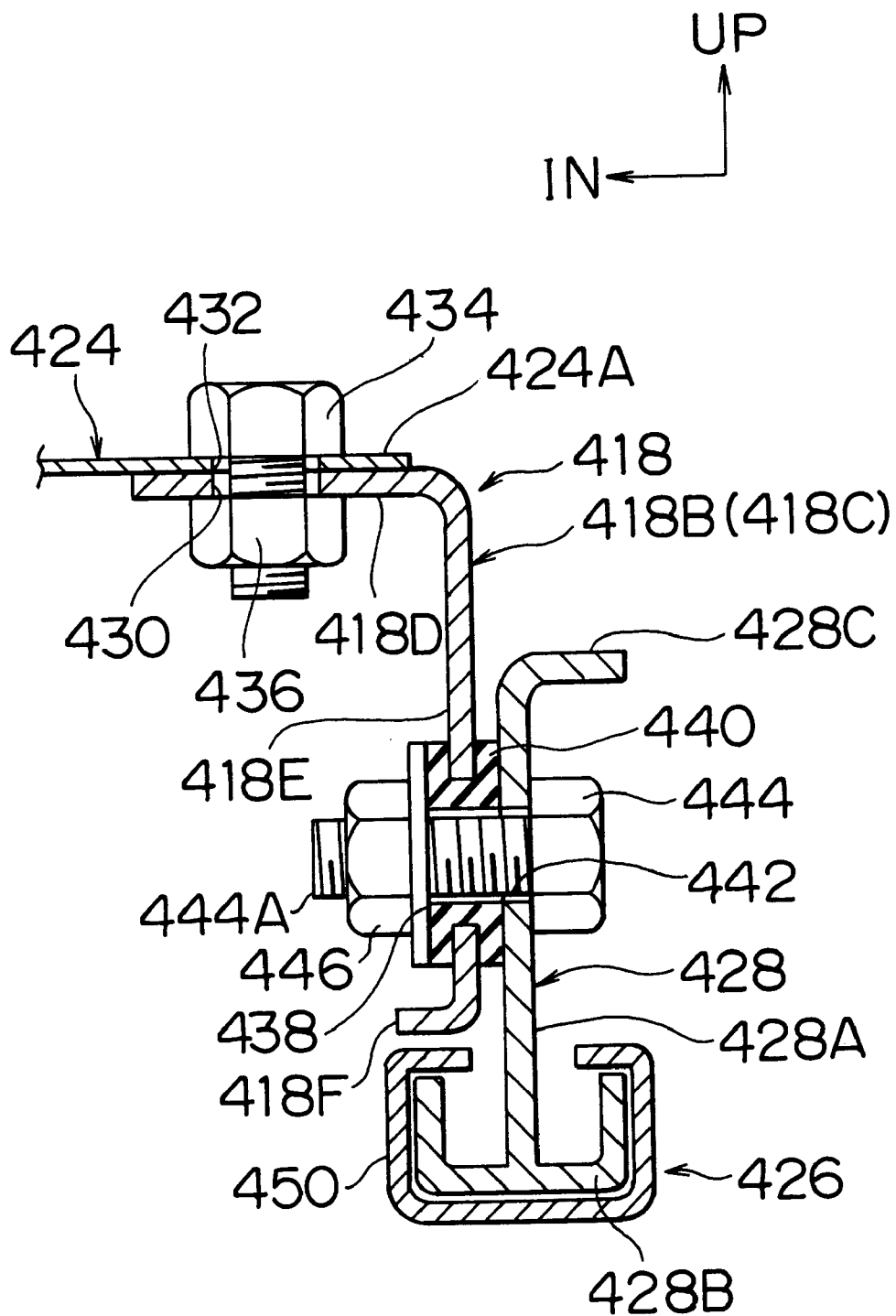
FIG. 27 is an enlarged cross sectional view taken along line XXVII—XXVII shown in FIG. 26.
Figure 28:
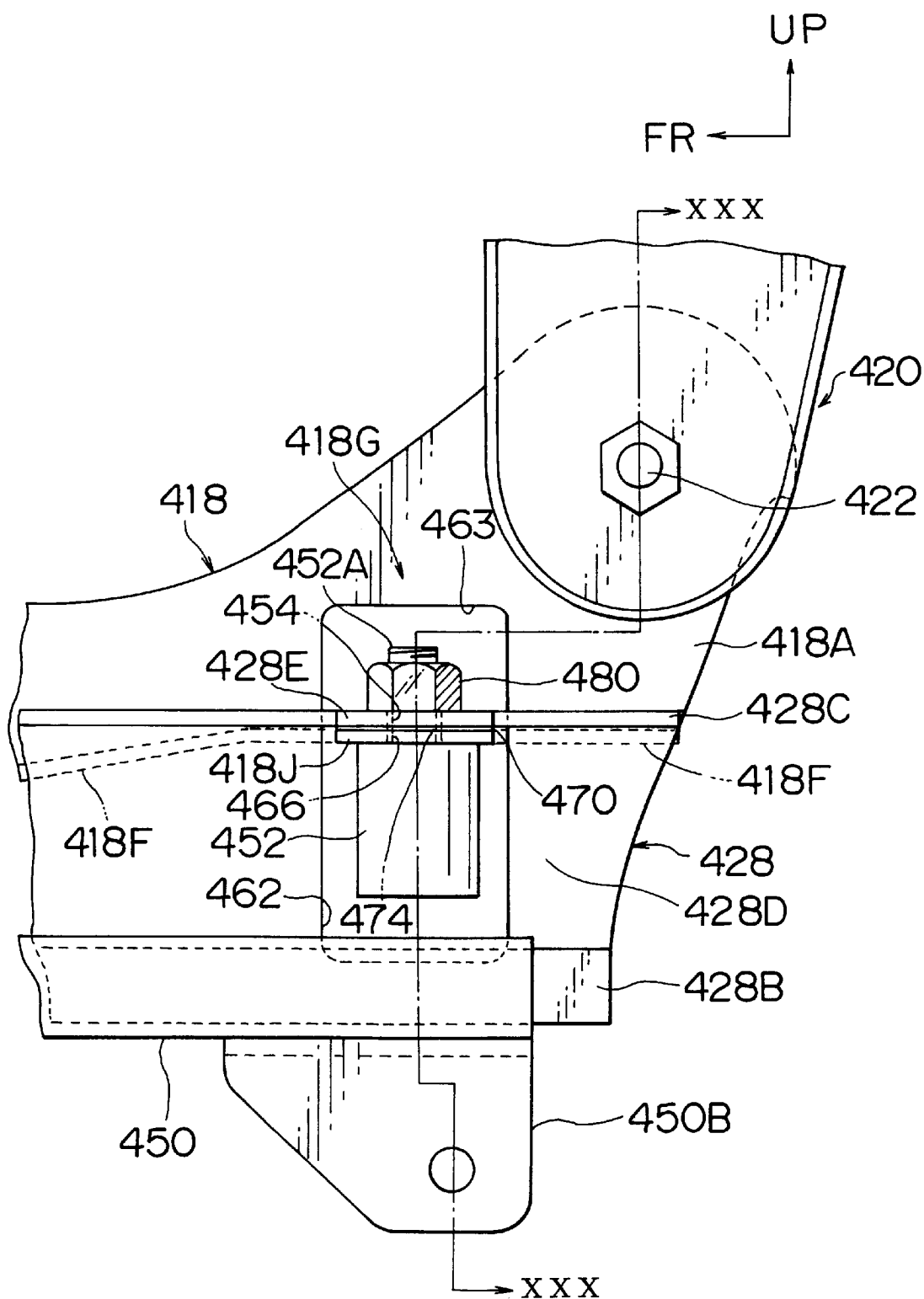
FIG. 28 is an enlarged side view showing a rear connecting portion of the sitting passenger detecting apparatus according to the seventh embodiment of the present invention.

As shown in FIG. 27, the cross sectional shape of each of a front portion 418B and an intermediate portion 418C of the seat cushion frames 418 is formed into an L-shape when the foregoing portions are viewed from a forward position of the vehicle. A seat pan 424 is arranged between upper walls. Specifically, bolts 434 each of which penetrates both of a joining hole 430 formed in an upper wall 418D of the seat cushion frames 418 and a joining hole 432 formed in a flange 424A of the seat pan 424 and nuts 436 engaged to the bolts 434 are used to secure the four corners of the seat pan 424 to the upper wall 418D of the seat cushion frames 418.

In the front portion 418B of the seat cushion frames 418, a vertical wall 418E is, with bolts 444 and nuts 446, joined to a front portion 428A of an upper rail 428 which constitutes a portion of a seat track 426. Specifically, a bush 440 is joined to a through hole 438 formed in the vertical wall 418E. A thread portion 444A of the bolt 444 inserted into a joining hole 442 formed in the front portion 428A of the upper rail 428 penetrates the bush 440 so as to be engaged to a nut 446. Therefore, the seat cushion frames 418 is able to rotate around the upper rail 428 such that the thread portion 444A of the bolt 444 serves as the center of rotation. A lower portion 428B of the upper rail 428 is slidably engaged to a lower rail 450.

As shown in FIG. 31, joining portions 450A and 450B are formed at two longitudinal ends of the lower rail 450. The joining portions 450A and 450B are, with bolts 445, secured to a floor cross member 448 and a side sill 449 disposed in the longitudinal direction of the car body.

As shown in FIG. 27, a flange 428C facing outside in the direction of the width of the seat is provided for the top end of the upper rail 428. A flange 418F facing inwards in the direction of the width of the seat is provided for the lower end of the seat cushion frames 418. Note that claws and a locking mechanism for securing the position of the upper rail 428 with respect to the lower rail 450 have known structures. Therefore, the foregoing elements are omitted from description and illustration.

As shown in FIG. 26, an elongation distortion measuring load cell 452 serving as a load sensor is provided for a rear portion 428D of the upper rail 428. The vertical wall 418E of the seat cushion frames 418 and the front portion 428A of the upper rail 428 are pivotally held by bolts 444 at positions offset from the portion in which the load cell 452 is joined. Thus, the movement of the portion in which the load cell 452 is joined in the longitudinal direction of the vehicle is restrained.

Figure 29:
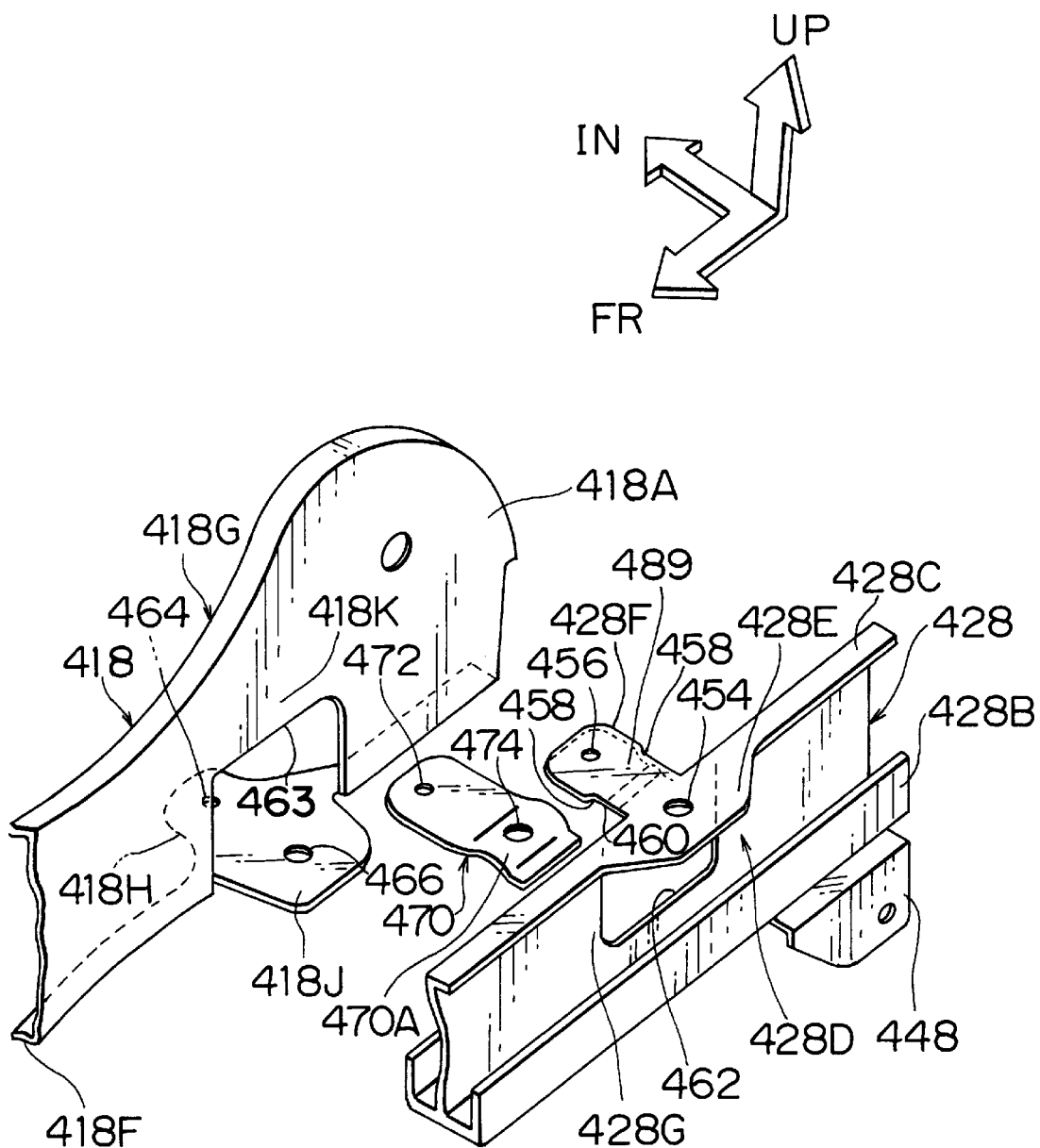
FIG. 29 is a perspective view showing the rear connecting portion of the sitting passenger detecting apparatus according to the seventh embodiment of the present invention when the portion is viewed from a diagonally forward outside position of the vehicle.

As shown in FIG. 29, in the rear portion 428D of the upper rail 428, a sensor joining portion 428E having a large width is provided for the flange 428C. A through hole 454 is formed in the sensor joining portion 428E. A portion extending from the sensor joining portion 428E to the inside portion of the width of the seat is provided with a clamping portion 428F. A through hole 456 is formed in the leading end portion of the clamping portion 428F.

A low-strength portion 489 constituted by cut portions 458 formed in the longitudinal direction and a groove 460 formed in the lower surface and extending in the longitudinal direction is formed in between a clamping portion 428F and the sensor joining portion 428E of the upper rail 428. An opening 462 is, by cutting and raising, formed in a portion of the vertical wall 428G of the upper rail 428 at a position substantially below the low-strength portion 489.

In a rear portion 418G of the seat cushion frames 418, a wide clamping portion 418H is formed in the flange 418F. A through hole 464 is formed in the clamping portion 418H. A sensor joining portion 418J extending toward outside in the direction of the width of the seat is formed from the clamping portion 418H. A through hole 466 is formed in the sensor joining portion 418J. An opening 463 is, by cutting and raising, formed in a portion of the vertical wall 418K of the seat cushion frames 418 at a position substantially above the root of the clamping portion 418H.

A leaf spring 470 serving as a sound insulating member is disposed between the sensor joining portion 428E and the clamping portion 428F of the upper rail 428 and the sensor joining portion 418J and the clamping portion 418H of the seat cushion frames 418. A spring portion 470A of the leaf spring 470 is disposed between the sensor joining portion 428E of the upper rail 428 and the sensor joining portion 418J of the seat cushion frames 418. Note that through holes 472 and 474 are formed in the leaf spring 470.

Figure 30:
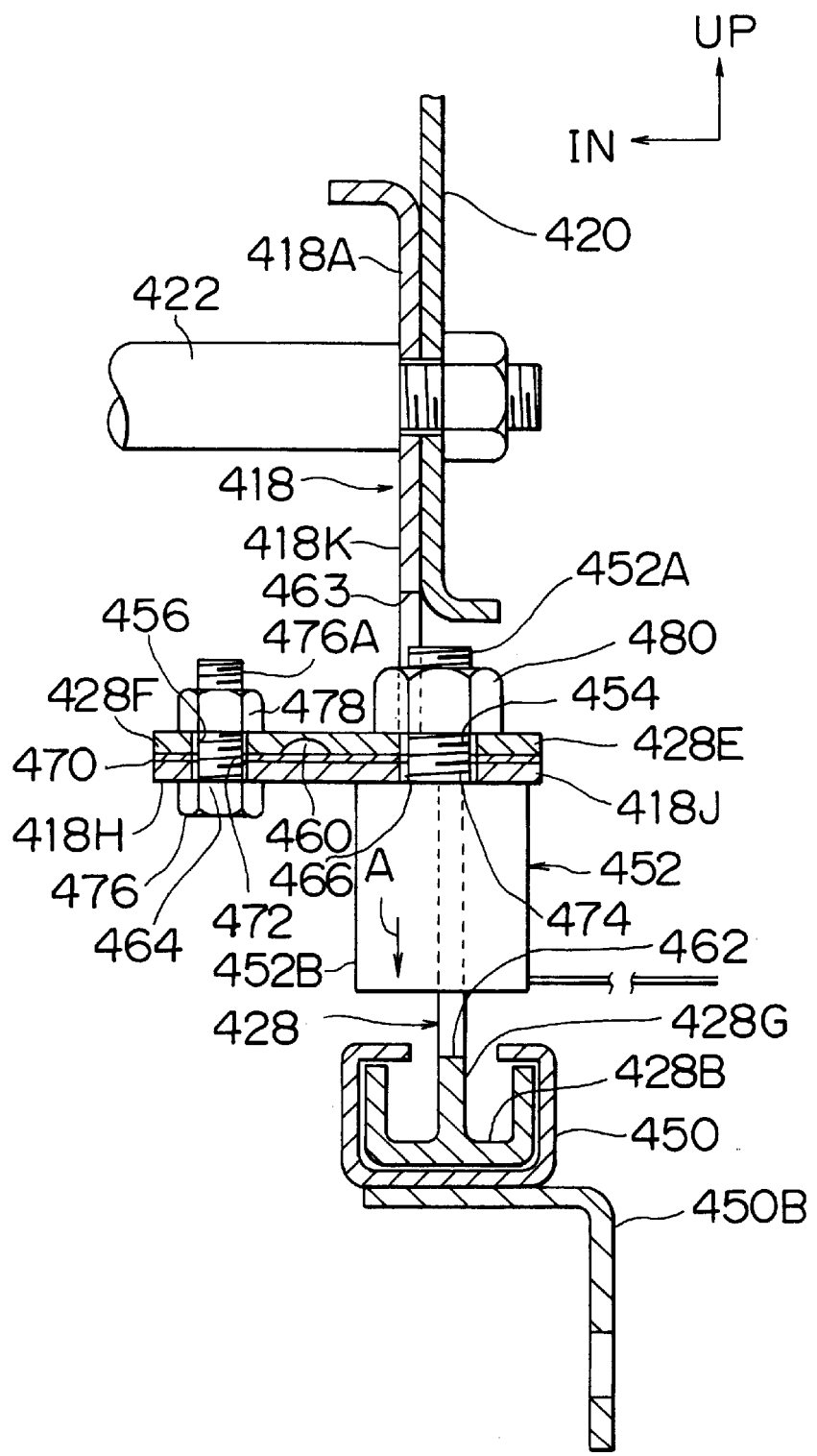
FIG. 30 is an enlarged cross sectional view taken along line XXX—XXX shown in FIG. 28.

As shown in FIG. 30, a thread portion 476A of a bolt 476 is upwards inserted into each of the through holes 456, 472 and 464. A nut 478 is engaged downwards to the thread portion 476A of the bolt 476. A thread portion 452A stood erect over the load cell 452 is inserted downwards into each of the through holes 454, 474 and 466. A nut 480 is engaged downwards to the thread portion 452A of the load cell 452. Note that the body 452B of the load cell 452 is disposed in an opening 462 of the upper rail 428. The nut 480 is disposed in the opening 463 of the seat cushion frames 418.

That is, the clamping portion 418H of the seat cushion frames 418 and the clamping portion 428F of the upper rail 428 are joined with bolts 476 and nuts 478 at positions offset from the portion for joining the load cell 452 in the direction of the width of the vehicle. Thus, the widthwise direction of the portion for joining the load cell 452 is restrained.

As shown in FIG. 31, the load cell 452 is connected to a control unit 482. The control unit 482 is connected to an impact detecting sensor 484 and a front-passenger-seat air bag apparatus 486 provided for the instrument panel 485. The control unit 482 controls the operation of an inflator for the front-passenger-seat air bag apparatus 486 and output from the same in accordance with data about detected collision input from the impact detecting sensor 484 and data about a fact whether or not a passenger is present and the physique of the passenger input from the load cell 452.

The operation of the seventh embodiment will now be described.

The seventh embodiment having the above-mentioned structure is, as shown in FIG. 31, arranged such that the weight of a passenger 488 who has sat on the seat 410 is, as indicated with arrows F1 and F2 shown in FIG. 31, mainly added to the rear portion 414A of the seat cushion 414 and the seat back 416. Therefore, the seat cushion frames 418 shown in FIG. 26 swings downwards such that the bolt 444 provided for the front portion 428A of the upper rail 428. As a result, as indicated with arrow A shown in FIG. 30, the sensor joining portion 418J of the rear portion 418G of the seat cushion frames 418 is moved downwards. Thus, caused distortion can be detected by the load cell 452.

The seventh embodiment has the structure that the clamping portion 418H of the seat cushion frames 418 and the clamping portion 428F of the upper rail 428 are joined with bolts 476 and nuts 478. The foregoing joining portions are offset from the portion for joining the load cell 452 in the direction of the width of the vehicle. Moreover, the low-strength portion 489 is formed between the clamping portion 428F and the sensor joining portion 428E. Since the low-strength portion 489 is deformed, vertical movement of the sensor joining portion 418J is not inhibited by the joining portion. As a result, an influence of the clamping force of the upper rail 428 and the seat cushion frames 418 is not easily exerted on the value measured by the load cell 452. If the clamping force of the bolts 476 and the nuts 478 is enlarged, the detecting accuracy of the load cell 452 does not deteriorate. Therefore, the measuring accuracy can be improved. Moreover, lateral rigidity of the portion for joining the seat cushion frames 418 to the upper rail 428 can be maintained. Therefore, deterioration in the comfort of the passenger can be prevented. The seventh embodiment enables change in the load occurring due to the passenger 488 sitting on the seat 410 to accurately be detected without an influence of the longitudinal slide position of the seat 410 as distinct from the conventional structure.

The seventh embodiment has the structure that the leaf spring 470 is disposed between the sensor joining portion 428E and the clamping portion 428F of the upper rail 428 and the sensor joining portion 418J and the clamping portion 418H of the seat cushion frames 418. Therefore, if the vehicle runs on a rough area or the like, a gap formed between the sensor joining portion 428E of the upper rail 428 and the sensor joining portion 418J of the seat cushion frames 418 owing to the movement of the passenger 488 and causing noise to be generated when the two elements are again made contact with each other can be prevented by the leaf spring 470.

The seventh embodiment has the structure that the body 452B of the load cell 452 is disposed in the opening 462 of the upper rail 428. Therefore, the load cell 452 can be disposed adjacent to the vertical wall 423G of the upper rail 428. As a result, the bending moment is not easily exerted on the load cell 452. Thus, an adverse influence of the bending moment on the measurement of the load can be minimized.

The seventh embodiment has the structure that the clamping portion 418H of the seat cushion frames 418 and the clamping portion 428F of the upper rail 428 are joined with bolts 476 and the nuts 478. Therefore, the widthwise directional of the portion for joining the load cell 452 is restrained. Hence it follows that the through holes 454, 474 and 466 and the thread portion 452A of the load cell 452 do not easily interfere with one another. As a result, interference of the through holes 454, 474 and 466 with the thread portion 452A of the load cell 452 causing the bending moment to be detected by the load cell 452 and an adverse influence to be exerted on the measurement of the load can be prevented.

The seventh embodiment has the structure that the bolts 444 and the nut 446 are used in the front portion 418B of the seat cushion frames 418 to join the vertical wall 418E to the front portion 428A of the upper rail 428 which constitutes a portion of the seat track 426. As an alternative to this, also the portion for securing the front portion 418B of the seat cushion frames 418 and the front portion 428A of the upper rail 428 may be structured similarly to the structure for securing the rear portion 418G of the seat cushion frames 418 and the rear portion 428D of the upper rail 428 to dispose the load cell 452. In the foregoing case, the rigidity of the seat cushion frames 418 and the upper rail 428 in the longitudinal direction must be maintained. Therefore, a contrivance, for example, to enlarge the clamping force of the joining portions corresponding to the bolts 476 and the nuts 478, must be employed.

When the distance from the front connecting portion and the load cell 452 disposed in the rear portion is long, portions in the front portion of the seat cushion frames 418 corresponding to the clamping portion 418H of the seat cushion frames 418 and the clamping portion 428F of the upper rail 428 may be joined to each other. In the foregoing case, distortion of the seat cushion frames 418 between the front joining portion and the load cell 452 disposed in the rear portion enables the foregoing joining portion to serve as the fulcrum. portion 489. Only either of the cut portion 458 or the groove 460 may be used to form the low-strength portion 489. As an alternative to the cut portion 458 and the groove 460, the other elements, such as beads, may be employed to constitute the low-strength portion 489.

In the seventh embodiment, the leaf spring 470 is employed as the sound insulating member. As an alternative to the leaf spring 470, another sound insulating member, such as a rubber plate, may be employed. The sitting passenger detecting apparatus according to the present invention may be applied to another seat except for the front passenger seat.

Figure 32:
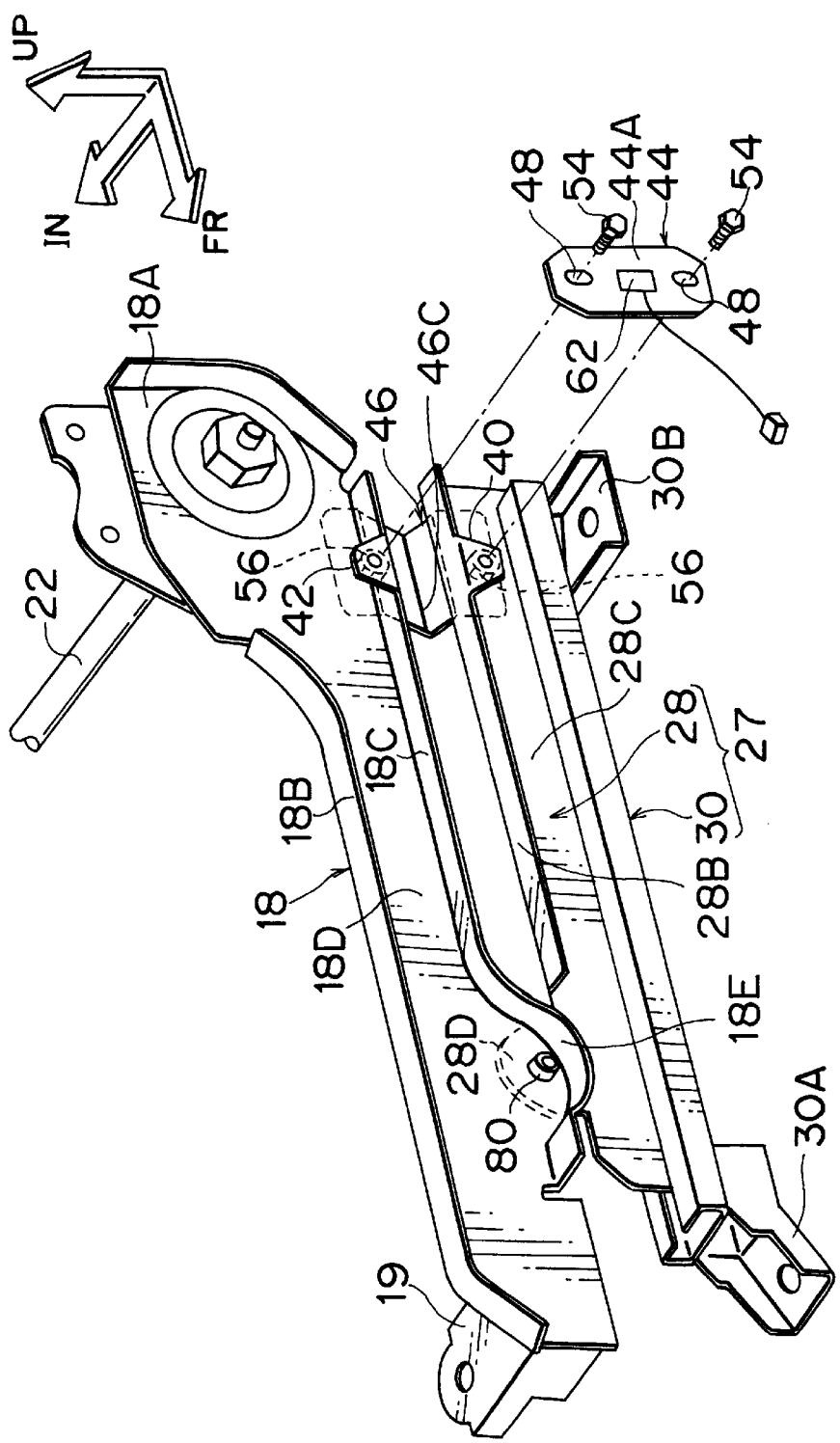
FIG. 32 is an exploded perspective view showing an essential portion of a sitting passenger detecting apparatus according to an eighth embodiment of the present invention when the essential portion is viewed from a diagonally forward outside position of the vehicle.

An eighth embodiment of the sitting passenger detecting apparatus according to the present invention will now be described with reference to FIG. 32.

The same elements as those according to the first embodiment are given the same reference numeral and the same elements are omitted from description.

The eighth embodiment has the structure that two longitudinal positions of the vertical wall 18D of the seat cushion frames 18 and the vertical wall 28C of the upper rail 28 are connected to each other by the brackets 46. Moreover, the thin plate 44 provided with the distortion measuring sensor 62 is disposed. The passenger 60 usually sits in the rear portion of the seat cushion 14. Therefore, a structure arranged as shown in FIG. 32 may be employed in which the rear portion of the seat cushion frames 18 and the rear portion of the upper rail 28 are connected to each other with the brackets 46. Moreover, the thin plate 44 provided with the distortion measuring sensor 62 is disposed. In addition, the connecting portion 18E formed in a lower portion of the front portion of the seat cushion frames 18 and the connecting portion 28D formed in the upper portion of the front portion of the upper rail 28 are rotatively connected to each other by a connecting member 80, such as a pin. In the eighth embodiment, the rectangular bracket 46 having the bent portion 46C serving as the connecting member is employed. The connecting member is not limited to the bracket 46. If connecting strength between the seat cushion frames 18 and the upper rail 28 can be maintained and if downward compression and deformation are permitted owing to the load added to the seat cushion frames 18, another structure may be employed. In the eighth embodiment, the sensor is constituted by the thin plate 44 and the distortion measuring sensor 62 is formed into the sheet shape. The sensor is not limited to the foregoing structure. If change in the distance from the seat cushion frames 18 to the upper rail 28 can be detected, another sensor, such as an optical sensor, may be employed. A sensor may be provided for the bracket 46 serving as the connecting member.

A ninth embodiment of the sitting passenger detecting apparatus according to the present invention will now be described with reference to FIGS. 33 and 34.

The same elements as those according to the first embodiment are given the same reference numerals and the same elements are omitted from description.

Figure 33:
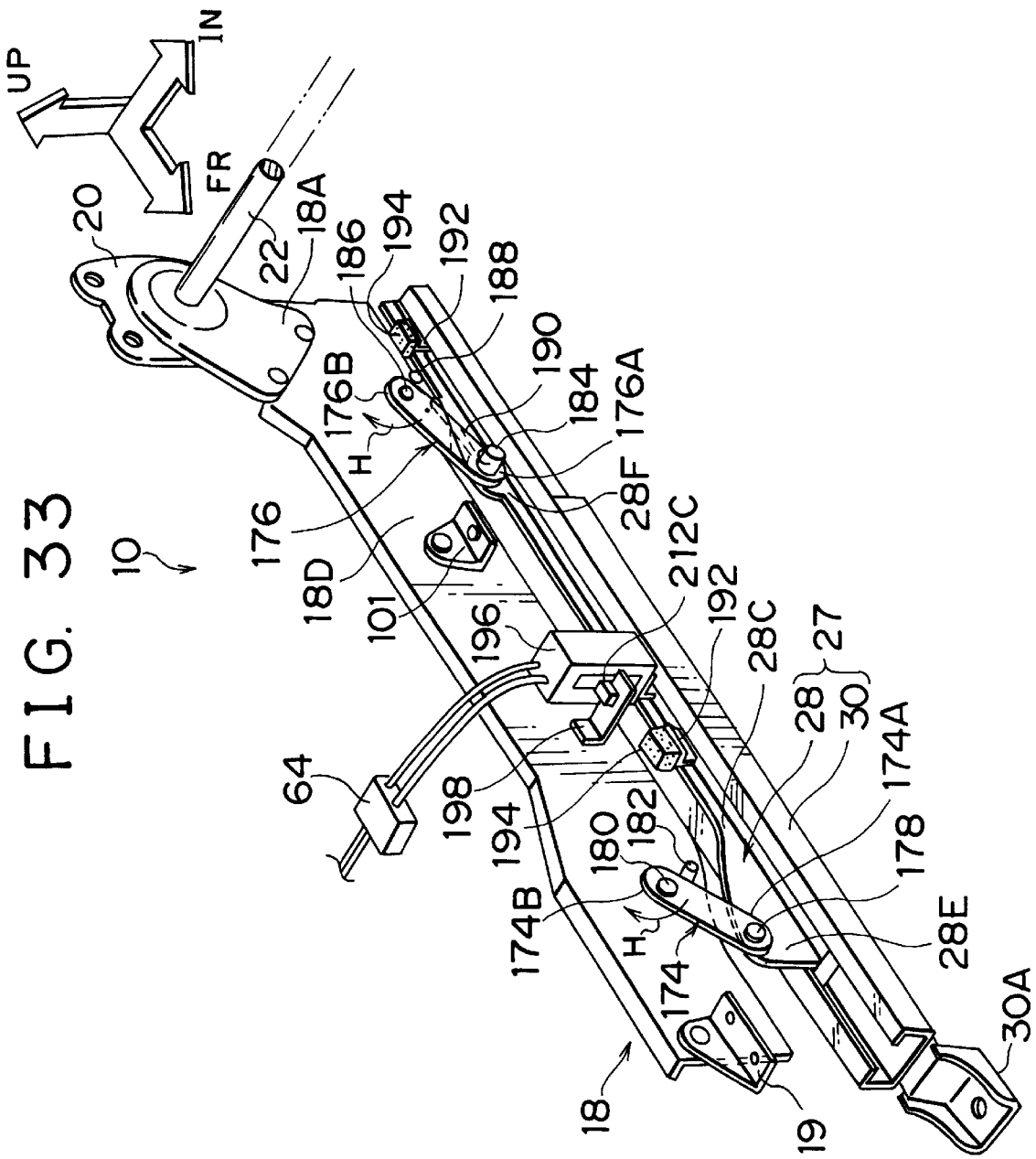
FIG. 33 is a perspective view showing an essential portion of a seat to which the sitting passenger detecting apparatus according to a ninth embodiment of the present invention is applied when the essential portion is viewed from a diagonally forward inside position of the vehicle.

As shown in FIG. 33, the ninth embodiment has a structure that a front link 174 and a rear link 176 serving as connecting members are disposed at positions adjacent to the front and rear ends on the inner surface of the vertical wall 18D of the right and left seat cushion frames 18 (FIG. 33 shows the outer seat cushion frame of the front assistance seat of a left-hand drive car). A front end (a lower end) 174A of the front link 174 is, by a pin 178, connected to an upper portion 28E of the front end of the vertical wall 28C of the upper rail 28. A rear end (an upper end) 174B of the front link 174 is, with a connecting pin 180, rotatively connected to the vertical wall 18D of the seat cushion frames 18. A stopper pin 182 is stood erect over the vertical wall 18D of the seat cushion frames 18. The stopper pin 182 is brought into contact with the lower surface of the rear portion of the front link 174 so that rotation of the front link 174 with respect to the vertical wall 18D by a degree larger than a predetermined angle is prevented.

Similarly to the front link 174, a front end (a lower end) 176A of the rear link 176 is, with a pin 184, rotatively connected to the upper portion 28F of the rear end of the vertical wall 28C of the upper rail 28. A rear end (an upper end) 176B of the rear link 176 is, with a connecting pin 186, rotatively connected to the vertical wall 18D of the seat cushion frames 18. A stopper pin 188 is stood erect over the vertical wall 18D of the seat cushion frames 18. The stopper pin 182 is brought into contact with the lower surface of the rear portion of the rear link 176 so that rotation of the rear link 176 with respect to the vertical wall 18D by a degree larger than a predetermined angle is prevented.

A spring 190 serving as an elastic member is engaged to the rear link 176 and the pin 184 to upwards (a direction in which the seat cushion frames 18 is moved upwards with respect to the upper rail 28) urge the rear link 176 with respect to the pin 184. Therefore, the rear link 176 is rotated in a direction in which the seat cushion frames 18 is moved upwards with respect to the upper rail 28 owing to the urging force of the spring 190. Then, the rear link 176 is stopped at a position (a position shown in FIG. 33) at which the rear link 176 is made contact with the stopper pin 188. At this time, the front link 174 has been made contact with the stopper pin 182. That is, when a load is added from a position above the seat cushion frame 18 at the stop position shown in FIG. 33, the rear link 176 and the front link 174 are rotated with respect to the upper rail 28 in a direction (a direction indicated with an arrow H) in which the seat cushion frames 18 is moved downwards.

If a load added to the seat cushion frames 18 from an upper position is larger than a predetermined value, the lower end of the seat cushion frame 18 is brought into contact with the front and rear stopper rubber members 194 secured to the upper rail 28 through a bracket 192. Thus, the seat cushion frames 18 are stopped.

A variable resistor 196 is secured to the upper rail 28. A lever 198 for operating the variable resistor 196 is secured to the vertical wall 18D of the seat cushion frames 18.

Figure 34:
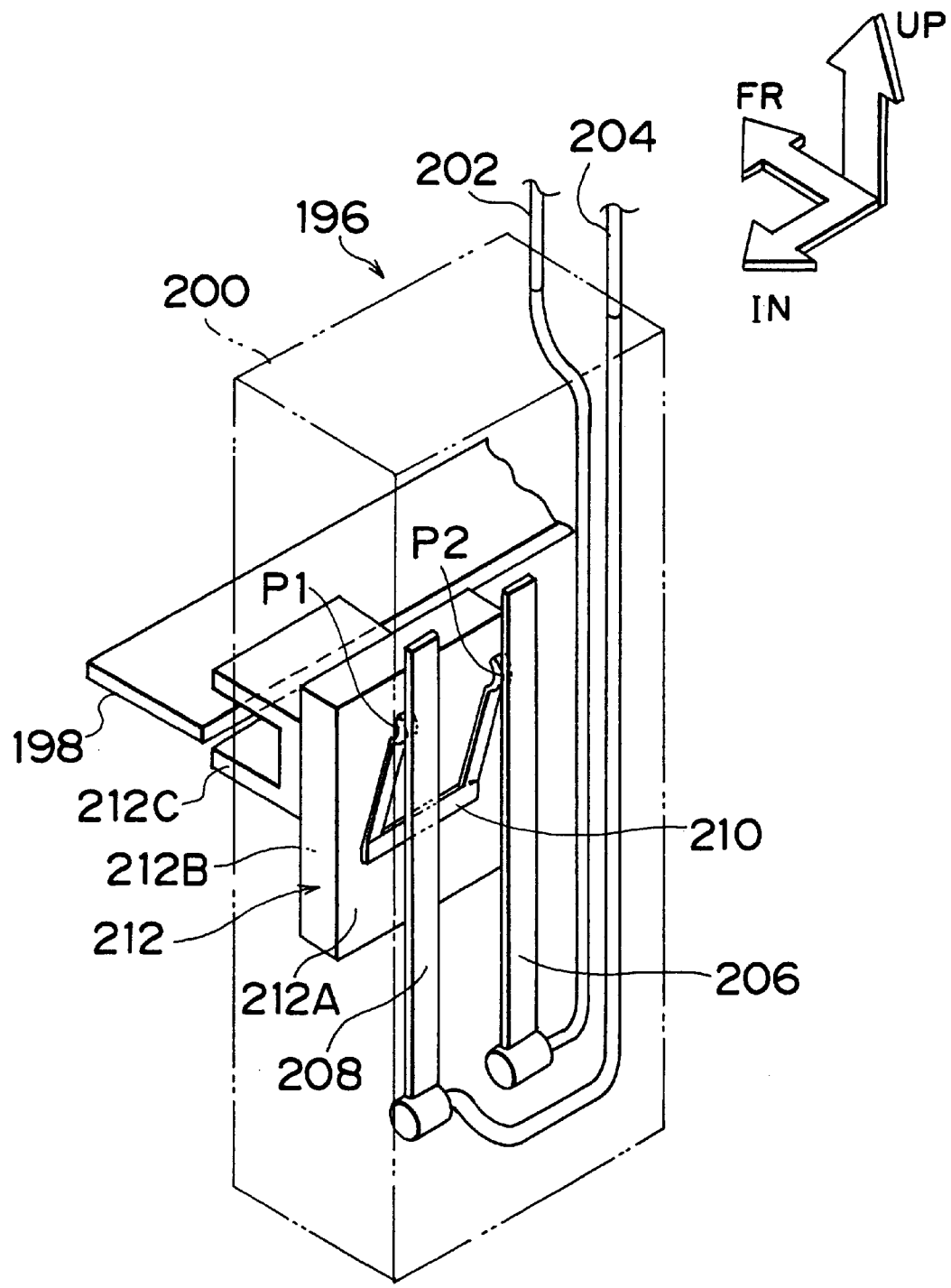
FIG. 34 is a perspective view showing the internal structure of a variable resistor of the sitting passenger detecting apparatus according to the ninth embodiment of the present invention.

As shown in FIG. 34, the variable resistor 196 incorporates a rectangular box-shape case 200. Electric wires 202 and 204 are connected to two elongated resistors 206 and 208 provided for the inner wall of the case 200 to be in parallel with each other. The variable resistor 196 is provided with a terminal 210 for connecting the resistors 206 and 208 to each other. The terminal 210 is connected to a rear surface 212A of a movable plate 212 made of an insulating material. The movable plate 212 is able to move in the lengthwise direction of the two resistors 206 and 208 by a guide (not shown) formed in the case 200. An upper engagement portion 212C having a side cross sectional shape which is U-shape facing side is provided for a front surface 212B of the movable plate 212. The lever 198 provided for the seat cushion frames 18 can be vertically engaged to the U-shape structure facing side. Therefore, when the lever 198 has been moved in the vertical direction together with the seat cushion frame 18, the lever 198 is engaged to the upper engagement portion 212C of the movable plate 212. Thus, the movable plate 212 is moved together with the lever 198. When the movable plate 212 has been moved, contacts P1 and P2 between the terminal 210 and the resistors 206 and 208 are moved so that the resistance of the variable resistor 196 is changed. The variable resistor 196 is connected to the control unit 64 through the electric wires 202 and 204.

The operation of the ninth embodiment will now be described.

The ninth embodiment structured as described above is arranged such that the weight of the passenger 60 sitting on the seat 10 is added to the rear portion 14A of the seat cushion 14 and the seat back 16 as indicated with the arrows F1 and F2 shown in FIG. 4. As a result, the seat cushion frames 18 is pressed downwards, causing the seat cushion frames 18 to be moved downwards. At this time, the front link 174 and the rear link 176 rotatively connected to the seat cushion frames 18 are rotated against the urging force of the springs 190 in a direction (a direction indicated with an arrow H) in which the seat cushion frames 18 are moved downwards with respect to the upper rail 28.

Since the lever 198 is, at this time, moved downwards together with the seat cushion frames 18, the movable plate 212 of the variable resistor 196 engaged to the lever 198 is moved downwards together with the lever 198. As a result, the contact P1 and P2 between the terminal 210 of the variable resistor 196 and the resistors 206 and 208 are moved downwards so that the resistance of the variable resistor 196 is changed (lowered in this embodiment). When the passenger 60 has been removed from the seat 10, the rear link 176 is rotated with respect to the upper rail 28 owing to the urging force of the spring 190 in the direction in which the seat cushion frames 18 are moved upwards. Thus, the rear link 176 and the front link 174 are stopped at positions (the positions shown in FIG. 19) at which the rear link 176 and the front link 174 are made contact with the corresponding stopper pins 188 and 182.

Therefore, similarly to the first embodiment, the ninth embodiment has the structure that if the seat is slid in the longitudinal direction, the relative position between the seat rail 27 and the seat cushion frames 18 is not changed. As a result, the load added to the seat can accurately be measured in accordance with change in the resistance of the variable resistor 196. Therefore, the accuracy for measuring the weight of the passenger sitting on the seat can be improved.

Since the ninth embodiment has the structure that the width of change in the output of a signal from the variable resistor 196 is large, a necessity for providing an amplifier for the output of the signal can be eliminated. Therefore, influences of change in the sliding resistance of each of the front link 174 and the rear link 176 and change in the amount of relative movement between the seat rail 27 and the seat cushion frames 18 occurring due to scattering of the elements of the seat and change in the amount of relative movement between the seat rail 27 and the seat cushion frame 18 occurring due to deformation of the seat caused when the seat has been joined to the car body on the output of the signal can be prevented. Also from the foregoing viewpoint, the accuracy of measuring the weight of the passenger sitting on the seat can be improved.

A tenth embodiment of the sitting passenger detecting apparatus according to the present invention will now be described with reference to FIG. 35.

The same elements as those according to the ninth embodiment are given the same reference numerals and the same elements are omitted from description.

Figure 35:
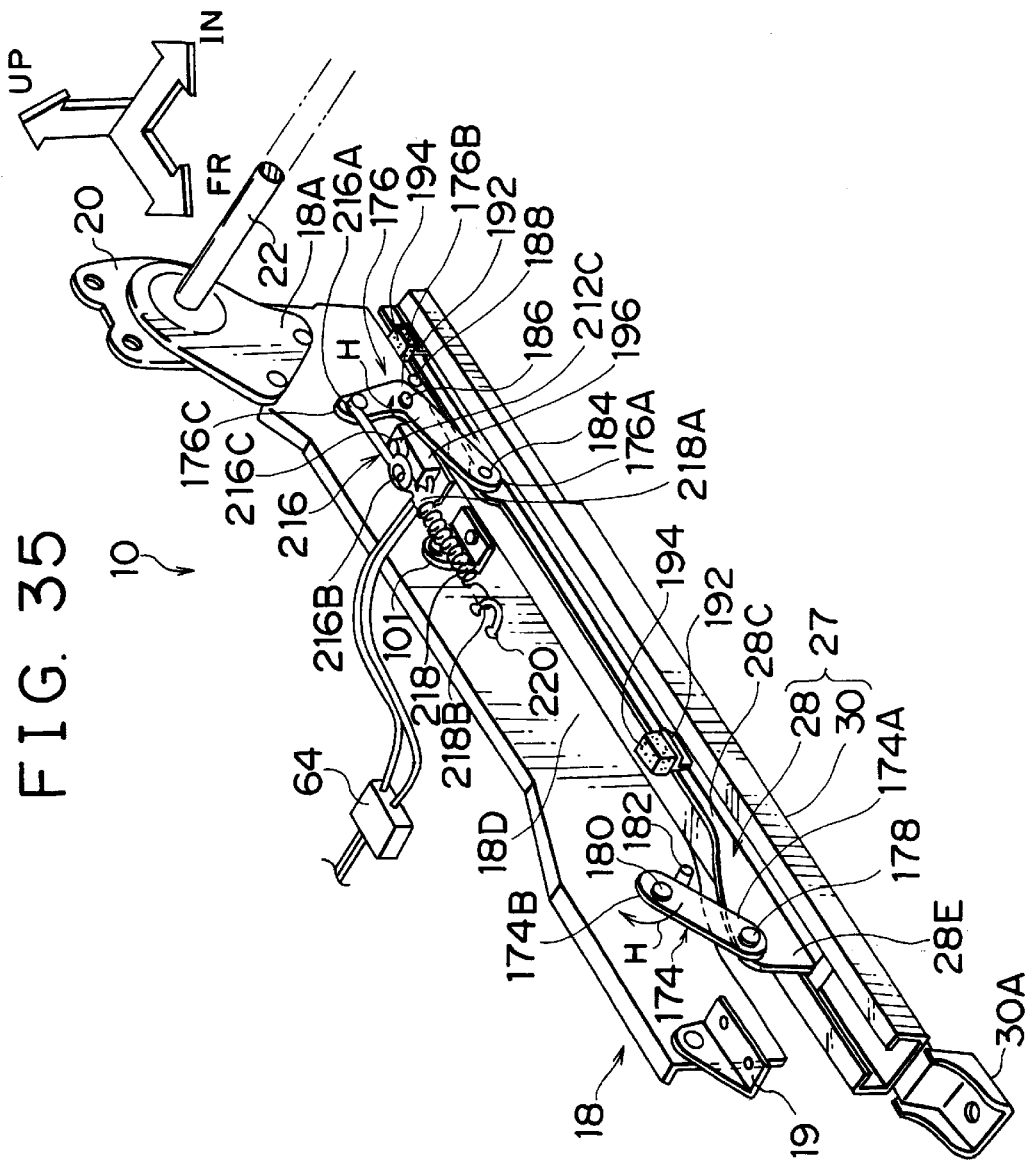
FIG. 35 is a perspective view showing an essential portion of a seat to which a sitting passenger detecting apparatus according to a tenth embodiment of the present invention is applied when the essential portion is viewed from a diagonally forward inside position of the vehicle.

As shown in FIG. 35, the tenth embodiment has a structure that an extension portion 176C facing upwards is formed from the rear end 176B of the rear link 176. A rear end 216A of an upper link 216 is rotatively supported at the leading end of the extension portion 176C. The upper link 216 is disposed in the longitudinal direction. A rear end 218A of a spring 218 serving as the elastic member is engaged to a front end 216B of the upper link 216. A front end 218B of the spring 218 is engaged to an engagement portion 220 provided for the vertical wall 18D of the seat cushion frame 18.

Therefore, the spring 218 urges the rear link 176 through the upper link 216 in a direction (a direction opposite to the direction indicated with the arrow H) in which the seat cushion frame 18 is moved upwards with respect to the upper rail 28. Therefore, the rear link 176 is rotated owing to the urging force of the spring 218 in the direction in which the seat cushion frame 18 is moved upwards with respect to the upper rail 28. Then, the rear link 176 is stopped at a position (the position shown in FIG. 35) at which the rear link 176 is made contact with the stopper pin 188. At this time, the front link 174 has been made contact with the stopper pin 182. That is, when a load is added from a position above the seat cushion frame 18 positioned at the stop position shown in FIG. 35, the upper link 216 is moved rearwards against the urging force of the spring 218. Moreover, the rear link 176 and the front link 174 are rotated in the direction (the direction indicated with arrow H) in which the seat cushion frame 18 is moved downwards with respect to the upper rail 28.

If the load added to the seat cushion frame 18 from an upper position is larger than a predetermined value, the lower edge of the seat cushion frame 18 is brought into contact with the front and rear stopper rubber members 194 secured to the upper rail 28 through the bracket 192. Thus, the seat cushion frame 18 is stopped.

The variable resistor 196 structured as shown in FIG. 34 showing the ninth embodiment is secured to the vertical wall 18D of the seat cushion frame 18 such that an upper engagement portion 212C of the variable resistor 196 faces upwards, that is, the variable resistor 196 is laid on the vertical wall 18D. An engagement portion 216C projecting downwards over the upper link 216 is engaged to the upper engagement portion 212C in the longitudinal direction. Therefore, when the seat cushion frame 18 has been moved in the vertical direction, the rotation of the rear link 176 causes the upper link 216 to be moved in the longitudinal direction. Thus, the engagement portion 216C of the upper link 216 is engaged to be engaged to the upper engagement portion 212C of the variable resistor 196. Therefore, the movable plate 212 shown in FIG. 34 is moved together with the 216c. When the movable plate 212 has been moved, the contacts P1 and P2 between the terminal 210 and the resistors 206 and 208 are moved similarly to the fifth embodiment. Thus, the resistance of the variable resistor 196 is changed.

The operation of the tenth embodiment will now be described.

The tenth embodiment having the above-mentioned structure is arranged such that the weight of the passenger 60 sitting on the seat 10 is mainly added to the rear portion 14A of the seat cushion 14 and the seat back 16 as indicated with the arrows F1 and F2 shown in FIG. 4. As a result, the seat cushion frame 18 is pressed downwards so that the seat cushion frame 18 is moved downwards. At this time, the front link 174 and the rear link 176 rotatively connected to the seat cushion frame 18 are rotated against the urging force of the springs 218 in the direction in which the seat cushion frame 18 is moved downwards with respect to the upper rail 28.

At this time, the engagement portion 216C of the upper link 216 is moved rearwards in synchronization with the downward movement of the seat cushion frame 18. Therefore, the movable plate 212 of the variable resistor 196 engaged to the engagement portion 216C is moved rearwards together with the engagement portion 216C. As a result, the contacts P1 and P2 between the terminal 210 of the variable resistor 196 shown in FIG. 20 and the resistors 206 and 208 are moved rearwards, causing the resistance of the variable resistor 196 to be changed. When the passenger 60 has been removed from the seat 10, the urging force of the spring 218 causes the rear link 176 to be rotated in the direction in which the seat cushion frame 18 is moved upwards with respect to the upper rail 28. Then, the rear link 176 and the front link 174 are stopped at the positions (the position shown in FIG. 35) at which the rear link 176 and the front link 174 are made contact with the stopper pins 188 and 182.

Therefore, similarly to the ninth embodiment, the tenth embodiment is free from any change in the relative position between the seat rail 27 and the seat cushion frame 18 if the seat is slid in the longitudinal direction. As a result, the load added to the seat can accurately be measured in accordance with change in the resistance of the variable resistor 196. Therefore, the accuracy of measuring the weight of the passenger sitting on the seat can be improved.

Since the tenth embodiment has the structure that the width of change in the output of a signal from the variable resistor 196 is large, a necessity for providing an amplifier for the output of the signal can be eliminated. Therefore, influences of change in the sliding resistance of each of the front link 174 and the rear link 176 and change in the amount of relative movement between the seat rail 27 and the seat cushion frames 18 occurring due scattering of the elements of the seat and change in the amount of relative movement between the seat rail 27 and the seat cushion frame 18 occurring due to deformation of the seat caused when the seat has been joined to the car body on the output of the signal can be prevented. Also from the foregoing viewpoint, the accuracy of measuring the weight of the passenger sitting on the seat can be improved.

Moreover, the tenth embodiment has the structure that the vertical displacement of the seat cushion frame 18 is converted into displacement in the longitudinal direction (in the lengthwise direction of the vehicle) by the rear link 176 and the upper link 216 each of which is formed into the L-shape. Therefore, the vertical space can be saved and satisfactory application to a vehicle having a small height is permitted.

An eleventh embodiment of the sitting passenger detecting apparatus according to the present invention will now be described with reference to FIGS. 36 and 37.

The same elements as those according to the ninth embodiment are given the same reference numeral and the same elements are omitted from description.

Figure 36:
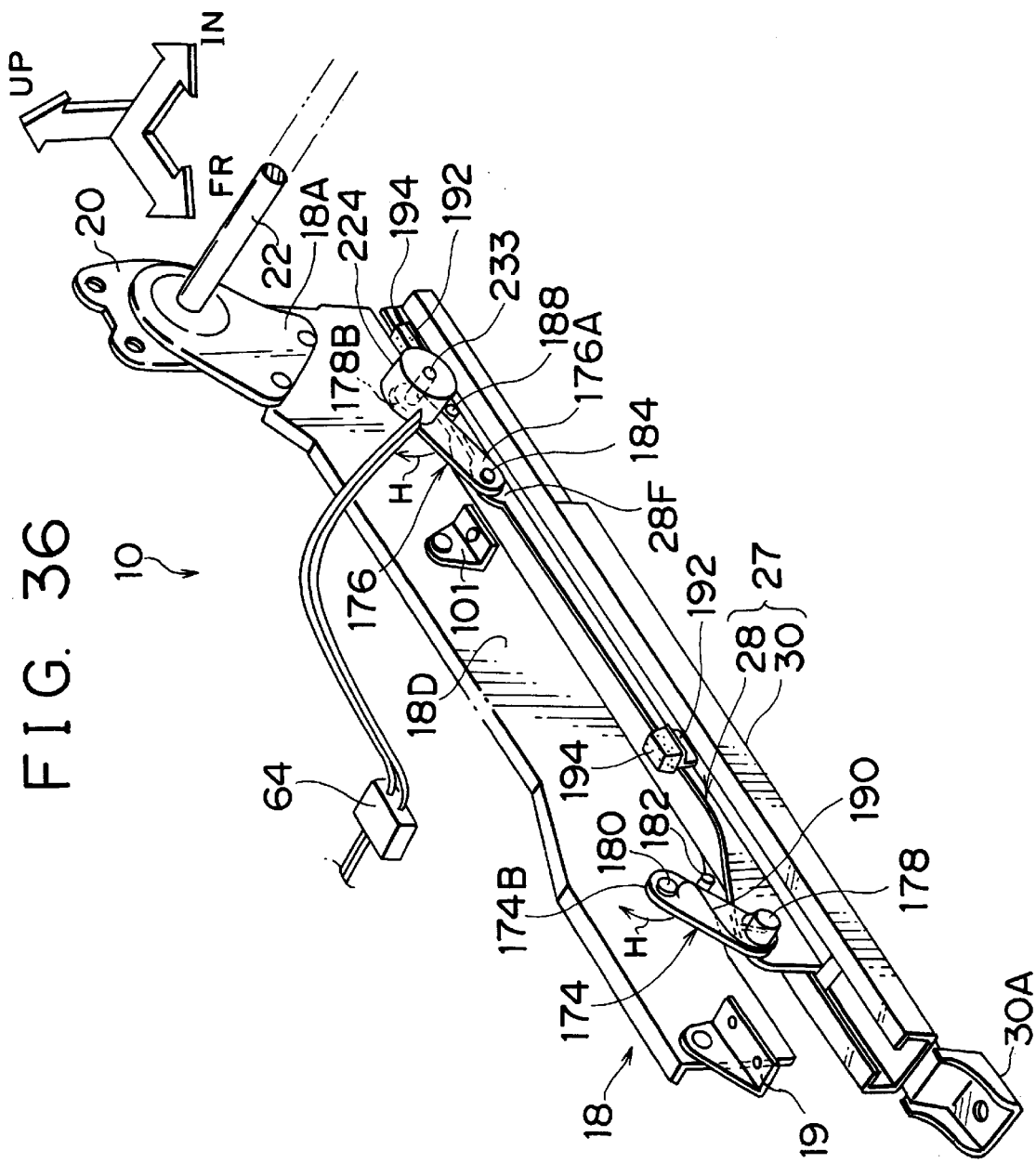
FIG. 36 is a perspective view showing an essential portion of a seat to which a sitting passenger detecting apparatus according to an eleventh embodiment of the present invention is applied when the essential portion is viewed from a diagonally forward inside position of the vehicle.

As shown in FIG. 36, the eleventh embodiment has the structure that the spring 190 serving as the elastic member is engaged to the front link 174 and the pin 178. The spring 190 urges the front link 174 in a direction (a direction opposite to the direction indicated with arrow H) in which the seat cushion frame 18 is moved upwards with respect to the upper rail 28. Therefore, the front link 174 is rotated owing the urging force of the spring 190 in a direction in which the seat cushion frame 18 is moved upwards with respect to the upper rail 28. Thus, the front link 174 is stopped at a position (the position shown in FIG. 36) at which the front link 174 is made contact with the stopper pin 182. Note that the rear link 176 has been made contact with the stopper pin 188. When a load is added from a position above the seat cushion frame 18 at the stop position shown in FIG. 36, the front link 174 and the rear link 176 are rotated against the urging force of the spring 190 in the direction (the direction indicated with the arrow H) in which the seat cushion frame 18 is moved downwards with respect to the upper rail 28.

When the load added to the seat cushion frame 18 from an upper position is larger than a predetermined value, the lower edge of the seat cushion frame 18 is made contact with the front and rear stopper rubber members 194 secured to the upper rail 28 through the brackets 192. Thus, the seat cushion frame 18 is stopped.

Figure 37:
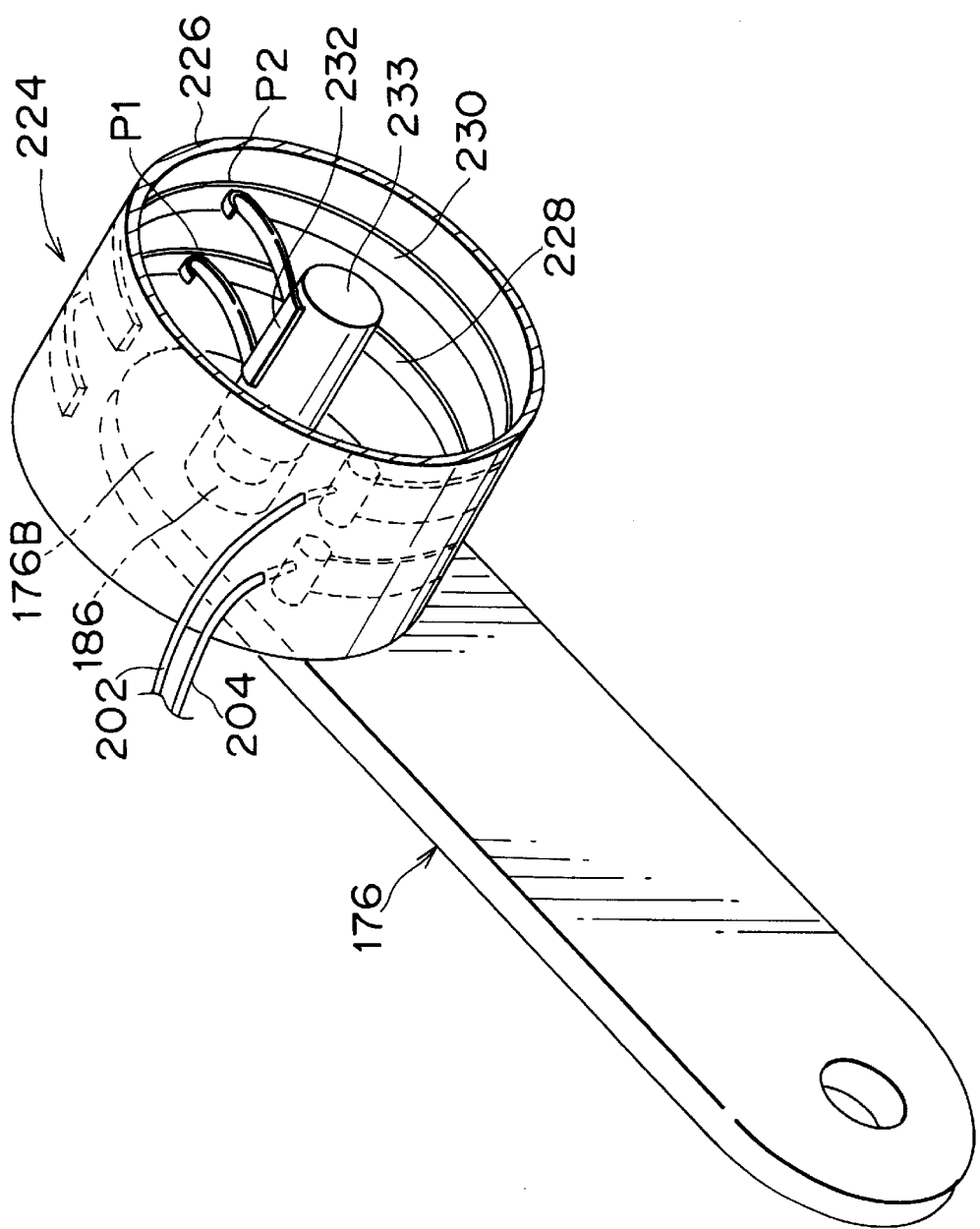
FIG. 37 is a perspective view showing the internal structure of a variable resistor of the sitting passenger detecting apparatus according to the eleventh embodiment of the present invention.

As shown in FIG. 37, the variable resistor 224 incorporates a cylindrical case 226. The case 226 is secured to the rear end 176B of the rear link 176. Two elongated resistors 228 and 230 are provided for the inner surface of the case 226 to be in parallel with each other. The electric wire 202 and 204 are connected to the resistors 228 and 230. A terminal 232 for connecting the resistors 228 and 230 to each other is secured to the rotational shaft 233. The rotational shaft 233 is connected to the connecting pin 186. Note that the connecting pin 186 may be extended to directly secure the terminal 232 to the connecting pin 186. Therefore, when the rear link 176 has been rotated around the connecting pin 186 together with the seat cushion frame 18, the contacts P1 and P2 between the terminal 232 and the resistors 228 and 230 are moved to change the resistance of the variable resistor 224. Note that the variable resistor 224 is connected to the control unit 64 through the electric wire 202 and 204.

The operation of the eleventh embodiment will now be described.

The eleventh embodiment having the above-mentioned structure is arranged such that the weight of the passenger 60 sitting on the seat 10 is mainly added to the rear portion 14A of the seat cushion 14 and the seat back 16 as indicated with the arrows F1 and F2 arrows F1 and F2 shown in FIG. 4. As a result, the seat cushion frame 18 is pressed downwards, causing the seat cushion frame 18 to be moved downwards. At this time, the front link 174 and the rear link 176 rotatively connected to the seat cushion frame 18 are rotated against the urging force of the springs 190 in the direction in which the seat cushion frame 18 is moved downwards (the direction indicated with the arrow H) with respect to the upper rail 28.

When the rear link 176 has been rotated around the connecting pin 186 in synchronization with the downward movement of the seat cushion frame 18, the resistors 228 and 230 are rotated with respect to the terminal 232. Thus, the contacts P1 and P2 between the terminal 232 and the resistors 228 and 230 are moved so that the resistance of the variable resistor 224 is changed. When the passenger 60 has been removed from the seat 10, the rear link 176 is rotated owing to the urging force of the spring 190 in the direction in which the seat cushion frame 18 is moved upwards with respect to the upper rail 28. Thus, the rear link 176 and the front link 174 are stopped at the positions (the positions shown in FIG. 36) at which the rear link 176 and the front link 174 are made contact with the stopper pins 188 and 182.

Similarly to the first embodiment, the eleventh embodiment is free from change in the relative position between the seat rail 27 and the seat cushion frame 18 if the seat is slid in the longitudinal direction. As a result, the load added to the seat can accurately be measured in accordance with change in the resistance of the variable- resistor 224. Therefore, the accuracy of measuring the weight of the passenger sitting on the seat can be improved.

Since the eleventh embodiment has the structure that the width of change in the output of a signal from the variable resistor 224 is large, a necessity for providing an amplifier for the output of the signal can be eliminated. Therefore, influences of change in the sliding resistance of each of the front link 174 and the rear link 176 and change in the amount of relative movement between the seat rail 27 and the seat cushion frames 18 occurring due to scattering of the elements of the seat and change in the amount of relative movement between the seat rail 27 and the seat cushion frame 18 occurring due to deformation of the seat caused when the seat has been joined to the car body on the output of the signal can be prevented. Also from the foregoing viewpoint, the accuracy of measuring the weight of the passenger sitting on the seat can be improved.

The eleventh embodiment has the structure that the output of the signal from the variable resistor 224 is directly changed by using the rotation of the rear link 176. Therefore, an error which is made when displacement occurring due to rotation is converted into the vertical displacement can be prevented. A structure may be employed in which the variable resistor 224 is provided for the front link 174.

A twelfth embodiment of the sitting passenger detecting apparatus according to the present invention will now be described with reference to FIG. 38.

The same elements as those according to the eleventh embodiment are given the same reference numerals and the same elements are omitted from description.

Figure 38:
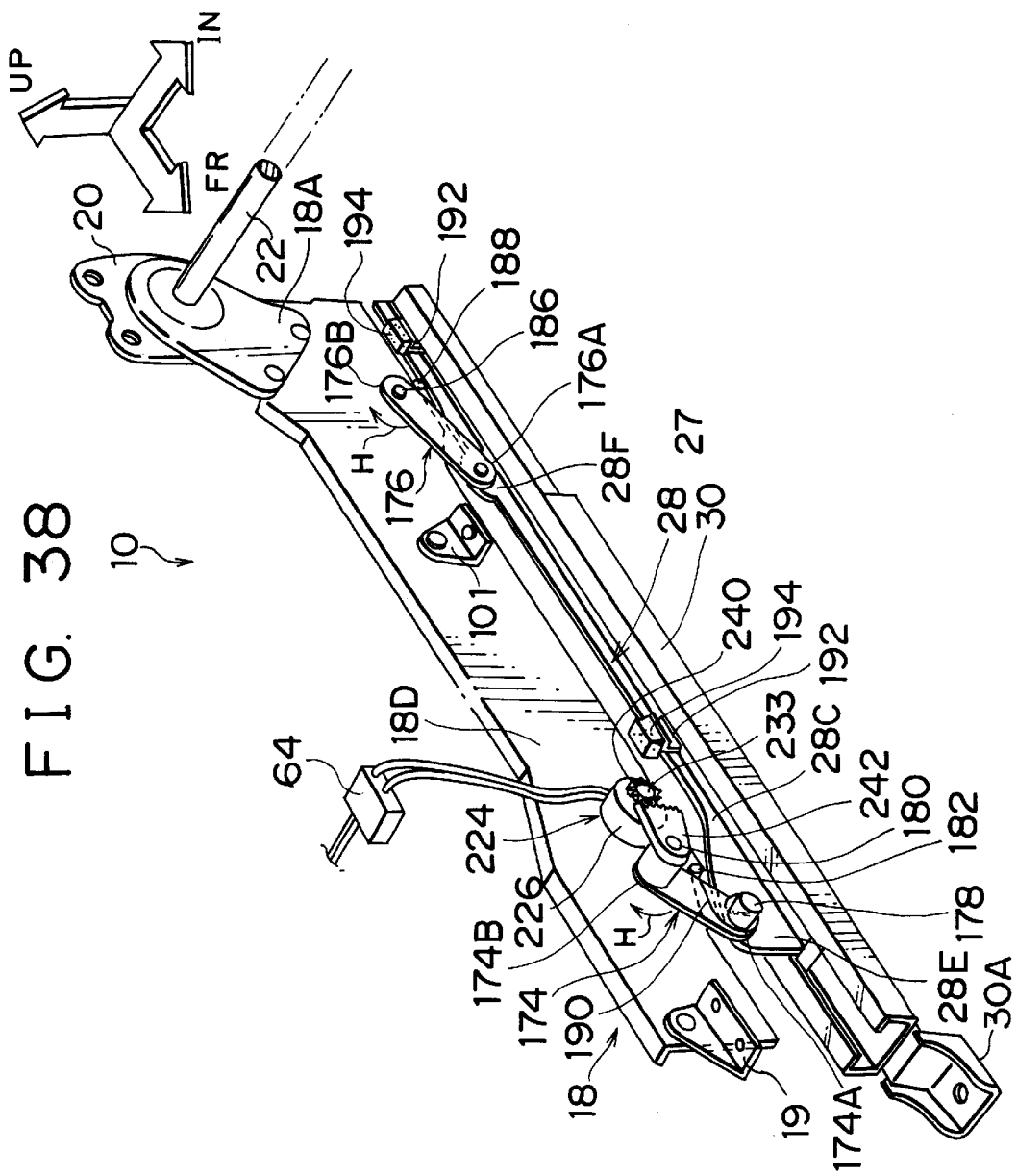
FIG. 38 is a perspective view showing an essential portion of a seat to which a sitting passenger detecting apparatus according to a twelfth embodiment of the present invention is applied when the essential portion is viewed from a diagonally forward inside position of the vehicle.

As shown in FIG. 38, the twelfth embodiment has a structure that a cylindrical case 226 (see FIG. 37) of the variable resistor 224 is secured to the vertical wall 18D of the seat cushion frame 18. A first gear 240 serving as the amplifying means is secured to an end of the rotational shaft 233. A second gear 242 serving as the amplifying means is secured to the rear end 174B of the front link 174 so as to be engaged to the first gear 240. The second gear 242 and the first gear 240 are reduction gears for enlarging the rotational angle of the front link 174 to transmit the rotational angle to the rotational shaft 233 of the variable resistor 224.

The operation of the twelfth embodiment will now be described.

The twelfth embodiment having the above-mentioned structure is arranged such that the weight of the passenger 60 sitting on the seat 10 is mainly added to the rear portion 14A of the seat cushion 14 and the seat back 16 as indicated with the arrows F1 and F2 shown in FIG. 4. As a result, the seat cushion frame 18 is pressed downwards, causing the seat cushion frame 18 to be moved downwards. At this time, the front link 174 and the rear link 176 rotatively connected to the seat cushion frame 18 are rotated against the urging force of the springs 190 in the direction (the direction indicated with the arrow H) in which the seat cushion frame 18 is moved downwards with respect to the upper rail 28.

When the front link 174 is rotated around the connecting pin 180 in synchronization with the downward movement of the seat cushion frame 18, the rotational angle of the front link 174 is enlarged owing to the second gear 242 and the first gear 240 so as to be transmitted to the rotational shaft 233 of the variable resistor 224. As a result, similarly to the eleventh embodiment shown in FIG. 37, the contacts P1 and P2 between the terminal 232 and the resistors 228 and 230 are moved so that the resistance of the variable resistor 224 is changed.

When the passenger 60 has been removed from the seat 10, the rear link 176 is rotated owing to the urging force of the spring 190 in the direction in which the seat cushion frame 18 is moved upwards with respect to the upper rail 28. Thus, the rear link 176 and the front link 174 are stopped at the positions (the positions shown in FIG. 38) at which the rear link 176 and the front link 174 are made contact with the stopper pins 188 and 182.

Similarly to the first embodiment, the twelfth embodiment is free from change in the relative position between the seat rail 27 and the seat cushion frame 18 if the seat is slid in the longitudinal direction. As a result, the load added to the seat can accurately be measured in accordance with change in the resistance of the variable resistor 224. Therefore, the accuracy of measuring the weight of the passenger sitting on the seat can be improved.

Since the twelfth embodiment has the structure that the width of change in the output of a signal from the variable resistor 224 is large, a necessity for providing an amplifier for the output of the signal can be eliminated. Therefore, influences of change in the sliding resistance of each of the front link 174 and the rear link 176 and change in the amount of relative movement between the seat rail 27 and the seat cushion frames 18 occurring due to scattering of the elements of the seat and change in the amount of relative movement between the seat rail 27 and the seat cushion frame 18 occurring due to deformation of the seat caused when the seat has been joined to the car body on the output of the signal can be prevented. Also from the foregoing viewpoint, the accuracy of measuring the weight of the passenger sitting on the seat can be improved.

The twelfth embodiment has the structure that the second gear 242 and the first gear 240 are reduction gears. Thus, the rotational angle of the front link 174 is enlarged (amplified) when it is transmitted to the rotational shaft 233 of the variable resistor 224. The width of change in the output of the signal from the variable resistor 224 can furthermore be enlarged.

A thirteenth embodiment of the sitting passenger detecting apparatus according to the present invention will now be described with reference to FIGS. 39 to 42.

The same elements as those according to the first embodiment (FIGS. 1 and 5) are given the same reference numerals and the same elements are omitted from description.

Figure 39:
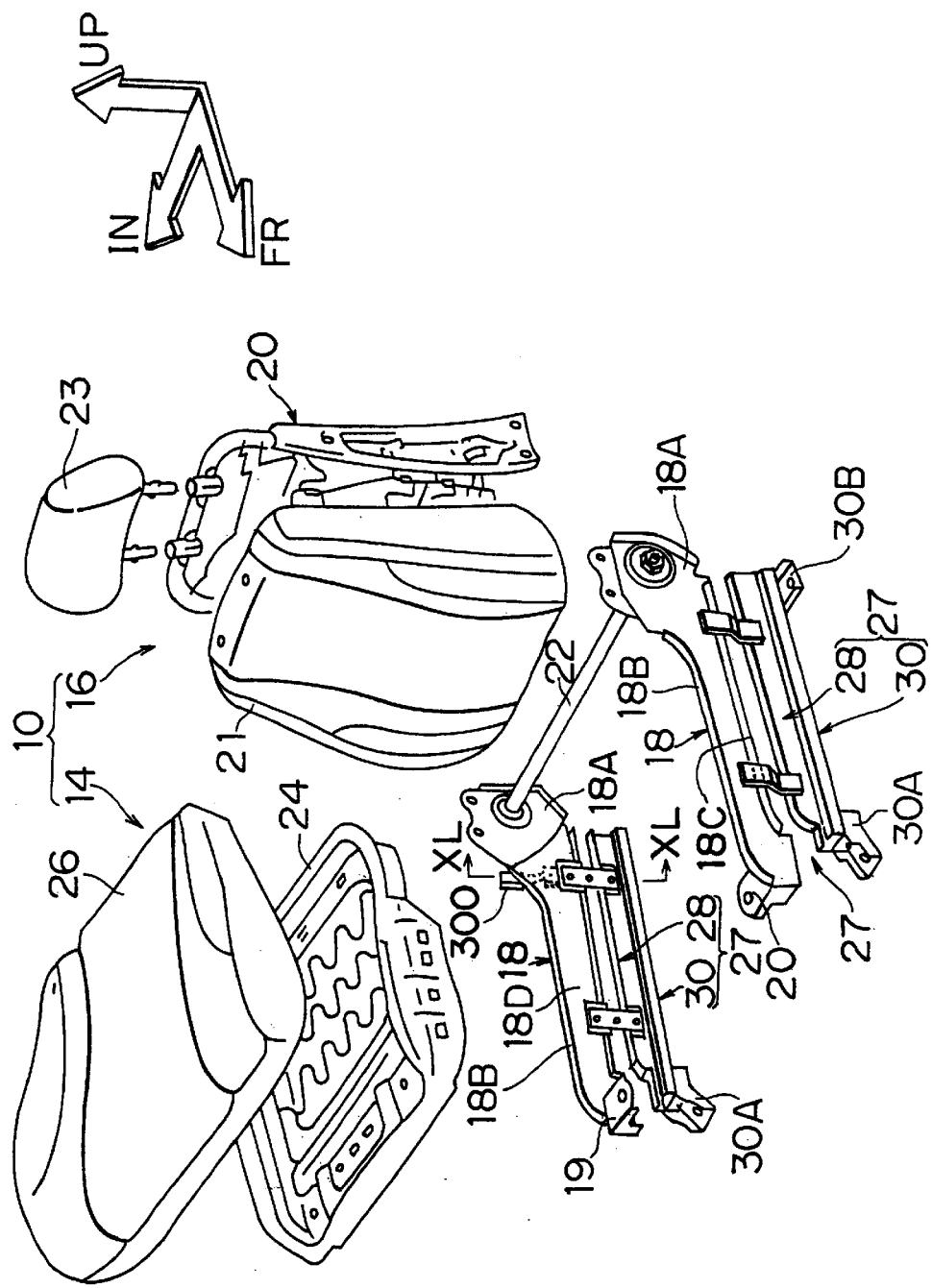
FIG. 39 is an exploded perspective view of a seat to which the sitting passenger detecting apparatus according to a thirteenth embodiment of the present invention is applied when viewed from a diagonally forward outside position of the vehicle.

Referring to FIG. 39, an inner buckle 300 is attached to a rear end portion 18A of a seat cushion frame 18 on the inner side of a seat 10 in the lateral direction.

Figure 40:
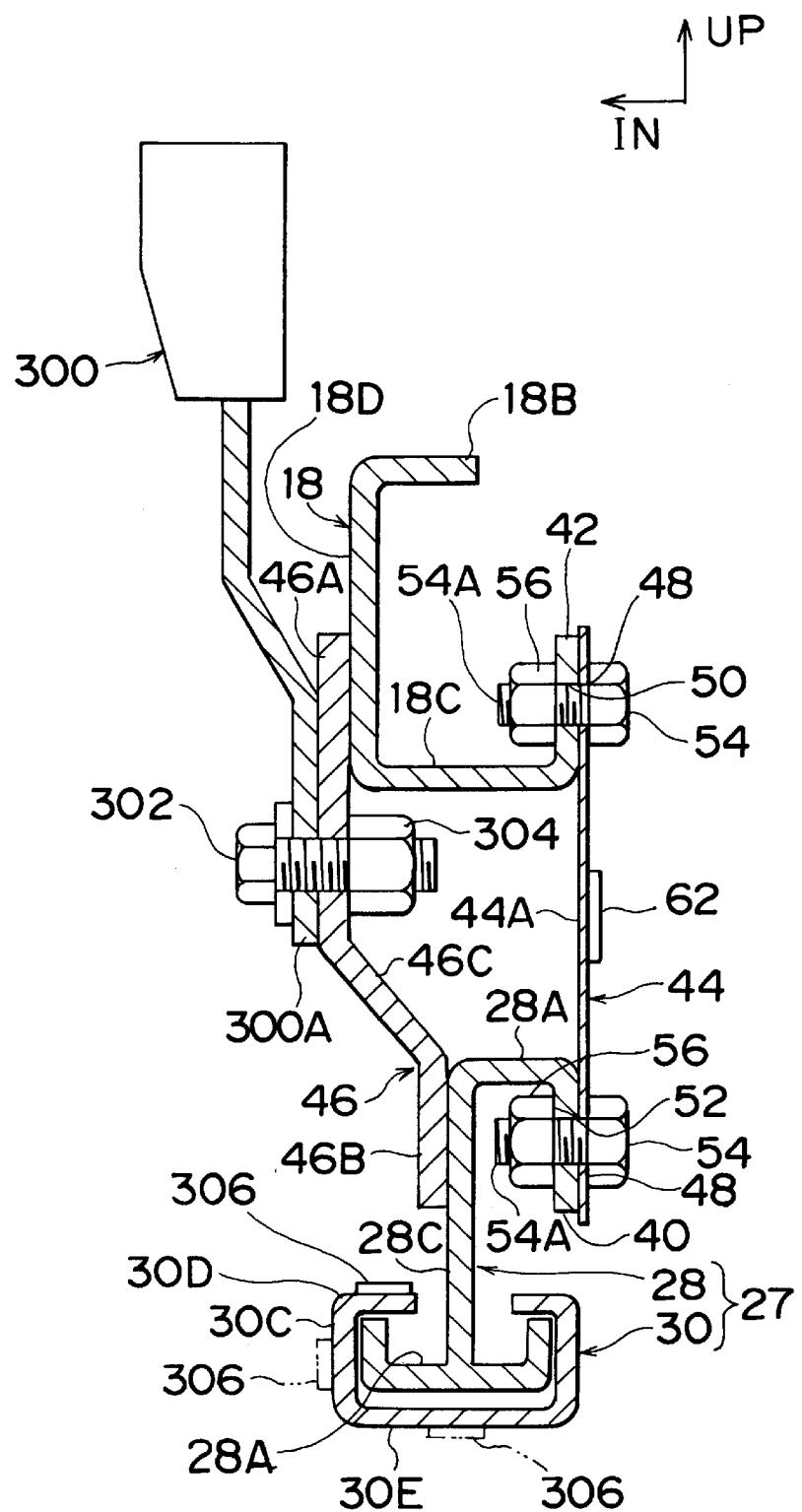
FIG. 40 is an enlarged sectional view taken along line XL—XL of FIG. 39.

Referring to FIG. 40, the inner buckle 300 is fixed to the upper portion of a bent portion 46C of a bracket 46 with a bolt 302 and a nut 304. A deformation detection sensor 306 used as a diagnostic sensor is disposed in the vicinity of the lower rail 30 close to the position where the inner buckle 300 is disposed, which corresponds to the position in the vicinity of the rear end portion of a flange 30D formed on the upper end portion of the side wall 30C on the inside of the lower rail 30 in the lateral direction so as to face the inside of the seat. The deformation detection sensor 306 serves to detect deformation of the lower rail 30.

The deformation detection sensor 306 is connected to the control unit 64 shown in FIG. 4, which is designed to alarm an indicator 71 as the alarm means for abnormality in the sitting passenger detection function based on an output signal generated when the deformation detection sensor 306 detects the output signal (predetermined deformation) which is equal to or greater than a predetermined value.

An operation of the present embodiment will be described.

Figure 41:
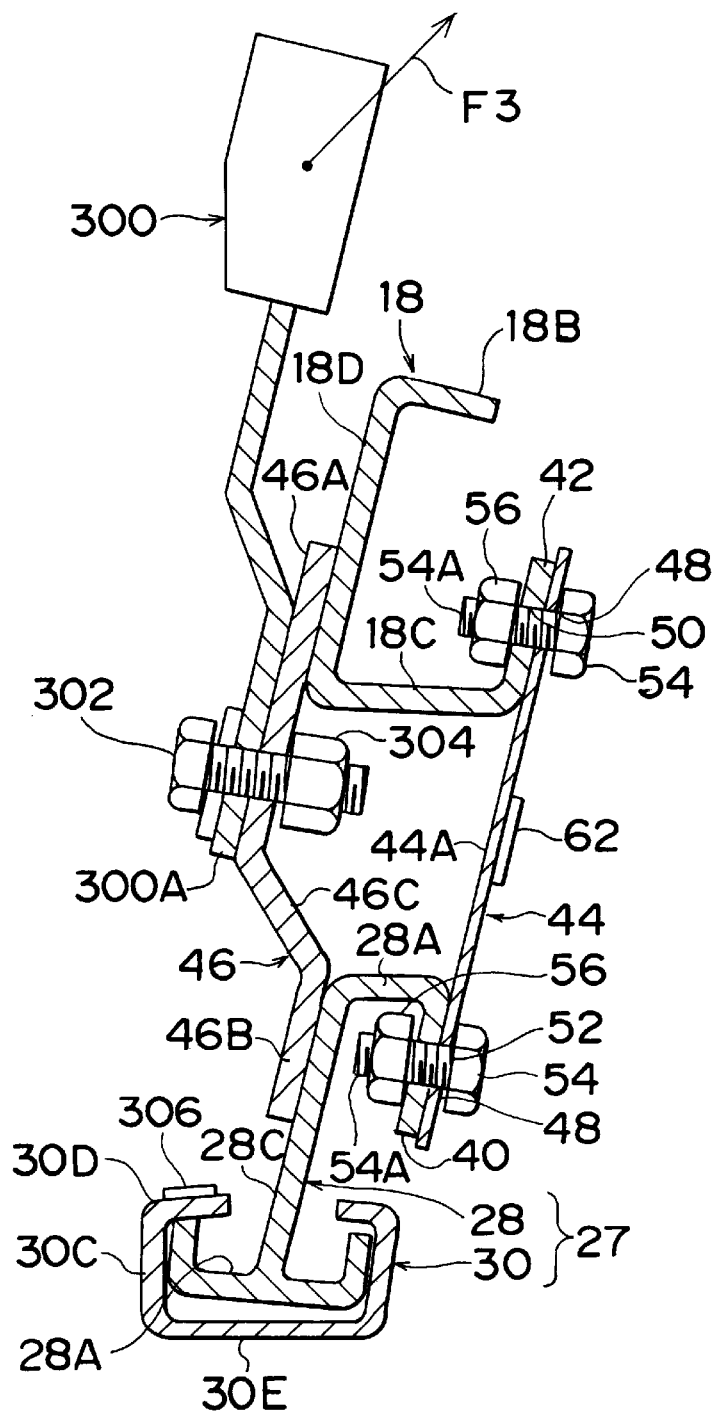
FIG. 41 is an enlarged sectional view corresponding to FIG. 26 representing deformed state detected by the sitting passenger detecting apparatus according to the thirteenth embodiment of the present invention.

In addition to the description with respect to the operation of the first embodiment, collision of the vehicle may cause the passenger sitting on the seat 10 to apply a large load F3 upward to the inside of the vehicle body to the inner buckle 300 as shown in FIG. 41. When the lower rail 30 of the seat rail 27 deforms, a thin plate 44 provided with the deformation measurement sensor 62 also deforms, thus interfering accurate measurement of the weight of the sitting passenger.

Figure 42:
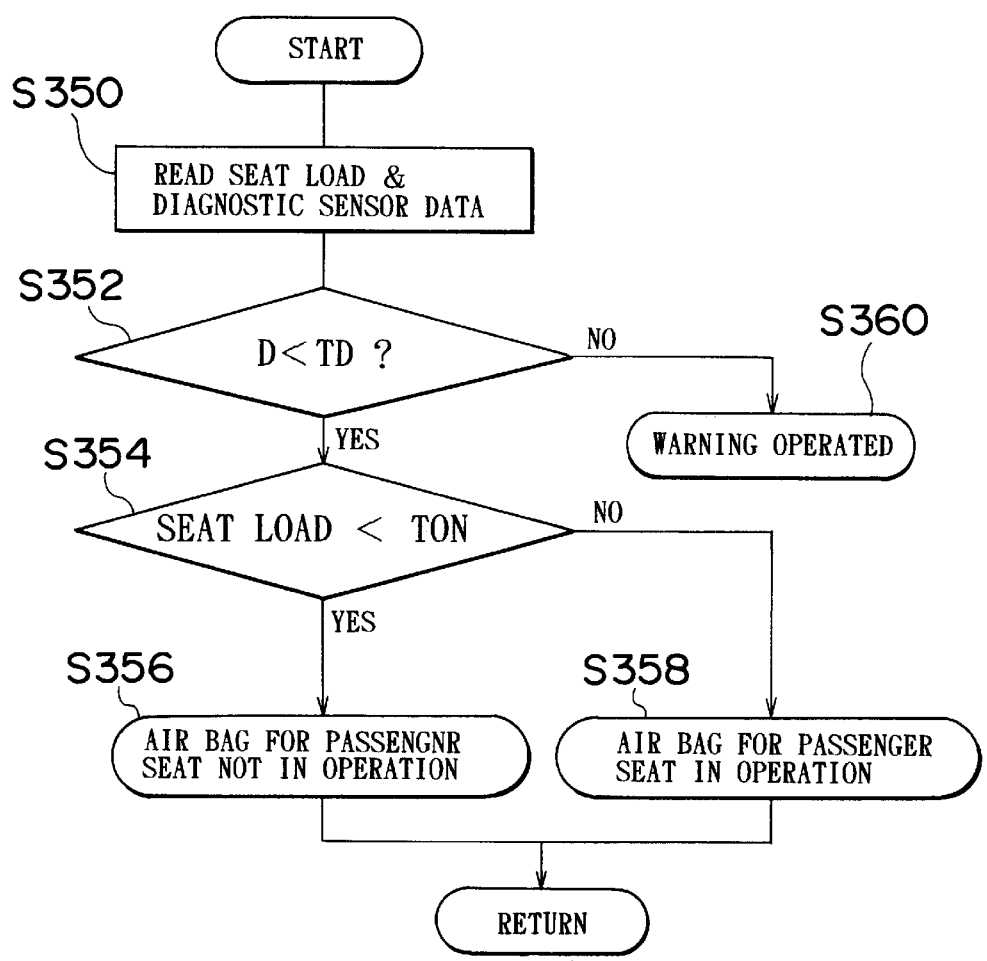
FIG. 42 is a flow chart of a control routine which is executed by the setting passenger detecting apparatus according to the thirteenth embodiment of the present invention.

The control unit 64 of this embodiment is structured to execute the routine represented by a flow chart shown in FIG. 42. In step S350, a signal output from each deformation measurement sensor 62 as a seat load sensor for detecting the weight of the passenger sitting on the seat is read, and a signal output from the deformation detection sensor 306 as the diagnostic sensor is also read. Then in step S352, a determination is made whether or not an output signal from the deformation detection sensor 306 is less than a predetermined threshold value TD. If it is determined that the output signal D is less than the threshold value TD, the process proceeds to step S354. In step S354, a seat load is operated from the output signal of each of the deformation measurement sensors 62, and a determination is made whether or not the operation result is less than a predetermined threshold value TON. If it is determined that the seat load is not less than the threshold value TON, the process proceeds to step S358 where the air bag system for a passenger seat is brought into workable state.

Meanwhile if it is determined that the output signal D from the deformation detection sensor 306 is not less than the threshold value TD in step S352, the process proceeds to step S360. In step S360, the indicator 71 as alarm means is activated (warning operated) such that the passenger is alarmed for abnormality in the sitting passenger detecting function.

In the present embodiment, when the lower rail 30 or the like of the seat rail 27 is deformed by, for example, vehicle collision, the indicator 71 is capable of alarming the passenger for the deformation.

In the present embodiment, the deformation detection sensor 306 is disposed in the vicinity of the rear end portion of the flange 30D of the lower rail 30 formed on the upper portion of the inner wall portion 30C in the lateral direction so as to face the inside of the seat. However, the deformation detection sensor 306 does not have to be disposed in the position as described above. The deformation detection sensor 306 may be disposed in the vicinity of the rear end portion of the inner wall portion 30C of the lower rail 30 as shown by an alternate long and two dashed line of FIG. 40. Alternatively the deformation detection sensor 306 may be disposed in the vicinity of the rear end of the lower wall portion 30E of the lower rail 30.

The deformation detection sensor 306 may be disposed on the lower rail 30 at the outer side of the seat 10 in a lateral direction of a vehicle.

The present embodiment employs the deformation detection sensor 306. However, it may be structured requiring no deformation detection sensor 306.

Figure 43:
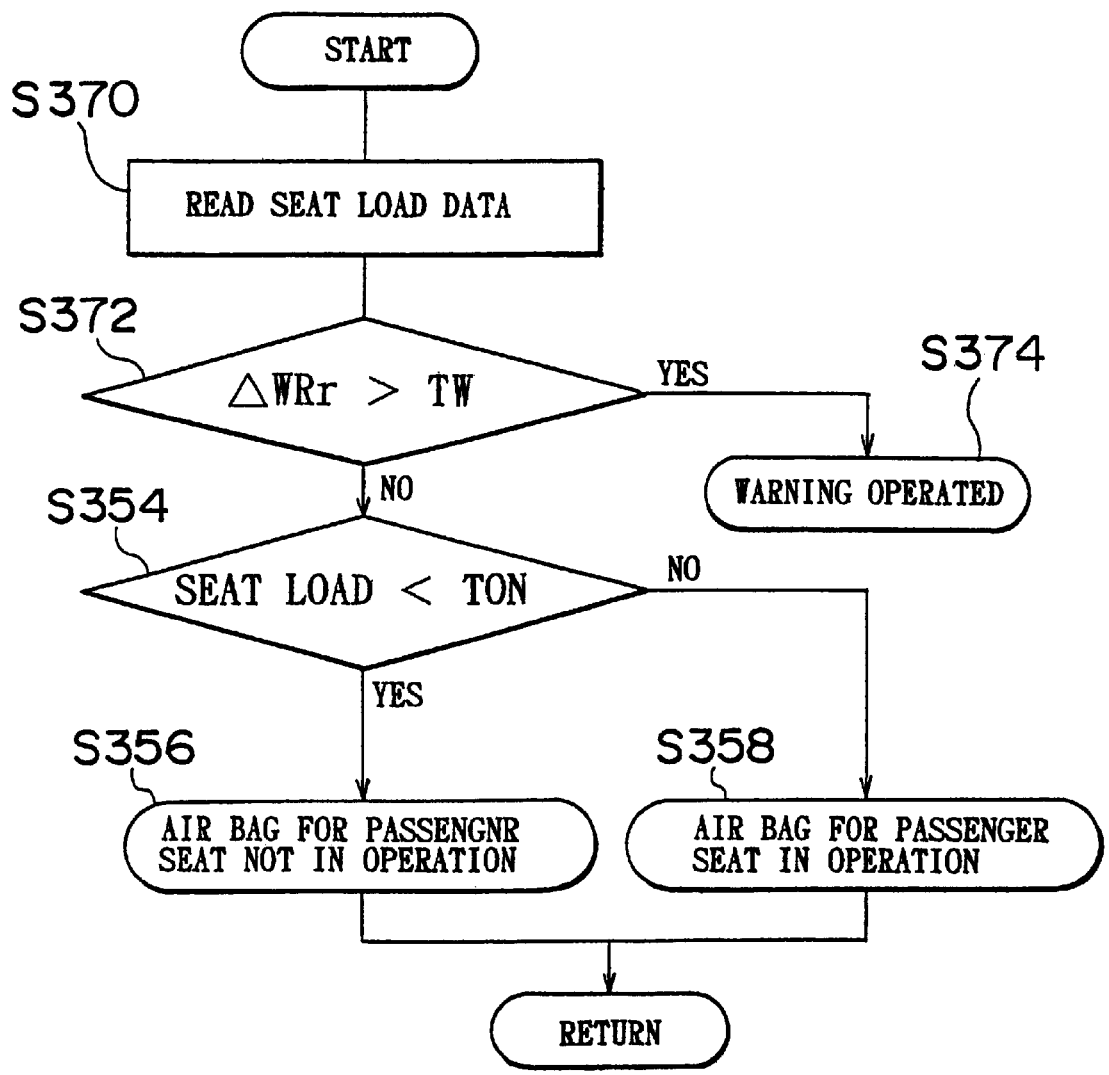
FIG. 43 is a flow chart of a control routine which is executed by the setting passenger detecting apparatus as a modified example according to the thirteenth embodiment of the present invention.

The control unit 64 of the aforementioned modified example executes the routine represented by the flow chart shown in FIG. 43. In step S370, a signal output from each of the deformation measurement sensor 62 as the seat load sensor for detecting the weight of the passenger sitting on the seat is read. Then in step S372, a determination is made whether or not a change rate ΔWRr of the output signal from each of the deformation measurement sensor 62 exceeds a predetermined change rate (threshold value) TW. If it is determined that the change rate ΔWRr exceeds the change rate TW, the process proceeds to step S374. In step S374, the indicator 71 as alarm means is activated for alarming the passenger for abnormality in the sitting passenger detection function.

When the change rate ΔWRr of the output signal from each of the deformation measurement sensor 64 exceeds a predetermined change rate TW owing to vehicle collision, the passenger can be alarmed by the indicator 71.

If it is determined that the change rate ΔWRr does not exceed the change rate TW in S372, the same routine starting from step S354 onward as shown by the flow chart of FIG. 42 can be repeatedly executed.

Figure 44:
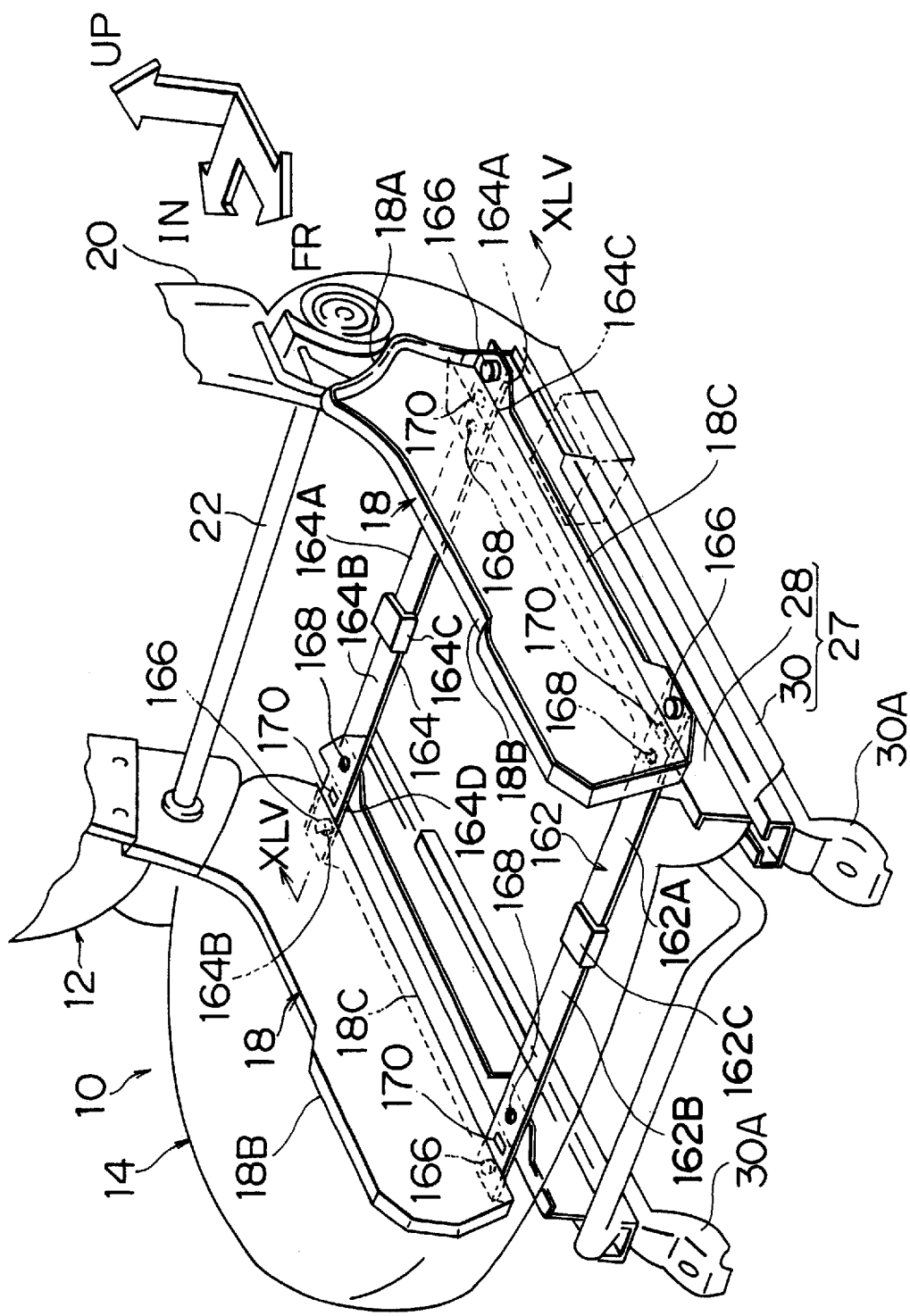
FIG. 44 is a perspective view showing an essential portion of a seat to which a sitting passenger detecting apparatus according to a fourteenth embodiment of the present invention is applied when viewed from a diagonally forward outside position of the vehicle.

A fourteenth embodiment of the sitting passenger detecting apparatus according to the present invention will now be described with reference to FIGS. 44 and 45.

The same elements as those according to the fourth embodiment (FIGS. 16, 17) are given the same reference numerals and the same elements are omitted from description.

In the present embodiment, the front sensor bar 162 and the rear sensor bar 164 are divided to left and right sections at the center, respectively. A left sensor bar 162A of the front sensor bar 162 has the different spring constant as that of the right sensor bar 162B such that vertical resonance frequencies of the left and right sensor bars 162A and 162B are not matched. Likewise a left sensor bar 164A of the rear sensor bar 164 has the different spring constant as that of the right sensor bar 164B such that vertical resonance frequencies of the left and right sensor bars 164A and 164B are not matched.

Each spring constant of the respective sensor bars is set to any value so long as the sitting passenger detection performance of the sensor 170 as the displacement detection means is not influenced. If the spring constant of each sensor bar is set to excessively large value, the sensor bar hardly deforms to diminish the detection signal, which becomes likely to be affected by noise. Meanwhile if the spring constant of each sensor bar is set to excessively small value, durability of the sensor bar is decreased. Each spring constant of the respective sensor bars is set considering the aforementioned effective range.

Figure 45:
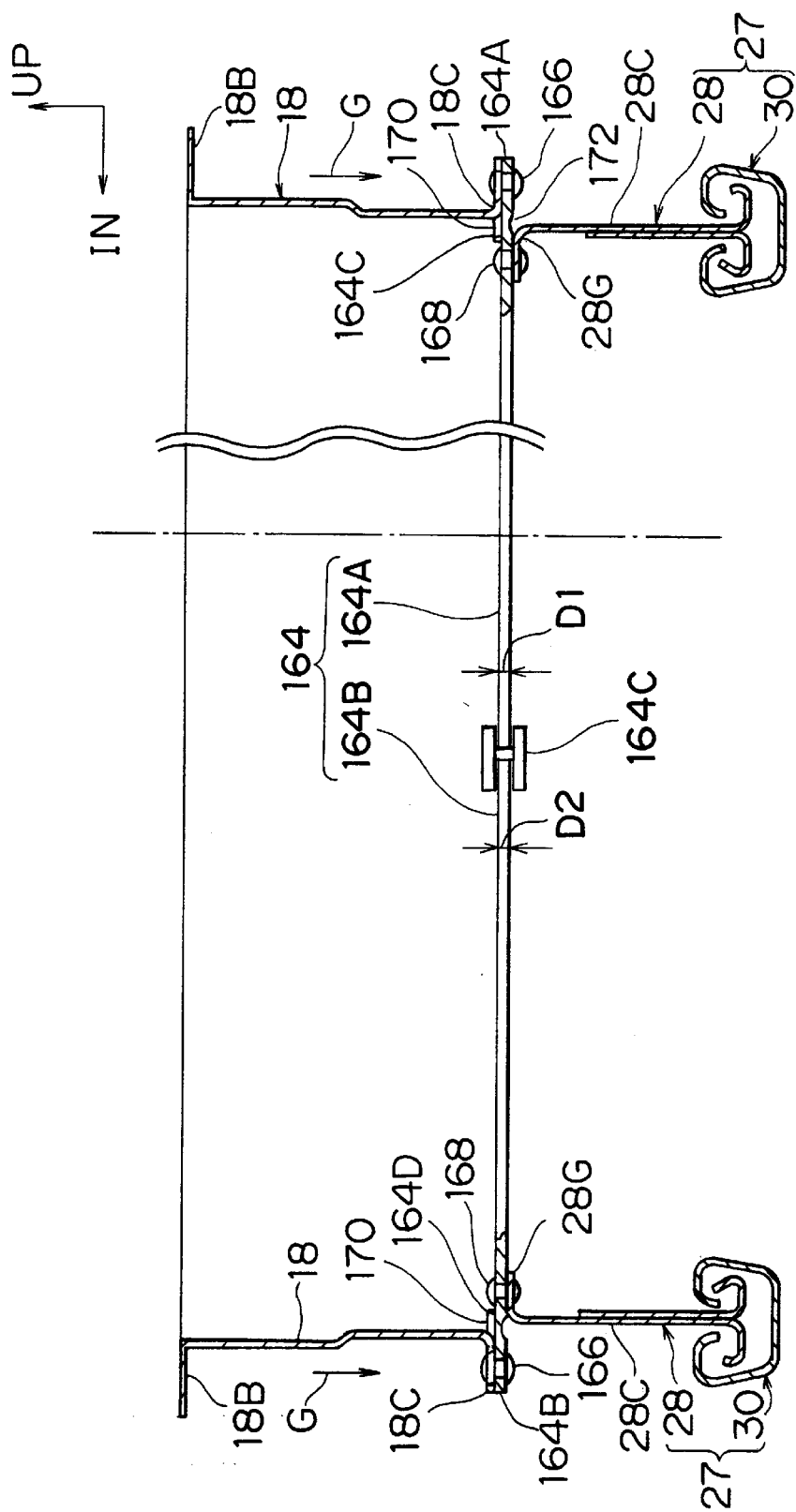
FIG. 45 is an enlarged sectional view taken along line XLV—XLV of FIG. 44.

Referring to FIG. 45, spring constants of the right sensor bar 164A and left sensor bar 164B of the rear sensor bar 164 are set to different values by setting each plate thickness D1 of the left sensor bar 164A and D2 of the right sensor bar 164B is set to a different value. Each end portion of the left sensor bar 164A and the right sensor bar 164B is connected with each other using a connecting bracket 164C. The front sensor bar 162 has the same structure as that of the rear sensor bar 164.

An operation of the present embodiment will be described.

In addition to the description with respect to the operation of the fourth embodiment, as spring constants of the left sensor bars 162A, 164A are different from those of the right sensor bars 162B, 164B, resonance between the respective left and right sensor bars 162A, 164A and 162B, 164B can be suppressed even when the front sensor bar 162 and the rear sensor bar 164 vibrate in the vacant seat 10 during running of the vehicle. More specifically, when the deformation downward of the left sensor bars 162A, 164A reaches the peak, it is possible to lower the probability that the deformation upward of the right sensor bar 162B becomes the peak.

Therefore, in the present embodiment, lateral vibration of the seat back generated when vertical resonance phase of the left sensor bars 162A, 164A and the right sensor bars 162B, 164B is inverted.

In the present embodiment, the plate thickness of the left sensor bar 164A is set to be different from that of the right sensor bar 164B such that the spring constant of the left sensor bar 164A is set to be different from that of the right sensor bar 164B. Alternatively, the spring constant of the left sensor bar 164A may be set to be different from that of the right sensor bar 164B by employing the construction where the left sensor bar 164A is formed of the different material from that of the right sensor bar 164B.

In the present embodiment, end portions of the left sensor bar 16A and the right sensor bar 164B are connected using the connecting bracket 164C. However, connection of the left sensor bar 164A and the right sensor bar 164B may be performed employing other measures such as rivet, caulking and welding without limitation.

A fifteenth embodiment of the sitting passenger detecting apparatus according to the present invention will now be described with reference to FIGS. 46 to 48.

Figure 46:
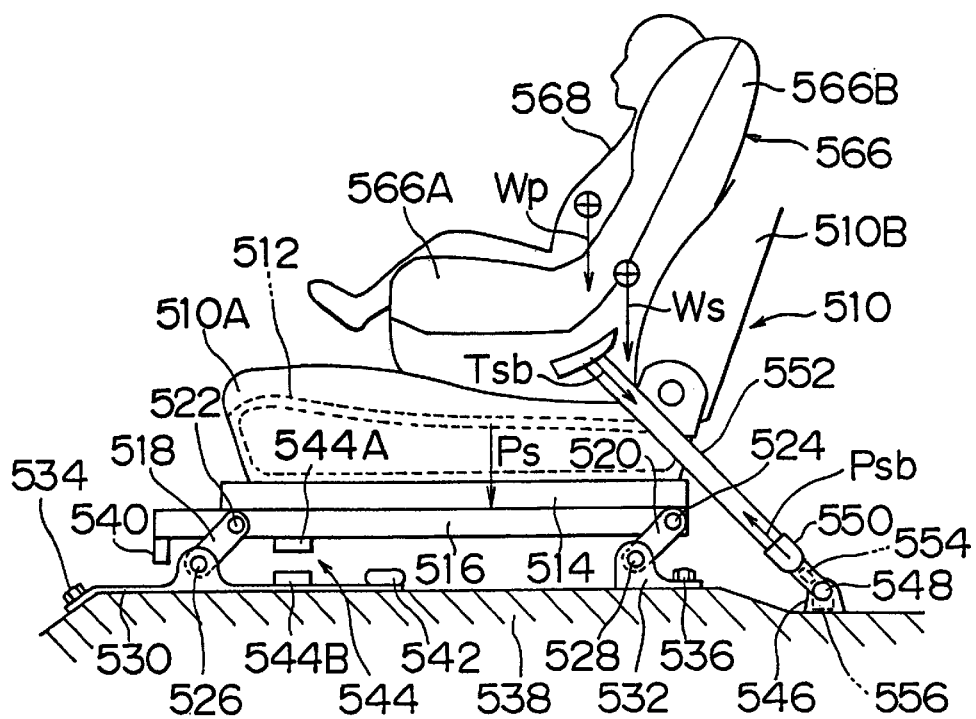
FIG. 46 is a schematic view showing the structure of a sitting passenger detecting apparatus according to a fifteenth embodiment of the present invention in a state in which a child seat has been joined to a front passenger seat.

FIG. 46 is a schematic view showing the structure of the fifteenth embodiment in a state in which a child seat has been mounted on the front passenger seat. FIG. 47 is a block diagram showing the fifteenth embodiment.

Referring to FIG. 46, the seat 510 is a front passenger seat. The front passenger seat 510 incorporates a seat body 510A for supporting the thighs and hips of the passenger; and a seat back 510B pivotally supported at the lower end of the seat body 510 to support the upper body of the passenger. A frame 512 of the seat body 510A is secured to upper rail members 514 forming a pair and disposed apart from each other in the direction of the width of the vehicle. The upper rail members 514 are supported by lower rail members 516 by a known method such that the relative movement with respect to the lower rail members 516 in the longitudinal direction is permitted. Moreover, stoppers (not shown) are used to secure the upper rail members 514 at required positions.

The right and left lower rail members 516 are integrally connected to each other at the front and rear ends thereof with connecting bars (not shown in FIG. 46) extending in the lateral direction of the vehicle. In the first embodiment, the upper ends of the link members 518 and 520 are, with pins 522 and 524, pivotally supported at the front and rear ends of the lower rail members 516. The lower ends of the link members 518 and 520 are pivotally supported by joining brackets 530 and 532 with pins 526 and 528.

The link members 518 and 520 have the same effective length, that is, the same length between the pins, the link members 518 and 520 being extended to be inclined toward the rear portion of the vehicle when viewed from a lower position toward the upper end. The joining brackets 530 and 532 are secured to a floor member 538 of the vehicle with bolts 534 and 536. Thus, the lower rail members 516, the link members 518 and 520 and the floor member 538 substantially form a four-joint link in the form of a parallelogram in association with the pins 522 and 524, the pins 526 and 528 and the joining brackets 530 and 532.

Coil springs (not shown in FIG. 46) for counterclockwise urging the link members 518 and 520 around the pins 526 and 528 when viewed in FIG. 46 are disposed around the pins 526 and 528. The lower rail members 516 or the joining brackets 530 and 532 are provided with stoppers for preventing displacement of the link members 518 and 520 in a quantity not smaller than a predetermined quantity and caused from rotation in the counterclockwise direction when viewed in FIG. 46.

As can be understood from the description, when a passenger has sat in the seat 510 and thus a downward load is added to the seat body 510A, the link members 518 and 520, which have been stopped by the stoppers, are rotated and displaced clockwise around the pins 526 and 528 when viewed in FIG. 46 against the spring force of the coil spring. Thus, the lower rail members 516 approach the floor member 538. Therefore, the lower rail members 516, the link members 518 and 520, the floor member 538, the pins 522 and 524, the pins 526 and 528 and the coil spring constitute the relative-displacement permitting means for permitting relative displacement of the seat body so as to relatively be displaced to approach the floor member 538 in accordance with the weight of the passenger added to the seat body 510A.

A stopper 540 made of an elastic material and arranged to prevent excessive rotation and displacement of each of the link members 518 and 520 in cooperation with the joining bracket 530 is secured to the lower surface of the front end of each of the lower rail members 516. Moreover, a stopper 542 made of an elastic material and arranged to prevent furthermore excessive rotation and displacement of each of the link members 518 and 520 in cooperation with the lower rail members 516 is secured to the rear end of the joining bracket 530.

In the fifteenth embodiment, upper sensor devices 544A and lower sensor devices 544B are secured to the lower surfaces of the right and left lower rail members 516 and the upper surfaces of the joining brackets 530. The sensor devices constitute a load sensor 544 which detects change in the electostatic capacity to detect change in the distance among the sensor devices so as to detect the load vertically added in between the lower rail members 516 and the floor member 538.

Although only one load sensor 544 is illustrated in FIG. 46, one load sensor is provided for each of the right and left portions of the seat 510. The foregoing load sensors are called load sensors 544R and 544L, respectively. The load sensors 544R and 544L output signals indicating loads Psr and Psl with reference to a load of zero which realized when no passenger is sitting on the front passenger seat 510.

Brackets 546 forming a pair are secured to the floor member 538 at positions adjacent to the right and left joining brackets 532 disposed in the rear portion. The lower end of the seat-belt anchor 550 is pivotally supported by each of the brackets 546 with a pin 548. As is commonly known, each seat-belt anchor 550 supports an end or an intermediate position of the seat belt 552. A seat-belt-load sensor 554 for detecting load Psb caused from tension Tsb of the seat belt 552 is provided for either seat-belt anchor 550. An angle sensor 556 for detecting an inclination angle θ of the seat-belt anchor 550 from the perpendicular is provided for the corresponding bracket 546.

Figure 47:
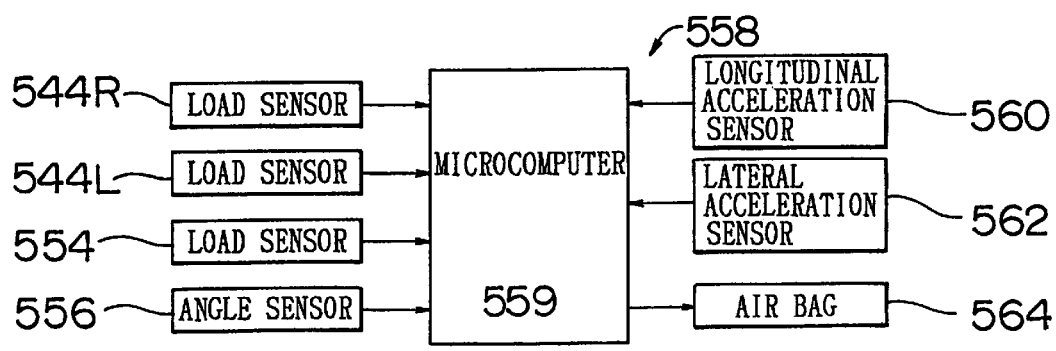
FIG. 47 is a block diagram showing the fifteenth embodiment.

As shown in FIG. 47, signals indicating the loads Psr and Psl detected by the load sensors 544R and 544L, respectively, a signal indicating the load Psb detected by the seat-belt-load sensor 554 and a signal indicating the inclination angle θ detected by the angle sensor 556 are input to an air-bag expansion control apparatus 558. Also a signal indicating longitudinal acceleration Gx of the car body is input to the air-bag expansion control apparatus 558 from a longitudinal acceleration sensor 560 and a signal indicating lateral acceleration Gy is input to the same from a lateral acceleration sensor 562.

The air-bag expansion control apparatus 558 incorporates a microcomputer having a usual structure which includes, for example, a CPU, a ROM, a RAM and an input/output port unit. As described later, the air-bag expansion control apparatus 558 estimates the weight W of a passenger and weight Wc for use to control the expansion in accordance with the loads Psr, Psl and Psb and the inclination angle q. Moreover, the air-bag expansion control apparatus 558 determines collision of a vehicle if the absolute value of the longitudinal acceleration Gx of the car body or the lateral acceleration Gy of the car body is made to be larger than a reference value to expand the air-bag 564.

In the illustrated embodiment, the air bag 564 consists of a front air bag and a side air bag for a driver, a lower front air bag and an upper front air bag for the front passenger seat and a lower side air bag and an upper side air bag for the front passenger seat.

When the absolute value of the longitudinal acceleration Gx of the car body is made to be larger than the reference value, the air-bag expansion control apparatus 558 determines that collision in the longitudinal direction of the vehicle has occurred. When the estimated weight Wc of the passenger is smaller than a first reference value W1 (a positive constant), the air-bag expansion control apparatus 558 expands the front air bag for the driver. However, the air bag for the front passenger seat is not expanded in the foregoing case. When the estimated weight Wc of the passenger is not smaller than the first reference value W1 and smaller than a second reference value W2 (which is a positive constant larger than W1), the air-bag expansion control apparatus 558 expands the front air bag for the driver and the lower front air bag for the front passenger seat. When the estimated weight Wc is not smaller than the second reference value W2, the air-bag expansion control apparatus 558 expands the front air bag for the driver and the lower front air bag and the upper front air bag for the front passenger seat.

Similarly, when the absolute value of the lateral acceleration Gy of the car body is larger than a reference value, the air-bag expansion control apparatus 558 determines that lateral collision (side collision) of the vehicle has occurred. When the engaged weight Wc of the passenger is smaller than the first reference value W1, the air-bag expansion control apparatus 558 expands the side air bag for the driver. In this state, the air bag for the front passenger seat is not expanded. When the estimated weight Wc of the passenger is not smaller than the first reference value W1 and smaller than the second reference value W2, the air-bag expansion control apparatus 558 expands the side air bag for the driver and the lower side air bag for the front passenger seat. When the estimated weight Wc of the passenger is not smaller than the second reference value W2, the air-bag expansion control apparatus 558 expands the side air bag for the driver and the side air bag and the upper side air bag for the front passenger seat.

Note that the structure of the air bag and control of expansion which is performed by the air-bag expansion control apparatus 558 are not the essential portion of the present invention. An arbitrary structure of the air bag can be employed and also the control of the expansion of the air bag may be performed by an arbitrary method.

Referring to FIG. 46, the principle of detecting the weight W of the passenger according to the thirteenth embodiment will now be described.

As shown in FIG. 46, an assumption is made that the weight of the little child 568 and that of the child seat 566 are Wp and Ws, respectively. Thus, the Psb which is added to the seat-belt anchor 550 through the seat belt 552 is the same as the tension Tsb of the seat belt 52. The angle of the load Psb made from the perpendicular q. Since reaction force of each of the link members 518 and 520 can be ignored, the vertical load Ps which is added to the seat 10 is expressed by the following equation (1).

As shown in FIG. 39, an assumption is made that the weight of the little child 568 and that of the child seat 566 are Wp and Ws, respectively. Thus, the Psb which is added to the seat-belt anchor 550 through the seat belt 552 is the same as the tension Tsb of the seat belt 52. The angle of the load Psb made from the perpendicular θ. Since reaction force of each of the link members 518 and 520 can be ignored, the vertical load Ps which is added to the seat 10 is expressed by the following equation (1).

$$Ps = Wp + Ws + Tsb \cdot \cos\theta = Wp + Ws + Psb \cdot \cos\theta \quad (1)$$

The load Ps is the same as the sum of the loads Psr and Psl detected by the load sensors 544R and 544L. Assuming that the sum of the weight of the little child 568 and that of the child seat 566 is W, the total weight W is expressed by the following equation (2).

$$W = Wp + Ws = Psr + Psl - Psb \cdot \cos\theta \quad (2)$$

Also in a case where a passenger is sitting in the front passenger seat 510, the weight W of the passenger is expressed by the foregoing equation (2). Therefore, when the loads Psr, Psl and Psb and the angle θ are detected, the weight W of the passenger or the sum of the weight of the little child 568 and that of the child seat 566 can be obtained in accordance with the foregoing equation (2).

Figure 48:
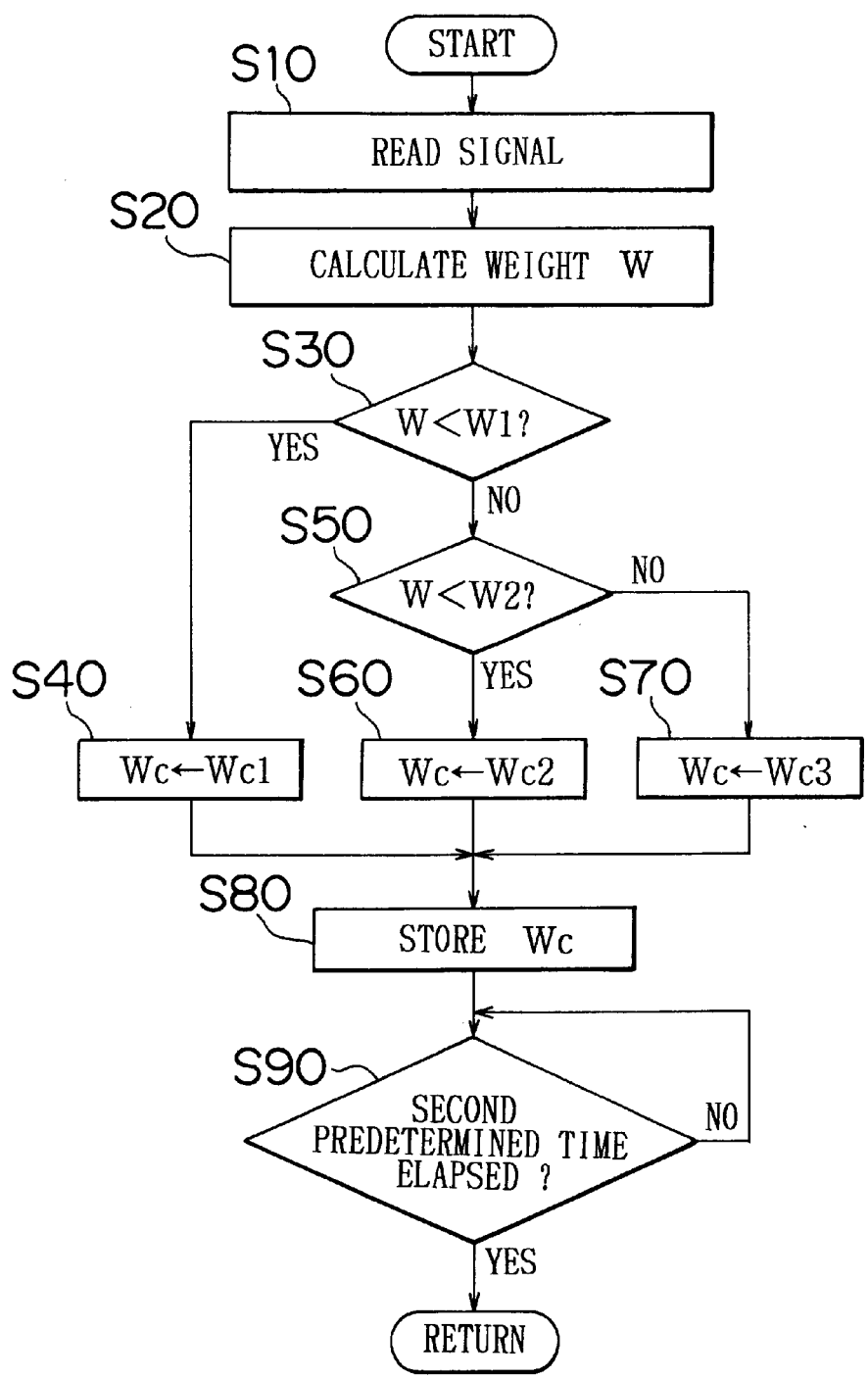
FIG. 48 is a flow chart of a routine for estimating the weight of a passenger according to the fifteenth embodiment.

FIG. 48 is a flow chart showing a routine for estimating the weight of a passenger according to the illustrated fifteenth embodiment. Control which is performed in accordance with the flow chart shown in FIG. 48 is started after a lapse of a first predetermined period of time from a moment an ignition switch (not shown) has been switched on. Moreover, the control is repeatedly performed at intervals of a second predetermined period of time.

In step S10 signals and the like indicating the loads Psr and Psl detected by the corresponding load sensors 544R and 544L are read. In step S20 the weight W of the passenger is calculated in accordance with the detected loads Psr, Psl, Psb and the angle θ by using the foregoing equation (2).

In step S30 a determination is made whether or not the weight W is smaller than the first reference value W1. If an affirmative determination is made, the weight Wc for controlling the expansion is made to be Wc1 (a positive constant) in step S40. When a negative determination is made, the operation proceeds to step S50.

In step S50 a determination is made whether or not the weight W is smaller than the second reference value W2. If an affirmative determination is made, the weight Wc for controlling the expansion is made to be Wc2 (a positive constant larger than Wc1) in step S60. If a negative determination is made, the weight Wc for controlling the expansion is made to be Wc3 (a positive constant larger than Wc2) in step S70.

In step S80 weight Wc for controlling the expansion determined in step S40, S60 or S70 is stored in the RAM of the microcomputer. Then, the operation proceeds to step S90.

In step S90 a determination is made whether or not the second predetermined time has elapsed. If a negative determination is made, step S90 is repeatedly performed. If an affirmative determination is made, the operation is returned to step S10.

The fifteenth embodiment is structured such that the weight W of the passenger is calculated in accordance with the equation (2). Thus, an influence of the load caused from the tension of the seat belt S52 can be eliminated. Therefore, the weight of the passenger can accurately be detected. As a result, the physique of the passenger can accurately be determined.

A sixteenth embodiment of the sitting passenger detecting apparatus according to the present invention will now be described with reference to FIG. 49.

Figure 49:
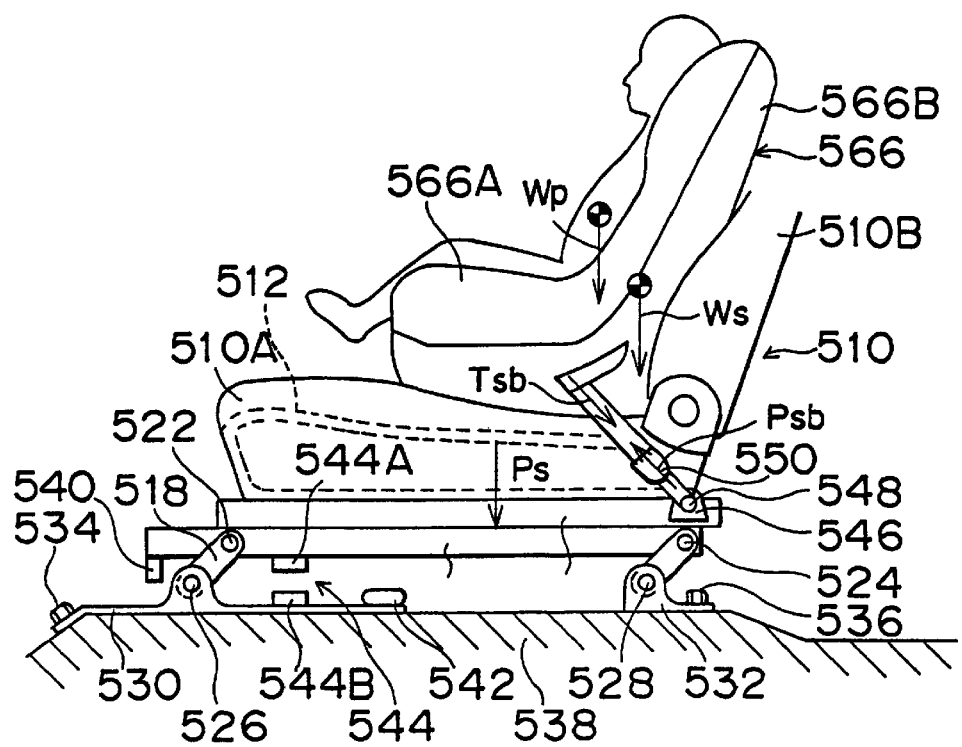
FIG. 49 is a schematic view showing the structure of a sitting passenger detecting apparatus according to a sixteenth embodiment of the present invention in a state in which a child seat has been joined to a front passenger seat.

FIG. 49 is a schematic view showing the sitting passenger detecting apparatus for a vehicle according to the present invention in a state in which a child seat has been mounted on the front passenger seat as a sixteenth embodiment. Elements which are shown in FIG. 49 and which are the same as those shown in FIG. 46 are given the same reference numerals as those shown in FIG. 46.

This embodiment has a structure that the seat-belt anchor 550 is secured to the outer surface of the upper rail members 514. Moreover, the seat-belt-load sensor 554 and the angle sensor 556 according to the fifteenth embodiment are omitted from the structure. The estimation of the weight of the passenger which is performed by the air-bag expansion control apparatus according to the sixteenth embodiment is performed by a method (not shown) in accordance with a routine similar to that according to the fifteenth embodiment except for the structure that the weight W is calculated as the sum of the loads Psr and Psl in step 20 shown in FIG. 48.

As can be understood from FIG. 49, the load Psb caused from the tension Tsb of the seat belt 552 is not added in between the seat body 510A and the floor member 538. Therefore, the load caused from the tension Tsb of the seat belt 552 is not added to the right and left load sensors 544. As a result, the illustrated sixteenth embodiment does not require the correction calculation of the result of the detection performed by the load sensor 544 according to the fifteenth embodiment to accurately detect and determine the weight of the passenger.

The fifteenth and sixteenth embodiments have the structure that the load sensor 544 uses an amount of displacement occurring when the lower rail members 516 relatively approaches the floor member 538 owing to the weight of the passenger sitting on the seat 510 so as to detect the load caused from the weight of the passenger. That is, the load which is added in between the joining bracket 530 or 532 and the floor member 538 is not detected. Therefore, influences of the loads for joining the brackets 530 and 532 to the floor member 538 by using the bolts 534 and 536 and change in the joining loads can reliably be eliminated. Thus, the weight of the passenger can be detected.

A seventeenth embodiment of the sitting passenger detecting apparatus according to the present invention will now be described with reference to FIG. 50.

Figure 50:
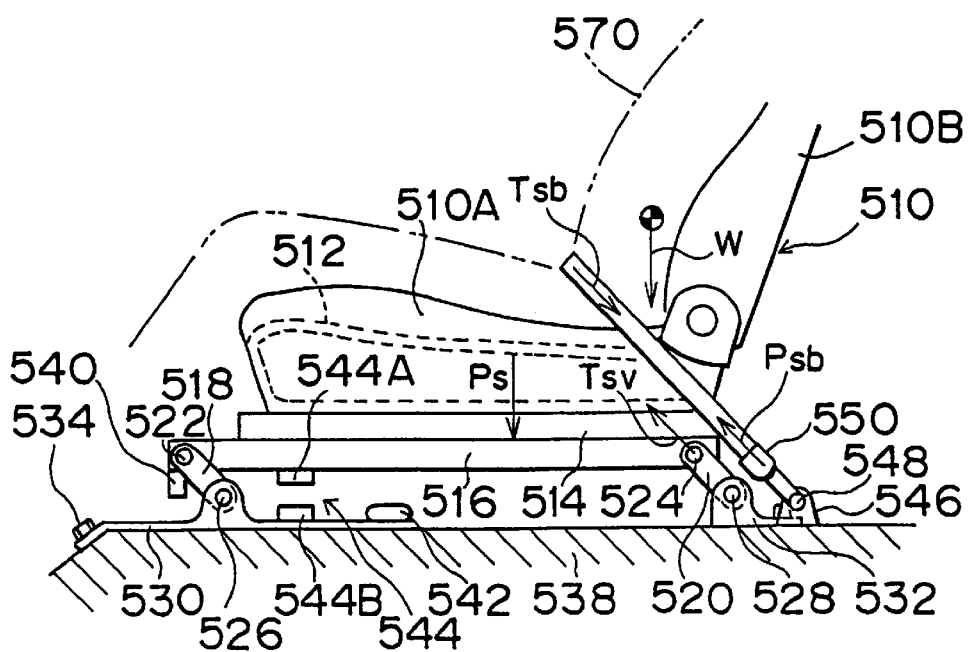
FIG. 50 is a schematic view showing the structure of a sitting passenger detecting apparatus according to a seventeenth embodiment of the present invention in a state in which an adult has been sitting on a front passenger seat.
Figure 51:
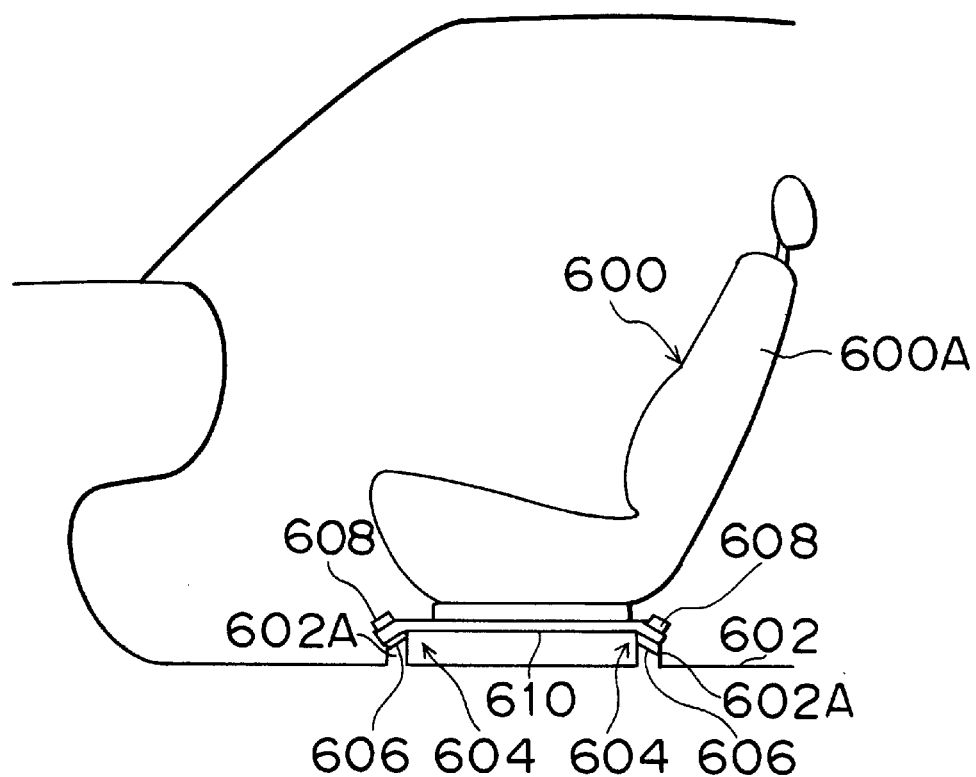
FIG. 51 is a schematic side view showing a portion of a vehicle to which a conventional sitting passenger detecting apparatus is applied.

FIG. 50 is a schematic view showing the structure of a fifteenth embodiment of the seating passenger detecting apparatus for vehicle according to the present invention in a state in which an adult has sat on the front passenger seat as the seventeenth embodiment. Elements which are shown in FIG. 50 and which are the same as those shown in FIG. 46 are given the same reference numerals as those shown in FIG. 46.

The seventeenth embodiment has a structure that the link members 518 and 520 extend to be inclined to the front portion of the vehicle when they are viewed in a direction from their lower ends to the upper ends. The inclination angle of each of the link members 518 and 520 is substantially the same as the inclination angle θ of the seat belt 552 which is realized when the seat 510 is at a standard position in the longitudinal direction and an adult 570 having a standard physique is sitting on the seat 510.

The rear link member 520 is disposed at the same position as that of the seat belt 552 or adjacent to the same in a state in which an adult 570 having a standard physique is sitting on the seat 510 when the rear link member 520 is viewed in a lateral direction of the vehicle.

Also the seventeenth embodiment does not incorporate the seat-belt-load sensor 554 and the angle sensor 556 according to the fifteenth embodiment. The other structures of this embodiment are similar to those according to the first embodiment. Also the estimation of the weight of the passenger which is performed by the air-bag expansion control apparatus according to this embodiment is performed by a routine (not shown) which is similar to that according to the fifteenth embodiment except for the structure that the weight W is calculated as the sum of the loads Psr and Psl in step S20 shown in FIG. 48.

Therefore, according to the seventeenth embodiment, the rear link member 520 also serves as a seat-belt-load maintaining means for maintaining the load Psb added to the seat-belt anchor 550 owing to the tension Tsb of the seat belt 552. Therefore, the load caused from the tension Tsb of the seat belt 552 is not substantially added to the right and left sensor 544. Therefore, the weight W of the passenger can accurately be detected and determined without any substantial influence of the tension Tsb of the seat belt 552.

Each of the fifteenth to seventeenth embodiments has the structure that the load sensor 544 detects an amount of displacement occurring when the lower rail members 516 relatively approaches the floor member 538 to detect the load caused from the weight of the passenger. The load caused from the weight of the passenger may be detected as an amount of an arbitrary physical quantity which is changed owing to relative approach of the lower rail members 516 to the floor member 538. The physical quantity may be any one of the following factors: a load which is added in between the lower rail members 516 and the floor member 538 or the brackets 530 and 532; a rotational angle of the link member 518 or the link member 520; a rotational angle of the pin 522, the pin 524, the pin 526 or the pin 528; the torsional angle or the torsional torque; deformation and distortion of support legs for connecting securing the lower rail members 516 to the floor member 538 with using any link; and pressure which is applied from the upper rail members 514 to the lower rail members 516 through a roller (not shown).

Each of the fifteenth embodiment to the seventeenth embodiment incorporates the right and left load sensors 544R and 544L forming a pair. The load sensors may be disposed apart from each other in the longitudinal direction of the vehicle by providing the load sensors for the connecting bar which integrally connects the right and left lower rail members 516 to each other. Moreover, the load sensor may be provided for only the front connecting bar or the rear connecting bar.

In each of the fifteenth embodiment to the seventeenth embodiment, the lower rail members 516, the link members 518 and 520, the floor member 538, the pins 522 and 524, the pins 526 and 528 and the coil spring constitute the relative-displacement permitting means which permits relative displacement of the seat body to approach the floor member 538 in accordance with the weight of the passenger which is added to the seat body 510A. Note that the relative-displacement permitting means may be structured arbitrarily if the structure permits at least vertical relative displacement of the seat body 510A with respect to the floor member 538.

For example, the relative-displacement permitting means may be a structure formed by combining a guide member which permits at least vertical displacement of the seat body 510A with respect to the floor member 538 and a member which is guided by the guide member. In particular, the fifteenth embodiment and the sixteenth embodiment may have a structure that the link members 518 and 520 extend to be inclined in the forward direction of the vehicle when the link members 518 and 520 are viewed from their lower ends toward their upper ends.

The load sensor 544 according to the fifteenth embodiment or the seventeenth embodiment may be a sensor for detecting the load which is added to the seating surface of the seat body 510A or the load which is added in between the floor member 538 and the brackets 530 and 532. The load sensor 544 according to the fourteenth embodiment may be a sensor for detecting the load which is added in between the floor member 538 and the brackets 530 and 532.

Each of the fifteenth embodiment to the nineteenth embodiment has the structure that the lower rail members 516, the link members 518 and 520 and the floor member 538, in cooperation with the pins 522 and 524, the pins 526 and 528 and the coil spring, constitute the relative-displacement permitting means for permitting relative-displacement of the seat body to approach the floor member 538 in accordance with the weight of the passenger which is added to the seat body 510A. The lower rail members 516 may firmly be connected to the brackets 530 and 532 without the relative-displacement permitting means.

In each of the thirteenth embodiment to the fifteenth embodiment, the seat 510 is the front passenger seat. The seat to which the sitting passenger detecting apparatus according to the present invention is applied may be a driver's seat or another seat. Although the seat 510 is the slide seat, the seat may be a fixed seat.

In the sixteenth embodiment, the seat-belt anchor 550 is disposed at the position upper than the load sensor 544. The seat-belt anchor 550 may be disposed at a position lower than the load sensor 544 if the seat-belt anchor 550 is disposed more adjacent to the seat body as compared with the load sensor when the positional relationship is viewed along the passage through which the load is transmitted from the seat body 510A to the floor member 538.

In each embodiment, the sitting passenger detecting apparatus according to the present invention is applied to the front passenger seat. The sitting passenger detecting apparatus according to the present invention may be applied to another seat except for the front passenger seat.

What is claimed is:

1. A sitting passenger detecting apparatus comprising:

connecting members separating a seat rail and a seat cushion frame from each other and supporting a load which is added to said seat cushion frame and a load applied to a seat back to connect said seat rail, said seat cushion frame, and said seat back to each other such that a relative displacement between said seat rail and said seat cushion frame is permitted;

displacement detecting means for detecting the displacement between said seat rail and said seat cushion frame; and weight calculating means for calculating a weight of a passenger sitting on the seat in accordance with a value detected by said displacement detecting means;

wherein said connecting member comprises a bracket which is provided for at least the rear connecting portion of the front and rear connecting portions between an upper rail of the seat rails and said seat cushion frame, and said displacement detecting means comprises a sensor for detecting change in the distance from said seat rail to said seat cushion frame, said sensor being disposed in parallel with said bracket at a position offset in a direction of the width of the seat.

2. A sitting passenger detecting apparatus according to claim 1, wherein said sensor incorporates a thin plate which is distorted in accordance with change in the distance from said seat cushion frame and said upper rail; and a sensor body for detecting distortion of said thin plate.

3. A sitting passenger detecting apparatus according to claim 1, wherein said bracket incorporates a bending portion which is elastically deformed in a downward direction owing to a load which is added to said seat when a passenger has sat in said seat.

4. A sitting passenger detecting apparatus comprising:

connecting members separating a seat rail and a seat cushion frame from each other and supporting a load which is added to said seat cushion frame and a load applied to a seat back to connect said seat rail, said seat cushion frame, and said seat back to each other such that a relative displacement between said seat rail and said seat cushion frame is permitted;

displacement detecting means for detecting the displacement between said seat rail and said seat cushion frame; and weight calculating means for calculating a weight of a passenger sitting on the seat in accordance with a value detected by said displacement detecting means;

wherein said connecting member comprises a link for connecting said seat rail and said seat cushion frame to each other, said displacement detecting means comprises a sensor detecting the relative displacement between said link and said seat cushion frame occurring when the passenger sits on said seat; and wherein a bracket is provided which connects two pin-support points on said seat cushion frame to each other and to which the upper end of said link is connected, and said sensor joined to said bracket measures the distortion of said bracket.

5. A sitting passenger detecting apparatus according to claim 4, wherein said seat cushion frame has a hole into which a pin for connecting said bracket and the upper end of said link to each other has been inserted such that a predetermined gap is retained in the vertical direction.

6. A sitting passenger detecting apparatus comprising connecting members structured to separate a seat rail and a seat cushion frame from each other and support a load which is added to said seat cushion frame to connect said seat rail and said seat cushion frame to each other such that a relative displacement between said seat rail and said seat cushion frame is permitted;

displacement detecting means for detecting the displacement between said seat rail and said seat cushion frame; and weight calculating means for calculating a weight of a passenger sitting on the seat in accordance with a value detected by said displacement detecting means wherein said connecting member is formed as two cross bars which are disposed between said right and left seat cushion frames and to which a cushion pan has been joined, said displacement detecting means is a sensor provided for said cross bar to measure distortion of said cross bar, and wherein said cross bars are joined to said cushion pan through a synthetic bush.

7. A sitting passenger detecting apparatus according to claim 6, further comprising:

a back bar arranged between said right and left seat back frames; and a seat back sensor joined to said back bar to measure change in the distance from a seat back cushion spring, wherein said weight calculating means calculates the weight of the passenger sitting on said seat in accordance with a value detected by said sensor provided for said cross bar and a value detected by said seat back sensor.

8. A sitting passenger detecting apparatus comprising:

connecting members separating a seat rail and a seat cushion frame from each other and supporting a load which is added to said seat cushion frame and a load applied to a seat back to connect said seat rail and said seat cushion frame and said seat back to each other such that a relative displacement between said seat rail and said seat cushion frame is permitted;

displacement detecting means for detecting the displacement between said seat rail and said seat cushion frame; and weight calculating means for calculating a weight of a passenger sitting on the seat in accordance with a value detected by said displacement detecting means;

wherein said right and left seat cushion frames and said seat rail are offset in the direction of the width of the vehicle, said connecting member comprises two front and rear sensor bars extending in the direction of the width of the vehicle and connecting said right and left seat cushion frames and said seat rail to one another, and said displacement detecting means comprises a sensor disposed between said seat cushion frame connecting portion and said seat rail connecting portion at the two ends of said two sensor bars to detect distortion of said sensor bar.

9. A sitting passenger detecting apparatus according to claim 8, wherein a thickness-reduced portion is formed in each of the portions of the two sensor bars in which said sensors are disposed.

10. A sitting passenger detecting apparatus comprising:

connecting members separating a seat rail and a seat cushion frame from each other and supporting a load which is added to said seat cushion frame and a load applied to a seat back to connect said seat rail and said seat cushion frame and said seat back to each other such that a relative displacement between said seat rail and said seat cushion frame is permitted;

displacement detecting means for detecting the displacement between said seat rail and said seat cushion frame; and weight calculating means for calculating a weight of a passenger sitting on the seat in accordance with a value detected by said displacement detecting means;

wherein front and rear connecting portions between said upper rail of said seat rail and said seat cushion frame are joined by rotative links, an elastic member is provided for at least either of said connecting portions so as to stably hold said seat cushion frame and an amount of displacement of said seat cushion frame with respect to said upper rail against an urging force of said elastic member is detected by a variable resistor.

11. A sitting passenger detecting apparatus according to claim 10, wherein amplifying means is provided which amplifies the angle of rotation of said link to communicate a result of the amplification to said variable resistor.

12. A sitting passenger detecting apparatus according to claim 1, wherein said bracket either is disposed at an inner side or said bracket is disposed at an outer side of said seat, respectively in a lateral direction of a vehicle; said sitting passenger detecting apparatus comprising alarm means for alarming when a change rate of an output signal from said sensor disposed in parallel with said bracket disposed either at the inner side or the outer side in the lateral direction of the vehicle.

13. A sitting passenger detecting apparatus according to claim 8, wherein said sensor bar is divided into right and left portions each having different spring constant.

14. A sitting passenger detecting apparatus comprising:

first load detecting means for detecting a load added to the front portion of a seating surface of a seat of a vehicle;

second load detecting means for detecting a load added to the rear portion of the seating surface;

first determining means for determining a fact that a passenger which is sitting on said seat is an adult when the sum of values detected by said first and second load detecting means is not smaller than a first threshold value; and a second determining means for determining a fact that a passenger which is sitting on the seat is an adult when a value detected by said first load detecting means is not smaller than a second threshold value and a value detected by said second load detecting means is not smaller than a third threshold value.

15. A sitting passenger detecting apparatus according to claim 14, further comprising:

seat belt joining determining means for determining whether or not said seat belt has been joined; and child restraint system mounting determining means for determining whether or not a child restraining apparatus has been mounted to be directed rearwards in accordance with a result of the determination made by said seat belt joining determining means and values detected by said first and second load detecting means.

16. A sitting passenger detecting apparatus according to claim 14, further comprising third determining means for determining that the passenger sitting on the seat is an adult when at least either of values detected by said first and second load detecting means is not smaller than a fourth threshold value.

17. A sitting passenger detecting apparatus according to claim 16, further comprising:

seat belt joining determining means for determining whether or not said seat belt has been joined; and CRS mounting determining means for determining whether or not a child restraining apparatus has been mounted to be directed rearwards in accordance with a result of the determination made by said seat belt joining determining means and values detected by said first and second load detecting means.

18. A sitting passenger detecting apparatus according to claim 16, wherein said CRS mounting determining means determines a fact that said child restraining apparatus has been mounted to be directed rearwards when said seat belt has been joined and a value detected by said first load detecting means is not smaller than a value detected by said second load detecting means.

19. A sitting passenger detecting method comprising:

a first load detecting step for detecting a load added to the front portion of a seating surface of a seat of a vehicle;

a second load detecting step for detecting a load added to a rear portion of the seating surface;

a first determining step for determining a fact that a passenger sitting on the seat is an adult when the sum of values detected in said first and second load detecting steps is not smaller than a first threshold value; and a second determining step for determining a fact that a passenger which is sitting on the seat is an adult when a value detected in said first load detecting step is not smaller than a second threshold value and a value detected in said second load detecting step is not smaller than a third threshold value.

20. A sitting passenger detecting method according to claim 19, further comprising:

a seat belt joining determining step for determining whether or not said seat belt has been joined; and a child restraint system mounting determining step for determining whether or not a child restraining apparatus has been mounted to be directed rearwards in accordance with a result of the determination made in said seat belt joining determining step and values detected in said first and second load determining steps.

21. A sitting passenger detecting method according to claim 19, further comprising a third determining step for determining a fact that the passenger sitting on the seat is an adult when at least either of values detected in said first and second load detecting steps is not smaller than a fourth threshold value.

22. A sitting passenger detecting method according to claim 21, further comprising:

- a seat belt joining determining step for determining whether or not said seat belt has been joined; and
- a CRS mounting determining step for determining whether or not a child restraining apparatus has been mounted to be directed rearwards in accordance with a result of the determination made in said seat belt joining determining step and values detected in said first and second load determining steps.

23. A sitting passenger detecting method according to claim 22, wherein said CRS mounting determining step determines that said child restraining apparatus has been mounted to be directed rearwards when said seat belt has been joined and the value detected in said first load detecting step is not smaller than the value detected in said second load detecting step.

24. A sitting passenger detecting apparatus comprising:

- a seat track disposed between a floor and a seat cushion frame to permit movement of said seat cushion frame in the longitudinal direction with respect to said floor; and
- a load sensor for detecting a load added to said seat cushion frame in accordance with displacement of said seat cushion frame with respect to an upper rail of said seat track.

25. A sitting passenger detecting apparatus comprising:

- a seat track disposed between a floor and a seat cushion frame to permit movement of said seat cushion frame in the longitudinal direction with respect to said floor;
- a front connecting portion for connecting the front portion of said seat cushion frame and the front portion of an upper rail of said seat track to each other;
- rear connecting portion for connecting the rear portion of said seat cushion frame and the rear portion of said upper rail to each other;
- a load sensor disposed in a sensor joining portion formed at an offset position in the direction of the width of said seat with respect to said rear connecting portion and arranged to detect a load added to said seat cushion frame in accordance with displacement of said seat cushion frame with respect to said upper rail; and
- a low-strength portion formed between said rear connection portion of said upper rail and said sensor joining portion.

26. A sitting passenger detecting apparatus according to claim 25, wherein said seat cushion frame is rotatively connected to said upper rail in said front connecting portion.

27. A sitting passenger detecting apparatus according to claim 25, wherein a sound insulating member is disposed between said sensor joining portion of said upper rail and said sensor joining portion of said seat cushion frame.

28. A sitting passenger detecting apparatus comprising:

- at least one load detecting means for detecting a vertical load added to a seat body joined to a car-body member;
- seat-belt load detecting means for detecting a load caused from a tension of the seat belt added to a seat belt anchor secured to said car-body member;
- direction detecting means for detecting the direction of the load caused from the tension; and
- estimating means for estimating the weight of the passenger in accordance with the load detected by said load detecting means,
- wherein said estimating means estimates the vertical load added in between the car body and said seat body owing to the load caused from the tension and subtracts the estimated load from the load detected by said load detecting means so as to estimate the weight of the passenger.

29. A sitting passenger detecting apparatus comprising:

- at least one load detecting means disposed between a car-body member and a seat body disposed above said car-body member and arranged to detect a vertical load added in between said car-body member and said seat body;
- estimating means for estimating the weight of a passenger in accordance with the load detected by said load detecting means; and
- seat-belt-load maintaining means disposed between said car-body member and said seat body and arranged to maintain a load added from said seat belt to said seat body
- wherein said seat belt load maintaining means includes a pair of link members inclined with an inclination angle equal to an inclination angle of a seat belt attached to the seat body.

* * * * *